(12) United States Patent
Yamaguchi

(10) Patent No.: US 9,266,398 B2
(45) Date of Patent: Feb. 23, 2016

(54) PNEUMATIC TIRE HAVING TURBULENCE GENERATING PROTRUSIONS PROVIDED INSIDE A GROOVE

(75) Inventor: Masashi Yamaguchi, Atsugi (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1549 days.

(21) Appl. No.: 12/526,384

(22) PCT Filed: Feb. 8, 2008

(86) PCT No.: PCT/JP2008/052200
§ 371 (c)(1),
(2), (4) Date: Feb. 25, 2010

(87) PCT Pub. No.: WO2008/096879
PCT Pub. Date: Aug. 14, 2008

(65) Prior Publication Data
US 2010/0180994 A1    Jul. 22, 2010

(30) Foreign Application Priority Data

Feb. 9, 2007 (JP) ............................. P2007-031163
Feb. 20, 2007 (JP) ............................. P2007-039421
Feb. 20, 2007 (JP) ............................. P2007-039424
Jul. 2, 2007 (JP) ............................. P2007-174333

(51) Int. Cl.
*B60C 11/13* (2006.01)
*B60C 13/02* (2006.01)
(Continued)

(52) U.S. Cl.
CPC ................ *B60C 13/02* (2013.01); *B60C 11/01* (2013.01); *B60C 11/042* (2013.04); *B60C 17/0009* (2013.04); *B60C 17/0045* (2013.04);

(Continued)

(58) Field of Classification Search
CPC .... B60C 11/01; B60C 13/02; B60C 17/0009; B60C 2011/1338; B60C 2013/026; B60C 11/13; B60C 11/1353; B60C 2011/1361
USPC ............................. 152/209.16, 523; D12/605
See application file for complete search history.

(56) References Cited

U.S. PATENT DOCUMENTS 3,030,998 A    4/1962 Jensen
3,482,616 A *  12/1969 French ........................ 152/523
(Continued)

FOREIGN PATENT DOCUMENTS

EP    323165 A2 *  7/1989
EP    541004 A1 *  5/1993
(Continued)

OTHER PUBLICATIONS machine translation for Japan 3028492 (no date).*
(Continued)

*Primary Examiner* — Steven D Maki
(74) *Attorney, Agent, or Firm* — Sughrue Mion, PLLC

(57) ABSTRACT

A pneumatic tire 1 according to the present invention has turbulence generating protrusions on a tire surface, each of the turbulence generating protrusions having a sharp edge part. In the pneumatic tire, the following relationships are satisfied: $0.015 \leq H/\sqrt{R} \leq 0.64$; $1.0 \leq p/H \leq 50.0$; $0.1 \leq H/e \leq 3.0$; $1.0 \leq L/H \leq 50.0$; and $1.0 \leq (p-w)/w \leq 100.0$, where "R" is a tire radius, "H" is a protrusion maximum height, "p" is a protrusion circumferential-direction interval, "e" is a protrusion radial-direction interval, "L" is a protrusion radial-direction length, and "w" is a protrusion circumferential-direction length.

19 Claims, 54 Drawing Sheets

(51) Int. Cl.
*B60C 11/01* (2006.01)
*B60C 11/04* (2006.01)
*B60C 17/00* (2006.01)

(52) U.S. Cl.
CPC . *B60C2011/1338* (2013.04); *B60C 2011/1361* (2013.04); *B60C 2013/026* (2013.04)

(56) References Cited

U.S. PATENT DOCUMENTS

| | | | |
|---|---|---|---|
| 4,723,585 A * | 2/1988 | Mechtel | 152/209.16 |
| 5,259,429 A | 11/1993 | Harms | |
| 5,725,701 A * | 3/1998 | Rooney et al. | 152/539 |
| 5,879,482 A * | 3/1999 | Rooney et al. | 152/539 |
| 6,651,712 B1 * | 11/2003 | Sundkvist et al. | 152/209.2 |
| 2001/0032691 A1* | 10/2001 | Ohsawa | 152/209.18 |
| 2002/0026971 A1 | 3/2002 | Matsumura | |
| 2009/0032161 A1* | 2/2009 | Yamaguchi | 152/523 |

FOREIGN PATENT DOCUMENTS

| | | | |
|---|---|---|---|
| FR | 2 811 939 A1 | | 1/2002 |
| GB | 903389 | | 8/1962 |
| JP | 60-189608 A | | 9/1985 |
| JP | 59-76403 U | | 7/1987 |
| JP | 63-130408 A | * | 6/1988 |
| JP | 03-031008 A | | 2/1991 |
| JP | 03-276802 A | * | 12/1991 |
| JP | 04-238703 A | * | 8/1992 |
| JP | 05-015564 B2 | * | 3/1993 |
| JP | 2918241 B2 | * | 7/1999 |
| JP | 11-321242 A | | 11/1999 |
| JP | 3028492 B2 | * | 4/2000 |
| JP | 2000-313206 A | * | 11/2000 |
| JP | 2002-019420 A | | 1/2002 |
| JP | 2004-196145 A | | 7/2004 |
| JP | 2004-291936 A | * | 10/2004 |
| JP | 2005-231600 A | | 9/2005 |
| JP | 2005-324685 A | | 11/2005 |
| JP | 2006-076431 | | 3/2006 |
| WO | 2007/032405 A1 | | 3/2007 |

OTHER PUBLICATIONS machine translation for Japan 2,918,241 (no date).*
machine translation for Japan 2000-313206 (no date).*
Derwent abstract for Japan 05-015564 B2 (no date).*
machine translation for Europe 541004 (no date).*
translation for Japan 05-015564 (no date).*
machine translation for Japan 2004-291936 (no date).*
International Search Report dated Apr. 15, 2008 (5 pages).
European Search Report based on Application No. 08711079 dated Mar. 28, 2011.

* cited by examiner (a)

(b)

(a)

(b)

(a)

(b)

TIRE ROTATION DIRECTION (a)

(b)

(a)

(b)

(a)

(b)

(c)

(a)

(b)

(c)

(a)

(b)

(c)

(a)

(b)

(c)

(a)

(b)

(a)

(b)

(a)

(b)

(a)

(b)

US 9,266,398 B2

PNEUMATIC TIRE HAVING TURBULENCE GENERATING PROTRUSIONS PROVIDED INSIDE A GROOVE

TECHNICAL FIELD

The present invention relates to a pneumatic tire, and particularly to a pneumatic tire including turbulence generating protrusions generating turbulence.

BACKGROUND ART

Generally, an increase in a tire temperature of a pneumatic tire is considered to be undesirable in terms of durability because such temperature increase promotes a time-dependent change, which is a change in the physical properties of a material, or contributes to damages in a tread part and the like in high-speed driving. A reduction in the tire temperature for durability improvement is now an important task to be accomplished especially for tires used under heavy load, including off-the-road radial tires (ORR), truck-and-bus radial tires (TBR), and run-flat tires being driven while punctured (driven under an internal pressure of 0 kPa).

For example, when a run-flat tire having crescent-shaped sidewall reinforcing layers is driven while punctured, deformation in the tire radial direction concentrates on the sidewall reinforcing layers. Consequently, the temperature in the sidewall reinforcing layers rises so high as to affect durability considerably.

A technique has been disclosed for reducing the tire temperature in such a pneumatic tire (Japanese Patent Application Publication No. 2006-76431). In the technique, a reinforcing member is provided to mitigate or suppress deformation of components of the pneumatic tire (such as, particularly, a carcass layer at a part located at a sidewall part and a bead part).

However, the conventional pneumatic tire described above has a problem of degrading general driving performance, such as handling stability and ride comfort. This is because provision of the reinforcing member leads to an increase in the tire weight and to an occurrence of new unintended breakage such as separation at the reinforcing member. Particularly, in the run-flat tire, there is a concern that the reinforcing member increases vertical springing (elasticity in the tire vertical direction) of the tire driven at a normal internal pressure, resulting in degradation in general driving performance. A measure not impairing the general driving performance has therefore been sought.

The present invention has been made in consideration of such circumstances, and has an objective of providing a pneumatic tire capable of reducing the tire temperature efficiently while maintaining general driving performance.

DISCLOSURE OF THE INVENTION

On the basis of the above circumstances, the inventors analyzed an efficient reduction in the tire temperature. As a result, it was found that the heat dissipation rate of the tire temperature was increased by increasing a velocity gradient (rate) of fluid generated around a pneumatic tire along with rotation of the pneumatic tire.

The present invention therefore has the following aspects. Firstly, a first aspect of the present invention is a pneumatic tire summarized as follows. Specifically, the pneumatic tire has turbulence generating protrusions on a tire surface, each of the turbulence generating protrusions having a sharp edge part. In the pneumatic tire, the following relationships are satisfied: $0.015 \leq H/\sqrt{R} \leq 0.64$; $1.0 \leq p/H \leq 50.0$; $1.0 \leq H/e \leq 3.0$; $1.0 \leq L/H \leq 50.0$; and $1.0 \leq (p-w)/w \leq 100.0$, where "R" is a tire radius being a distance from a rim center to an outermost position in a tread radial direction, "H" is a protrusion maximum height being a distance from the tire surface to a position at which each turbulence generating protrusion protrudes farthest from the tire surface, "p" is a protrusion circumferential-direction interval being an interval between the turbulence generating protrusions adjacent in a tire rotation direction, "e" is a protrusion radial-direction interval being an interval between the turbulence generating protrusions adjacent in a rotation orthogonal direction substantially orthogonal to the tire rotation direction, "L" is a protrusion radial-direction length being a maximum length of each turbulence generation protrusion in the rotation orthogonal direction, and "A" is a protrusion circumferential-direction length being a maximum length of each turbulence generation protrusion in the tire rotation direction.

Note that the tire surface includes an outer face of the tire (e.g., outer surfaces of a tread part and a sidewall part) and an inner face of the tire (e.g., an inner surface of an inner liner). In addition, the configurations of each protrusion are all expressed in millimeters (mm).

Another aspect of the present invention is summarized in that an average arrangement density (ρ) of the turbulence generating protrusions is 0.0008 to 13 pieces/cm².

Another aspect of the present invention is summarized in that the average arrangement density (ρ) of the turbulence generating protrusions decreases gradually from an inner side in a tire radial direction toward an outer side in the tire radial direction.

Another aspect of the present invention is summarized in that the turbulence generating protrusions are arranged at predetermined intervals in respective directions: a direction in which the turbulence is generated to flow in a direction opposite to the tire rotation direction; and a direction orthogonal to the turbulence, and are arranged in a staggered manner in which the turbulence generating protrusions adjacent in the turbulence generation direction are arranged at respective positions shifted from each other.

Another aspect of the present invention is summarized in that a protrusion circumferential-direction center line (CL') inclines relative to the tire rotation direction by 10° to 20°, with a rear side thereof in the tire rotation direction being outward, in the tire radial direction, from a front side thereof in the tire rotation direction, the protrusion circumferential-direction center line (CL') being a line that connects centers of the respective turbulence generating protrusions adjacent in the tire rotation direction.

Another aspect of the present invention is summarized in that, in a protrusion top view being a view in which each turbulence generating protrusion is viewed from top, a front face of the turbulence generating protrusion curves at least partially, the front face being located frontward, in the tire rotation direction, of a protrusion radial-direction center line (CL). Moreover, a front angle (θ1) and a rear angle (θ2) are each set to a value between 45° and 135°, inclusive, the front angle (θ1) being an angle formed between the tire surface and the front face, the rear angle (θ2) being an angle formed between the tire surface and a rear face located rearward, in the tire rotation direction, of the protrusion radial-direction center line (CL).

Another aspect of the present invention is summarized in that, in a protrusion top view being a view in which each turbulence generating protrusion is viewed from top, a front convex part is provided frontward, in the tire rotation direction, of the protrusion radial-direction center line (CL), the front convex part protruding frontward in the tire rotation direction.

Another aspect of the present invention is summarized in that, in a protrusion top view being a view in which each turbulence generating protrusion is viewed from top, a front face located frontward, in the tire rotation direction, of the protrusion radial-direction center line (CL) has a front inner point (Q1) located at an innermost position in a tire radial direction, and a front outer point (Q2) located at an outermost position in the tire radial direction, the front inner point (Q1) being located frontward, in the tire rotation direction, of the front outer point (Q2).

Another aspect of the present invention is summarized in that, in a protrusion top view being a view in which each turbulence generating protrusion is viewed from top, at least one of a rear convex part and a rear concave part is provided rearward, in the tire rotation direction, of the protrusion radial-direction center line (CL), the rear convex part protruding rearward in the tire rotation direction, the rear concave part being concave frontward in the tire rotation direction.

Another aspect of the present invention is summarized in that an inner angle (θ3) and an outer angle (θ4) are each set to a value between 45° and 135°, inclusive, the inner angle (θ3) being an angle formed between the tire surface and an inner face located at an innermost position in a tire radial direction, the outer angle (θ4) being an angle formed between the tire surface and an outer face located at an outermost position in the tire radial direction.

Another aspect of the present invention is summarized in that a front maximum angle (θ5) and a rear maximum angle (θ6) are each set to a value between 45° and 135°, inclusive, the front maximum angle (θ5) being an angle formed between a most-protruded position and a position where the tire surface intersects with a front face located frontward, in the tire rotation direction, of the protrusion radial-direction center line (CL), the most-protruded position protruding farthest from the tire surface, the rear maximum angle (θ6) being an angle formed between the most-protruded position and a position where the tire surface intersects with a rear face located rearward, in the tire rotation direction, of the protrusion radial-direction center line (CL).

Another aspect of the present invention is summarized in that an inner maximum angle (θ7) and an outer maximum angle (θ8) are each set to a value between 45° and 135°, inclusive, the inner maximum angle (θ7) being an angle formed between a most-protruded position and a position where the tire surface intersects with an inner part located at an innermost position in a tire radial direction, the most-protruded position protruding farthest from the tire surface, the outer maximum angle (θ8) being an angle formed between the most-protruded position and a position where the tire surface intersects with an outer part located at an outermost position in the tire radial direction.

BEST MODES FOR CARRYING OUT THE INVENTION

Next, examples of a pneumatic tire according to the present invention will be described with reference to the drawings. Throughout the drawings, the same or like parts bear the same or like reference symbols. It should be noted, however, that the drawings are schematic, and that the dimensional proportions and the like are different from their actual values. Accordingly, specific dimensions and the like should be judged based on the description given below. Moreover, there are portions where dimensional relationships and dimensional proportions differ from one drawing to another, of course.

First Embodiment (Configuration of Pneumatic Tire)

Figure 1:
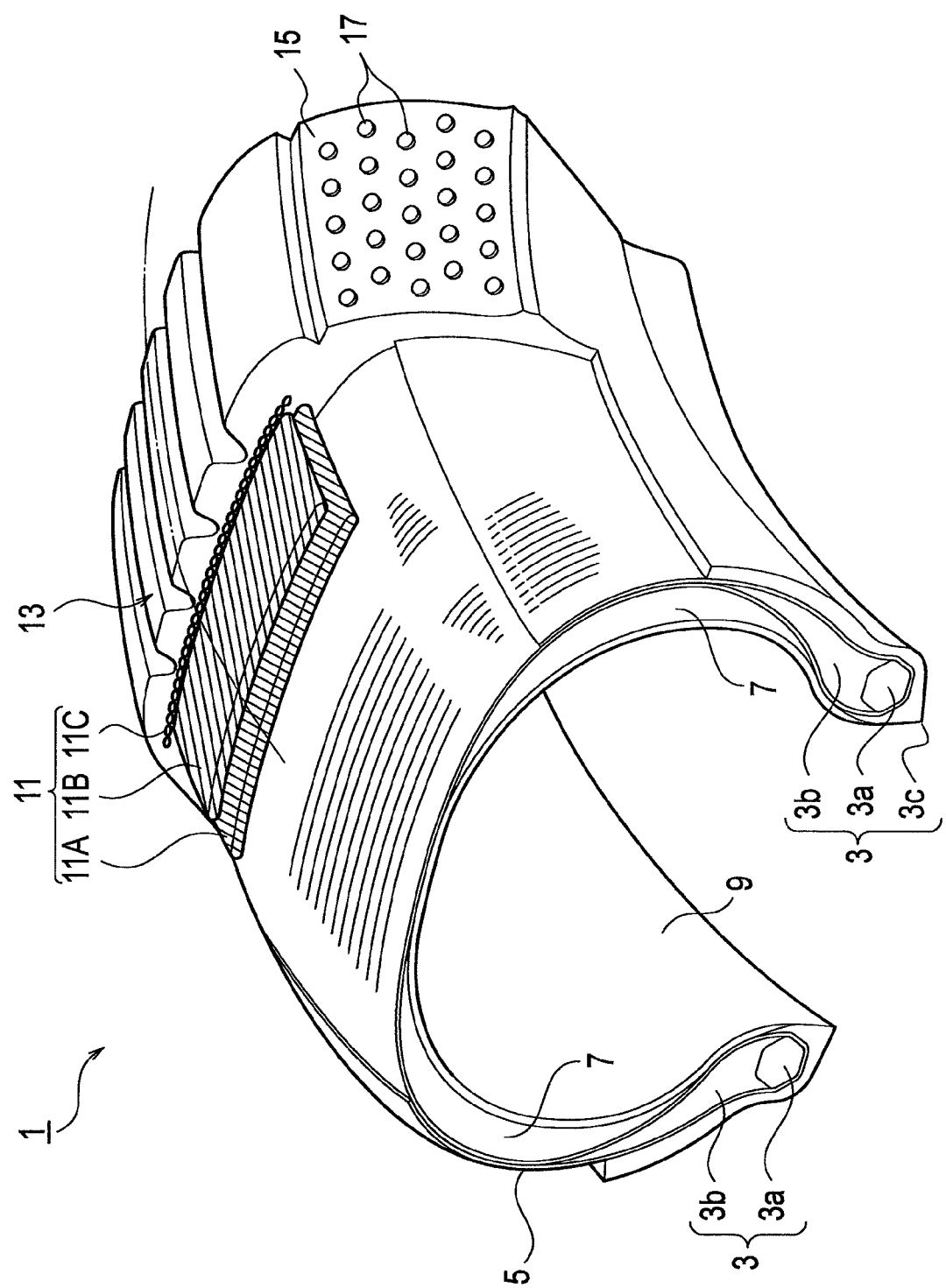
FIG. 1 is a partially-exploded perspective view showing a pneumatic tire according to a first embodiment.
Figure 2:
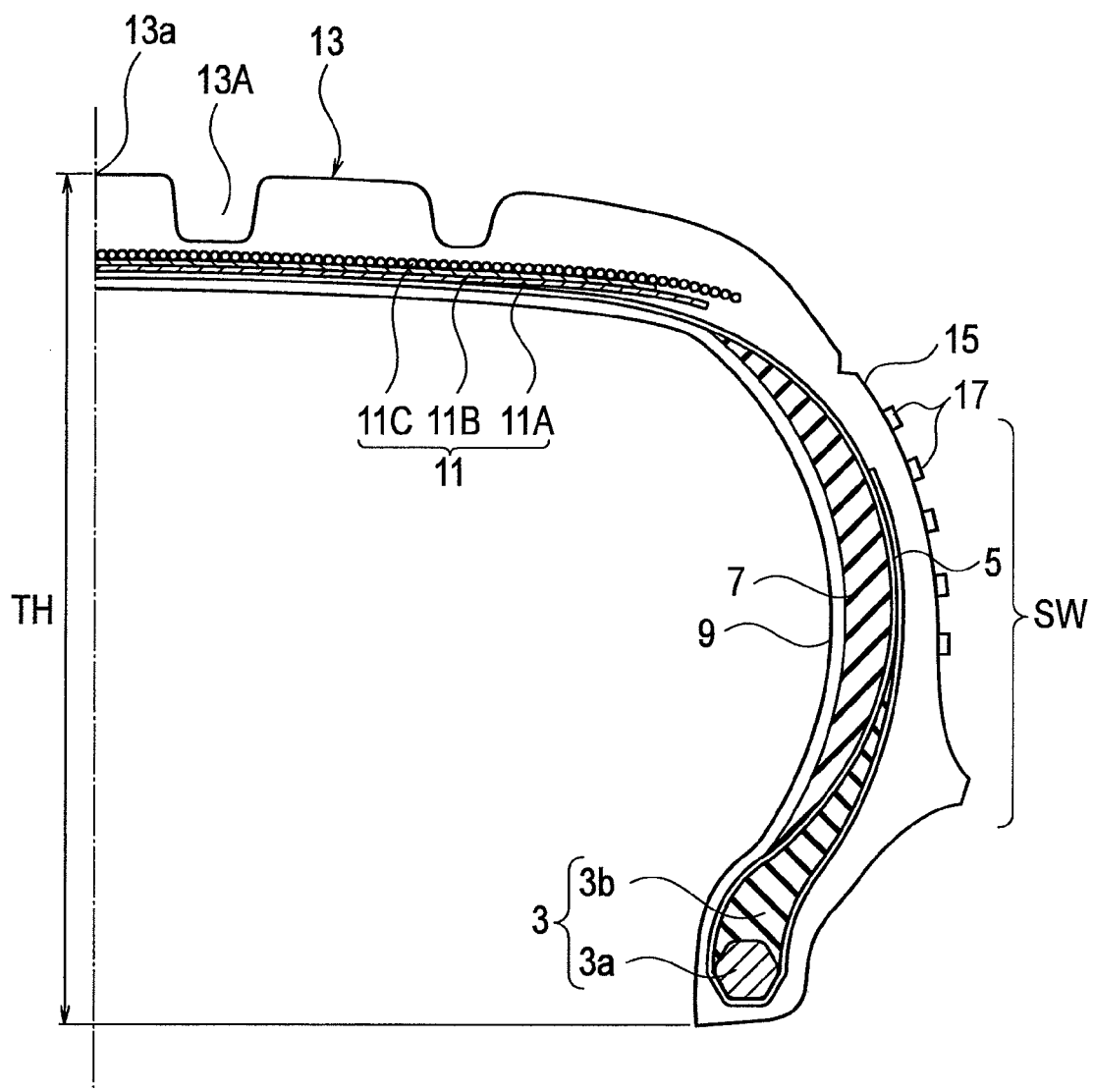
FIG. 2 is a cross-sectional view showing the pneumatic tire according to the first embodiment, taken in a tread width direction.

First, with reference to FIGS. 1 and 2, a description will be given of the configuration of a pneumatic tire according to a first embodiment. FIG. 1 is a partially-exploded perspective view of the pneumatic tire according to the first embodiment. FIG. 2 is a cross-sectional view of the pneumatic tire according to the first embodiment, taken in a tread width direction. Note that the pneumatic tire in this embodiment is a passenger-car radial tire (PCR).

As FIGS. 1 and 2 show, a pneumatic tire 1 has a pair of bead parts 3. Each of the bead parts 3 includes at least a bead core 3a, a bead filler 3b, and a bead toe 3c. The pneumatic tire 1 also has a carcass layer 5 in a toroid shape. Specifically, the carcass layer 5 bends around each of the bead cores 3a from the inner side in the tread width direction to the outer side in the tread width direction, and then extends by each of sidewall parts SW.

Sidewall reinforcing layers 7 are formed inward, in the tread width direction, of the carcass layer 5 to reinforce the respective sidewall parts SW. The sidewall reinforcing layers 7 are formed in a crescent-shape in the cross section taken in the tread width direction. An inner liner 9 is provided inward, in the tread width direction, of the sidewall reinforcing layers 7. The inner liner 9 is a highly-airtight rubber layer, which is equivalent to a tube.

A belt layer 11 is provided outward, in a tire radial direction, of the carcass layer 5. The belt layer 11 is formed of a first belt layer 11a, a second belt layer 11b, and a circumferential-direction belt layer 11c. In each of the first and second belt layers 11a and 11b, codes are arranged inclining relative to a tire circumferential direction. In the circumferential-direction belt layer 11c, codes are arranged substantially parallel to the tire circumferential direction.

A tread part 13 to be in contact with a road surface is provided outward, in the tire radial direction, of the belt layer 11. Further, multiple turbulence generating protrusions (called protrusions 17 below) for generating turbulence are formed on each of the sidewall parts SW. The protrusions 17 protrude from a tire surface 15 (which is a surface of the sidewall part SW).

(Configurations of Protrusions)

Figure 3:
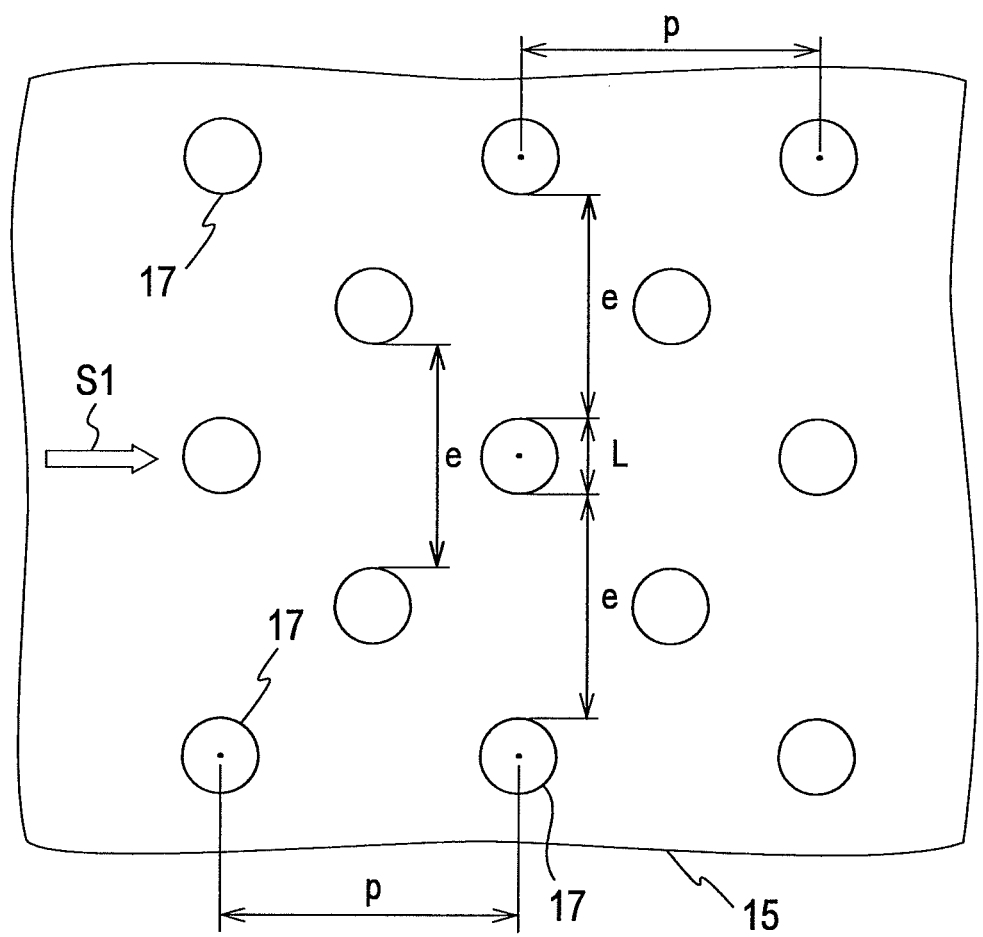
FIG. 3 is a chief-part plan view showing the arrangement state of protrusions according to the first embodiment (part 1).
Figure 4:
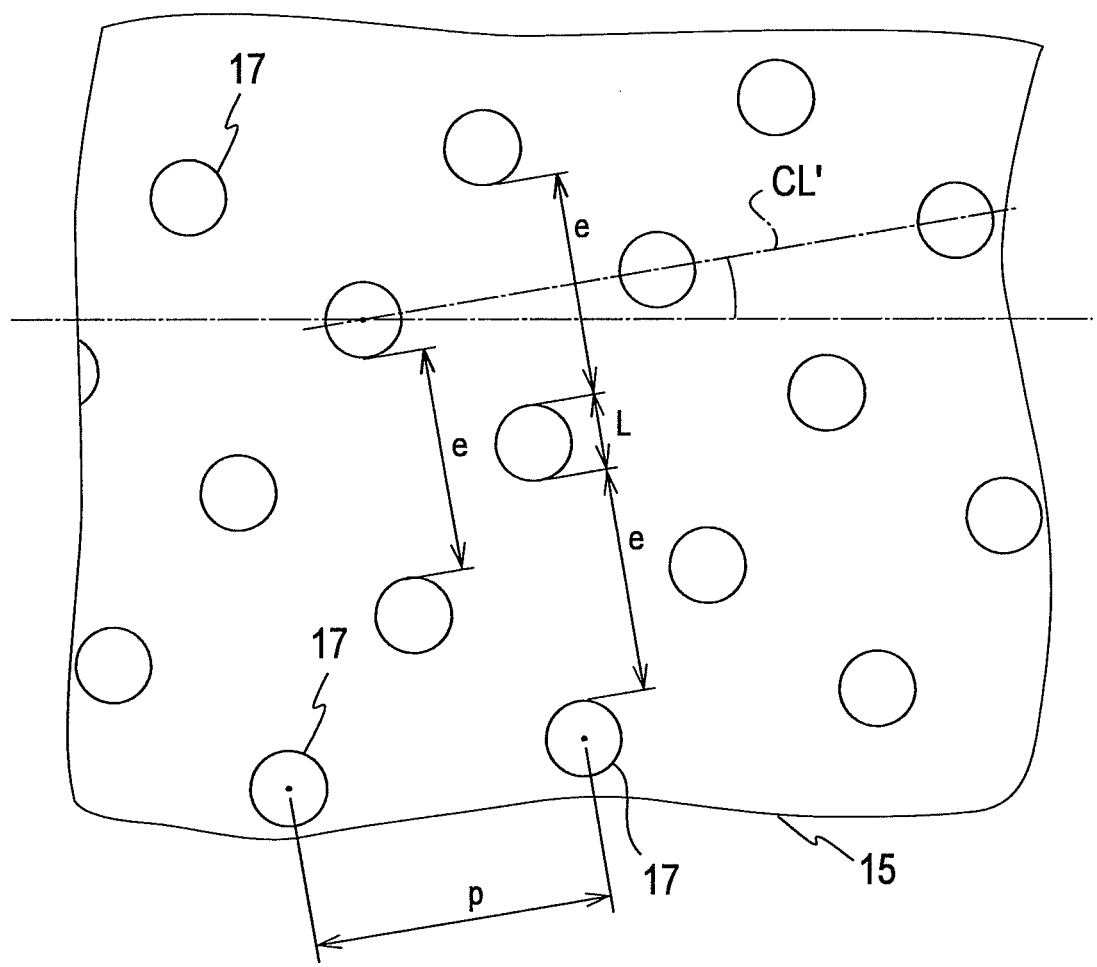
FIG. 4 is a chief-part plan view showing the arrangement state of the protrusions according to the first embodiment (part 2).
Figure 5:
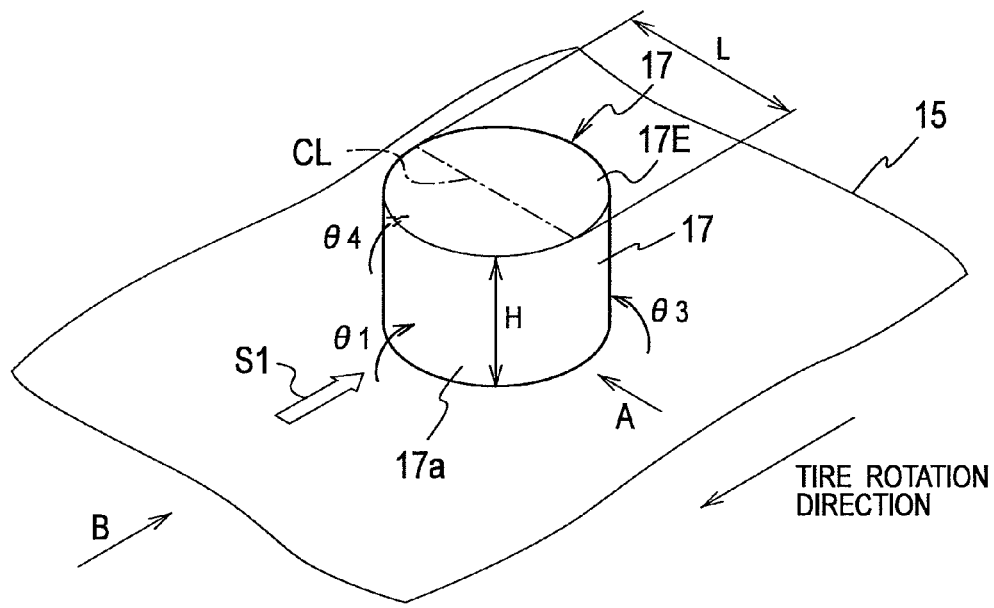
FIG. 5 is a perspective view showing the protrusion according to the first embodiment (part 1).
Figure 6:
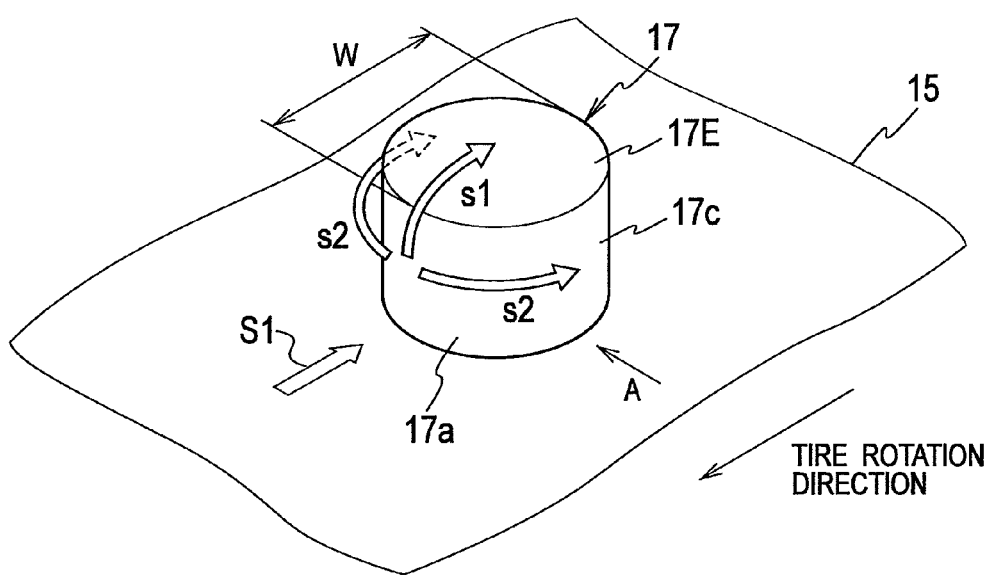
FIG. 6 is a perspective view showing the protrusion according to the first embodiment (part 2).
Figure 7:
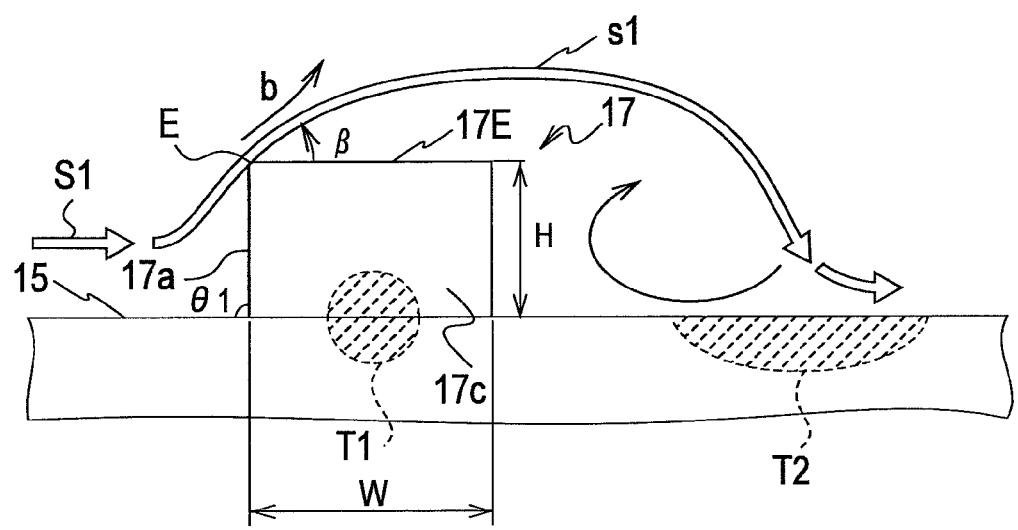
FIG. 7 is a side view and a top view showing the protrusion according to the first embodiment (part 1).
Figure 7:
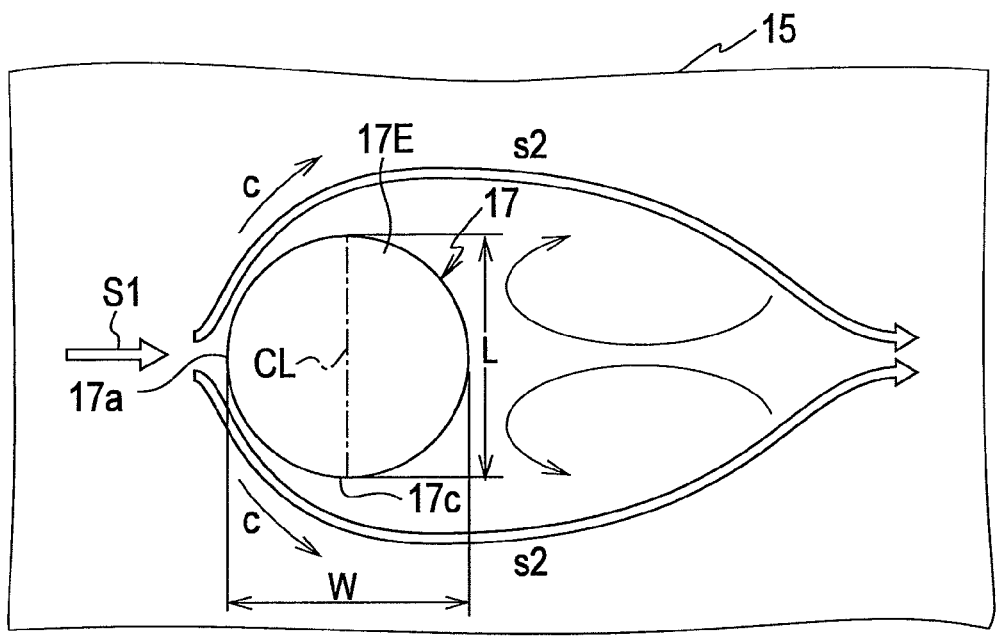
Figure 8:
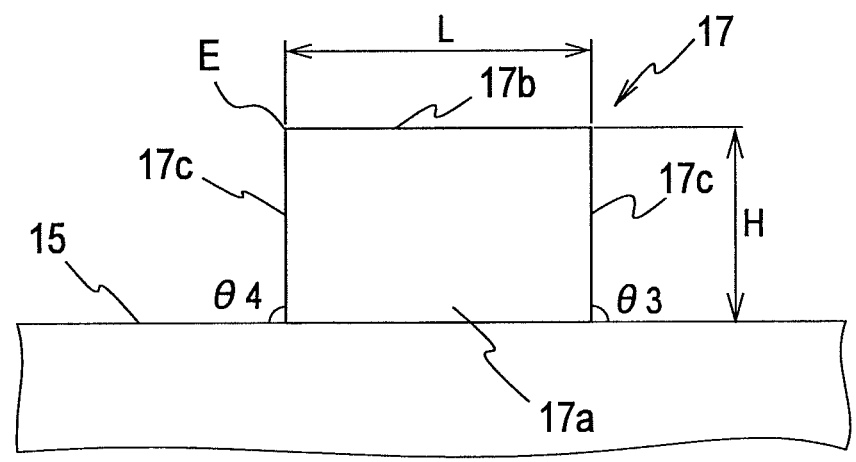
FIG. 8 is a side view showing the protrusion according to the first embodiment.
Figure 9:
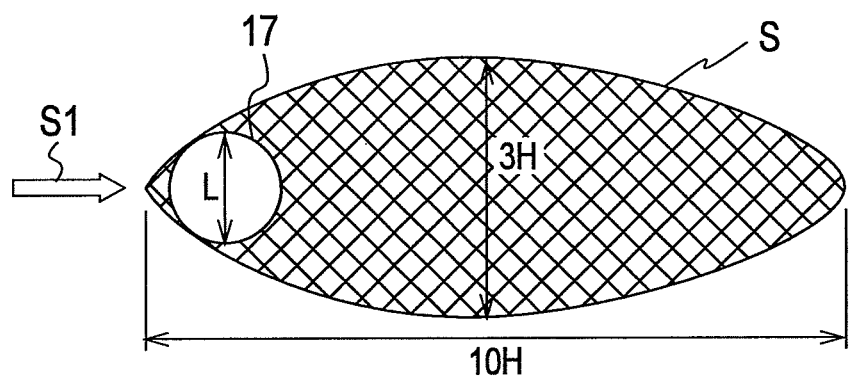
FIG. 9 is a top view showing the vicinity of the protrusion according to the first embodiment.

Next, the configuration (including arrangement and density) of the aforementioned protrusions will be described with reference to FIGS. 3 to 9. FIGS. 3 and 4 are chief-part plan views each showing the arrangement state of the protrusions according to the first embodiment. FIGS. 5 and 6 are perspective views each showing the protrusion according to the first embodiment. Part (a) of FIG. 7 and FIG. 8 are side views each showing the protrusion according to the first embodiment seen in the tire radial direction (views seen in the arrow A of FIG. 5). Part (b) of FIG. 7 and FIG. 9 are top views each showing the protrusion according to the first embodiment (B-B cross-sectional views of FIG. 5).

As FIGS. 3 to 9 show, each protrusion 17 is formed almost in a cylinder shape having a sharp edge part E. As FIG. 3 shows, the protrusions 17 are arranged at predetermined intervals (a circumferential-direction interval p and a radial-direction interval e) in respective directions: a direction in which turbulence (main flow S1) is generated to flow in a direction opposite to a tire rotation direction and a direction orthogonal to the turbulence. In addition, the protrusions 17 adjacent in the turbulent generation direction are arranged at positions shifted from each other (in the drawing, by e/2 shift). In other words, the protrusions 17 are arranged in a staggered manner.

Particularly, considering that rotation of the pneumatic tire applies a centrifugal force to the main flow S1, it is preferable, as FIG. 4 shows, that a protrusion circumferential-direction center line (CL') should incline relative to the tire rotation direction by 10° to 20°, with its rear side in the tire rotation direction being outward, in the tire radial direction, from its front side in the tire rotation direction. Here, the protrusion circumferential-direction center line (CL') is a line connecting the centers of the protrusions 17 adjacent in the tire rotation direction.

When heat only in the surface of the bead part 3 is to be dissipated, the protrusions 17 may be formed only inward, in the tire radial direction, of a tire maximum width position (i.e., on the bead part 3 side). When, on the other hand, heat only in the vicinity of the belt layer 11 having many layers is to be dissipated, the protrusions 17 may be formed only outward, in the tire radial direction, of the tire maximum width position (i.e., on the tread part 13 side).

For each of the protrusions 17, there is a set relationship between a tire radius (R) and a protrusion maximum height (H). Here, the tire radius (R) is a distance from a rim center to an outermost position in a tread radial direction, and the protrusion maximum height (H) is a height of the protrusion 17 from the tire surface 15 to a most-protruded position (protrusion face 17E) where the protrusion 17 protrudes farthest from the tire surface 15. Specifically, the relationship $0.015 \leq H/\sqrt{R} \leq 0.64$ is satisfied, where "R" is the tire radius, and "H" is the protrusion maximum height. It is especially preferable to set the tire radius (R) and the protrusion maximum height (H) in the range of $0.03 \leq H/\sqrt{R} \leq 0.26$.

Figure 37:
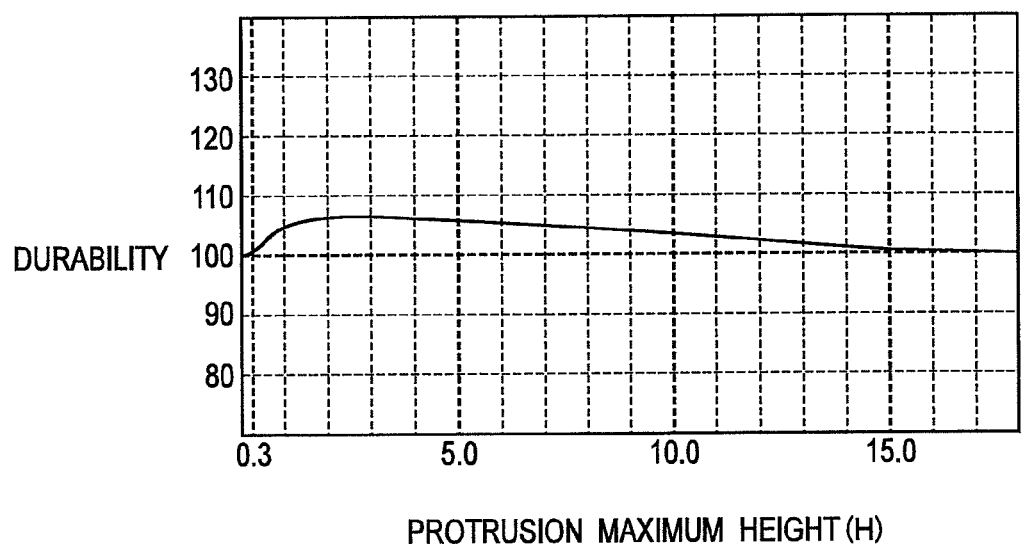
FIG. 37 is a graph showing durability of the pneumatic tires of the examples according to the second embodiment (part 2).

Here, it has been found that the protrusion maximum height (H) should preferably be set to a value between 0.3 mm and 15 mm, inclusive ($0.3 \leq H \leq 15$) in order to take full advantage of the characteristics and durability of the protrusions 17 (see FIG. 37). It is especially preferable to set the protrusion maximum height (H) to a value between 0.5 mm and 5 mm, inclusive, in order to facilitate dissipation of temperature of a basal part T1 (see part (a) of FIG. 7) of the protrusion 17 to the tire surface 15, and change of the flow of fluid passing by around the protrusion 17.

The protrusion maximum height (H) smaller than 0.3 mm is inadequate to change the flow of fluid passing by around the protrusion 17, thereby possibly failing to reduce the tire temperature efficiently. On the other hand, the protrusion maximum height (H) larger than 15 mm is inadequate to suppress a temperature increase in the basal part T1 of the protrusion 17, thereby possibly failing to reduce the tire temperature efficiently.

The tire radius (R) of the pneumatic tire 1 can be obtained by substituting the minimum value (0.3 mm) or the maximum value (15 mm) of the protrusion maximum height (H) into the relational expression $0.015 \leq H/\sqrt{R} \leq 0.64$. In other words, from the tire radius (R) of the pneumatic tire 1, the minimum value and the maximum value of the protrusion maximum height (H) suitable for that pneumatic tire 1 can be obtained. Note that the tire radius (R) can be of, besides the passenger-car radial tire (PCR), heavy load tires such as a truck and bus radial tire (TBR) and a radial tire for a construction vehicle (ORR).

Moreover, for the protrusions 17, there is a set relationship between the protrusion maximum height (H) described above and the protrusion circumferential-direction interval (p). Here, the protrusion circumferential-direction interval (p) is an interval between the protrusions 17 adjacent in the tire rotation direction. Specifically, the relationship $1.0 \leq p/H \leq 50.0$ is satisfied, where "H" is the protrusion maximum height, and "p" is the protrusion circumferential-direction interval. It is especially preferable to set the protrusion maximum height (H) and the protrusion circumferential-direction interval (p) in the range of $2.0 \leq p/H \leq 24.0$.

Figure 10:
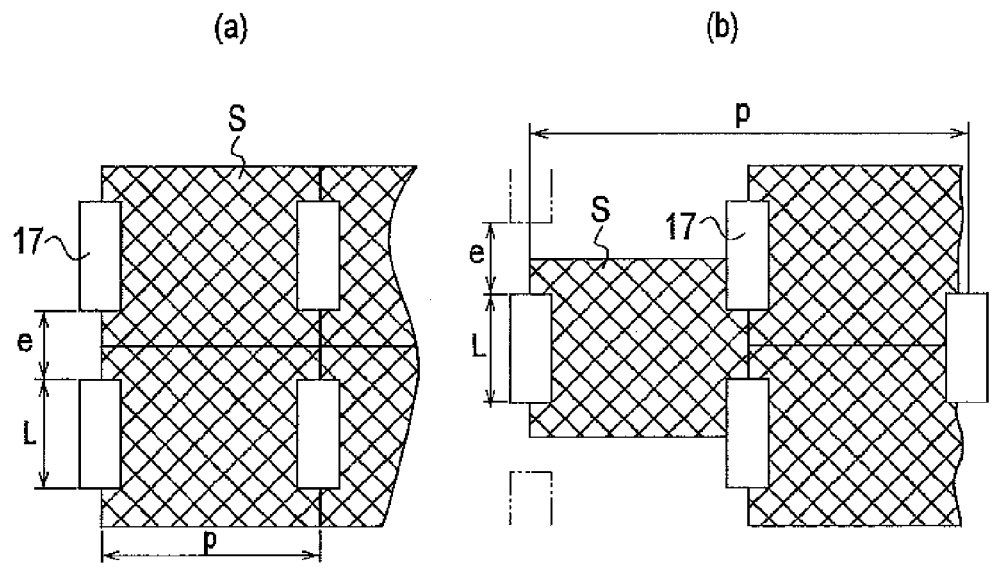
FIG. 10 is a schematic top view showing the protrusion according to the first embodiment.

As parts (a) and (b) of FIG. 10 show, the protrusion circumferential-direction interval (p) indicates a distance between a point bisecting the central width of one protrusion 17 and a point bisecting the central width of an adjacent protrusion 17. Accordingly, "p/H" is measured at a position on a protrusion radial-direction center line (CL) which is a line passing the center of the width, in the tire rotation direction, of the protrusion 17 and is substantially perpendicular to the tire rotation direction. Specifically, the position is at the middle, on the protrusion radial-direction center line CL, between positions which are innermost and outermost, in the tire radial direction, of the protrusion 17.

If (p/H), namely a value of a ratio of the protrusion maximum height (H) to the protrusion circumferential-direction interval (p), is smaller than 1.0, turbulence flowing in a direction substantially perpendicular to the tire surface 15 (so-called downflow) does not collide with the tire surface 15 between the protrusions 17. Consequently, the tire temperature cannot be reduced efficiently. On the other hand, if (p/H), namely a value of a ratio of the protrusion maximum height (H) to the protrusion circumferential-direction interval (p), is larger than 50.0, turbulence having flowed over a first protrusion 17 reduces its acceleration between the protrusions 17. Consequently, the tire temperature cannot be reduced efficiently.

The protrusion circumferential-direction interval (p) can be obtained by substituting the minimum value (0.3 mm) or the maximum value (15 mm) of the protrusion maximum height (H) into the relational expression $1.0 \leq p/H \leq 50.0$. Therefore, the protrusion circumferential-direction interval (p) and the protrusion maximum height (H) satisfy the relationship $1.0H \leq p \leq 50.0H$. Naturally, when the protrusion maximum height (H) is the maximum value (i.e., when the tire radius (R) is large), the protrusion circumferential-direction interval (p) is in the range of $15 \leq p \leq 750$.

Moreover, for the protrusions 17, there is a set relationship between the protrusion maximum height (H) described above and a protrusion radial-direction interval (e). Here, the protrusion radial-direction interval (e) is an interval between the protrusions 17 adjacent in a rotation perpendicular direction substantially perpendicular to the tire rotation direction. Specifically, the relationship $0.1 \leq H/e \leq 3.0$ is satisfied, where "H" is the protrusion maximum height, and "e" is the protrusion radial-direction interval. The protrusion radial-direction interval (e) indicates a distance between an edge part, on the protrusion radial-direction centerline (CL), of one protrusion 17 and an edge part, on the protrusion radial-direction center line (CL), of another protrusion 17.

If (H/e), namely a value of a ratio of the protrusion radial-direction interval (e) to the protrusion maximum height (H), is smaller than 0.1, turbulence flowing in the direction substantially perpendicular to the tire surface 15 (so-called downflow) does not collide with the tire surface 15 between the protrusions 17. Consequently, the tire temperature cannot be reduced efficiently. On the other hand, if (H/e), namely a value of a ratio of the protrusion radial-direction interval (e) to the protrusion maximum height (H), is larger than 3.0, turbulence having flowed over a first protrusion 17 reduces its acceleration between the protrusions 17. Consequently, the tire temperature cannot be reduced efficiently.

The protrusion radial-direction interval (e) can be obtained by substituting the minimum value (0.3 mm) or the maximum value (15 mm) of the protrusion maximum height (H) into the relational expression $0.1 \leq H/e \leq 3.0$. Therefore, the protrusion maximum height (H) and the protrusion radial-direction interval (e) satisfy the relationship $0.1/H \leq e \leq 3.0/H$.

Moreover, for each of the protrusions 17, there is a set relationship between the protrusion maximum height (H) described above and a protrusion radial-direction length (L). Here, the protrusion radial-direction length (L) is a maximum length of the protrusion 17 in the rotation perpendicular direction (tire radial direction). Specifically, the relationship $1.0 \leq L/H \leq 50.0$ is satisfied, where "H" is the protrusion maximum height, and "L" is the protrusion radial-direction length. It is especially preferable to set the protrusion maximum height (H) and the protrusion radial-direction length (L) in the range of $1.0 \leq L/H \leq 20.0$.

If (L/H), namely a value of a ratio of the protrusion maximum height (H) to the protrusion radial-direction length (L), is smaller than 1.0, the strength of the protrusion 17 is so low that the protrusion 17 is vibrated by turbulence. Consequently, the durability of the protrusion 17 itself deteriorates. On the other hand, if (L/H), namely a value of a ratio of the protrusion maximum height (H) to the protrusion radial-direction length (L), is larger than 50.0, the protrusion 17 is so long in the rotation perpendicular direction that the protrusion 17 is inadequate to suppress the temperature increase in the basal part T1 of the protrusion 17 (see part (a) of FIG. 7). Consequently, the tire temperature cannot be reduced efficiently.

The protrusion radial-direction length (L) can be obtained by substituting the minimum value (0.3 mm) or the maximum value (15 mm) of the protrusion maximum height (H) into the relational expression $1.0 \leq L/H \leq 50.0$. Therefore, the protrusion maximum height (H) and the protrusion radial-direction length (L) satisfy the relationship $1.0H \leq L \leq 50.0H$. Naturally, when the protrusion maximum height (H) is the maximum value (i.e., when the tire radius (R) is large), the protrusion radial-direction length (L) is in the range of $15 \leq L \leq 750$.

Moreover, for the protrusions 17, there is a set relationship between the protrusion circumferential-direction interval (p) described above and a protrusion circumferential-direction length (w). Here, the protrusion circumferential-direction length (w) is a maximum length of the protrusion 17 in the tire rotation direction. Specifically, the relationship $1.0 \leq (p-w)/w \leq 100.0$ is satisfied, where "p" is the protrusion circumferential-direction interval, and "w" is the protrusion circumferential-direction length. It is especially preferable to set the protrusion circumferential-direction interval (p) and the protrusion circumferential-direction length (w) in the range of $4.0 \leq (p-w)/w \leq 39.0$. Here, "(p−w)w" is measured at a middle position, on the protrusion radial-direction center line (CL), between positions, which are innermost and outermost in the tire radial direction, of the protrusion 17.

If the relationship between the protrusion circumferential-direction interval (p) and the protrusion circumferential-direction length (w) is smaller than 1.0, a surface area of the protrusions 17 is so close to an equivalent to an area of a region whose heat is to be dissipated that the temperature in the protrusions 17 (accumulated temperature) cannot be reduced. On the other hand, if the relationship between the protrusion circumferential-direction interval (p) and the protrusion circumferential-direction length (w) is larger than 100.0, turbulence having flowed over a first protrusion 17 reduces its acceleration between the protrusions 17. Consequently, the tire temperature cannot be reduced efficiently.

Next, an average arrangement density ($\rho$) of the protrusions 17 will be described with reference to FIG. 10. FIG. 10 is a top schematic view showing the protrusions according to the first embodiment. Note that the average arrangement density ($\rho$) indicates an average density of the protrusions 17 arranged on an area obtained by adding a region between a position 10% from an edge to a position 90% from the edge of a tire height (TH) and a region within each groove 13A formed in the tread part 13 (in other words, an average density thereof arranged on an area except for the tread outermost position which comes in contact with a road surface). Here, the tire height (TH) is a distance from the bead toe 3c to a tread outermost position 13a in a cross section in the tread width direction.

A heat dissipation effective region (S) is a region from which heat is to be dissipated (or a region which is to be cooled) by turbulence generated by a single protrusion 17. As FIG. 10 shows, the heat dissipation effective region (S) is obtained in such a way that a value is obtained by adding the protrusion radial-direction length (L) and the protrusion radial-direction interval (e), and that the value is multiplied by the protrusion circumferential-direction interval (p). Therefore, the relationship $S=(L+e)p$ is satisfied.

The average arrangement density ($\rho$) of the protrusions 17 is a value of a ratio of the heat dissipation effective region (S) to a single protrusion 17. Therefore, there is a relationship of $\rho=1/S$. By adding this relational expression to the above-described relational expression of the heat dissipation effective region (S), an expression, $\rho=1/(L/e)p$, is obtained.

As already described, the protrusion circumferential-direction interval (p) is obtained based on the relational expression $1.0 \leq p/H \leq 50.0$. Similarly, a value of the protrusion radial-direction interval (e) is obtained based on the relational expression $0.1 \leq H/e \leq 3.0$. Accordingly, the inventors have discovered that, by incorporating the protrusion circumferential-direction interval (p) and the protrusion radial-direction interval (e) into $\rho=1/(L/e)p$, the protrusions 17 have the relationship $1/\{50H(L+10H)\} \leq \rho \leq 1/\{H(L+H/3)\}$.

As described above, the protrusion maximum height (H) and the protrusion radial-direction length (L) are obtained. The average arrangement density ($\rho$) of the protrusions 17 is preferably set in the range of 0.0008 to 13 pieces/cm². More preferably, the average arrangement density ($\rho$) of the protrusions 17 should be in the range of 0.1 to 13 pieces/cm², and even more preferably, in the range of 0.5 to 5 pieces/cm².

When the average arrangement density ($\rho$) of the protrusions 17 is smaller than 0.0008 piece/cm², an area in which turbulence generated by the protrusions is so small with respect to the area of the tire surface 15, that almost no heat dissipation effect can be expected from the protrusions 17. On the other hand, when the average arrangement density ($\rho$) of the protrusions 17 is larger than 13 pieces/cm², the protrusions 17 exhibit a heat accumulation effect more strongly than the heat dissipation effect.

The average arrangement density ($\rho$) of the protrusions may be uniform on the entire arrangement region. Alternatively, various other arrangement patterns may be employed, including, for example, one in which the average arrangement density ($\rho$) gradually decreases from the inner side in the tire radial direction toward the outer side in the tire radial direction.

(Operations and Effects According to First Embodiment)

First, when the pneumatic tire 1 having the protrusions 17 obtained based on the above relational expressions rotates, fluid (hereinafter called the main flow S1) flows, as FIG. 6 shows, near the tire surface 15 in a direction opposite to the tire rotation direction in a relative manner. The main flow S1 then collides with the protrusions 17.

Then, as parts (a) and (b) of FIG. 7 show, the main flow S1 having collided with a front wall face 17a of the protrusion 17 becomes turbulence by separately flowing as a top main flow s1 flowing above a top wall face 17b and as paired side main flows s2 flowing along left and right side wall faces 17c, respectively.

The turbulence can be generated because the sharp edge part E is formed at a portion connecting the front wall face 17a and the protrusion face 17E and at a portion connecting the side wall faces 17c and the protrusion face 17E. Here, the "sharp" edge does not necessarily have to be sharply pointed, and may be somewhat rounded due to manufacturing processes.

Since the main flow S1 flowing above the tire surface 15 becomes the turbulence in this way, heat is actively exchanged with the tire surface 15, as compared to fluid that flows regularly and smoothly above the tire surface 15.

With the average arrangement density ($\rho$) of the protrusions 17 of 0.0008 to 13 piece/cm², the heat dissipation effective regions S can be created on the tire surface 15 in a sufficiently large area. Moreover, the heat accumulation by the protrusions 17 can be reduced to some extent.

Moreover, the protrusions 17 are arranged in a staggered manner. Accordingly, even if fluid flowing in the perpendicular direction somewhat shifts its path, the fluid can surely collide with the tire surface 15 at the front (the front wall face 17a), in the tire rotation direction, of the protrusion 17 by which the fluid flows thereafter. Consequently, the tire temperature can be reduced further efficiently. Especially, the 10°-to-20° inclination of the protrusion circumferential-direction center line (CL') relative to the tire rotation direction allows consideration of the direction in which the main flow S1 flows when rotation of the pneumatic tire applies a centrifugal force.

Accordingly, the interval between the protrusions 17 in the direction of the main flow S1 can be twice as long as the interval therebetween in the direction orthogonal to the main flow S1 (turbulence). Among the main flow S1 having collided with the protrusion 17, the top main flow s1 flowing over the protrusion 17 forms downflow at the downstream of the protrusion 17 as described above. Even if the position of the downflow somewhat shifts to the downstream, the top main flow s1 surely collides with the tire surface 15 before the protrusion 17 at the downstream. Therefore, the downflow can surely accomplish a temperature reduction.

The following has been obtained about the heat dissipation effective region S both by experiments and by numerical calculation results. Specifically, as shown in FIG. 9, the length of the heat dissipation effective region S formed by a single protrusion 17 is 3H in a direction orthogonal to the main flow S1, that is, three times as long as the protrusion maximum height (H), and is 10H in the direction of the main flow S1, that is, ten times as long as the protrusion maximum height (H).

Further, a synergic effect is not exhibited when the heat dissipation effective regions S of multiple protrusions 17 overlap with each other. Also from a viewpoint of preventing heat accumulation, the number of protrusions 17 should be as small as possible. For these reasons, the protrusions 17 should preferably be arranged by the arrangement density employing the following intervals: 3H in the direction orthogonal to the main flow S1 and 10H in the direction of the main flow S1, and more preferably, 2H to 3H in the direction orthogonal to the main flow S1 and 6H to 10H in the direction of the main flow. Such arrangement density of the protrusions 17 exhibits the best heat exchange efficiency.

The temperature of fluid gradually increases along with the fluid passing by the protrusions 17, as a centrifugal force causes the fluid to flow obliquely outward in the tire radial direction, namely, toward the protrusion 17 located outward in the tire radial direction. Accordingly, the tire temperature can be reduced further efficiently by gradually decreasing the average arrangement density (ρ) of the protrusions 17 from the inner side in the tire radial direction toward the outer side in the tire radial direction. This is because, by passing by the protrusion 17 located on the inner side in the tire radial direction, fluid in a low temperature state slightly gains a temperature to have a temperature higher than that in the low temperature state, and then passes by the protrusion 17 located on the outer side in the tire radial direction.

When the average arrangement density (ρ) of the protrusions 17, as well as the tire radius (R), the protrusion maximum height (H), the protrusion circumferential-direction interval (p), the protrusion radial-direction interval (e), the protrusion radial-direction length (L), the protrusion circumferential-direction length (w) satisfy the above relationships, the main flow travels around all the protrusion circumferential-direction interval (p) and the protrusion radial-direction interval (e) as shown in FIG. 10. This allows active promotion of heat exchange with the tire surface 15 and a reduction in the heat accumulated in the protrusions 17. Note that, the protrusions 17 in FIG. 10 are schematically shown so that the heat dissipation effective regions S can be easily seen.

Moreover, the top main flow s1 can have an appropriate separation angle β from the protrusion 17 when a front angle (θ1) is 70° to 110°. Thus, the top main flow s1 becomes downflow, turns back to the downstream side of the protrusion 17, and collides with the tire surface 15. Thereby, heat is effectively exchanged with the tire surface 15. Consequently, the protrusions 17 provided on the tire surface 15 can surely accomplish a reduction in the tire temperature.

In addition, when an inner angle (θ3) and an outer angle (θ4) is set to a value between 70° and 110°, inclusive, among the main flow collided with the protrusion 17, the side main flows s2 flowing on the sides of the protrusion 17 form return flow at the downstream side of the protrusion 17. Thereby, the heat dissipation effective region S in which a certain heat dissipation effect can be expected is formed around the protrusion 17, and heat accumulation of the protrusion 17 can be reduced. Consequently, the protrusions 17 provided on the tire surface 15 can surely accomplish a reduction in the tire temperature.

Since the protrusions 17 each have an approximate cylinder shape, the inner angle (θ3) and the outer angle (θ4) are set to the same angle as the front angle (θ1), namely, set in the range of 70° to 110°. However, the inner angle (θ3) and the outer angle (θ4) may be set to an angle different from the front angle (θ1) as long as they are in the range of 70° to 110°.

Furthermore, the sidewall reinforcing layers 7 are provided, and the protrusions 17 are formed on the sidewall parts SW. Thereby, the tire temperature can be reduced efficiently at a part where a temperature is expected to increase drastically by deformation or the like (e.g., a part outward of the sidewall reinforcing layer in a punctured state). Accordingly, the durability can be improved as well.

(Modification 1 According to First Embodiment)

In the above description of the protrusion 17 according to the first embodiment, the protrusion 17 is shaped almost cylinder. However, the following modifications may be made. Note that the same parts as those of the protrusion 17 according to the above-described first embodiment bear the same reference symbols, and different points are mainly described.

Figure 11:
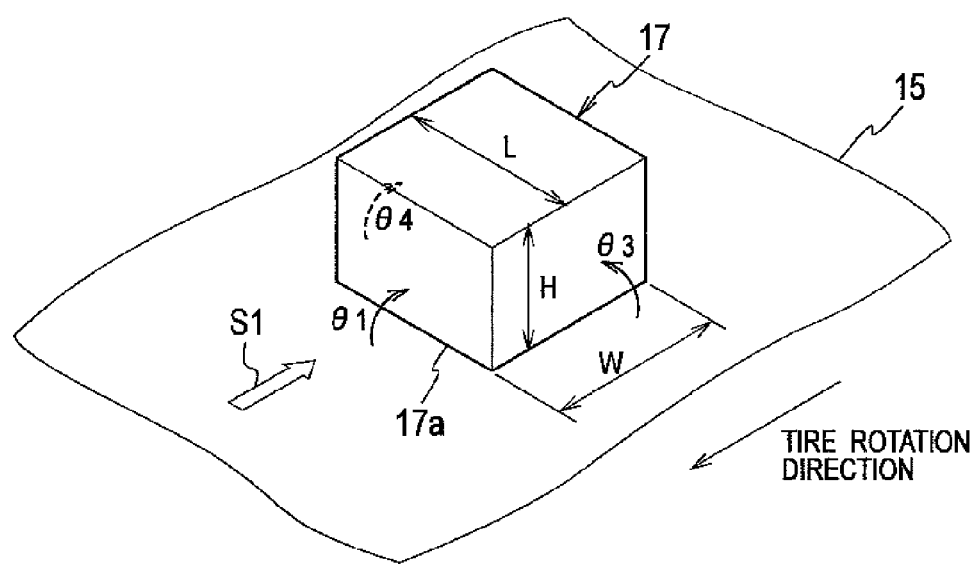
FIG. 11 is a perspective view showing the protrusion according to the first embodiment (part 3).

FIG. 11 is a perspective view showing a protrusion of Modification 1 according to the first embodiment. As FIG. 11 shows, a protrusion 17 is shaped as a square pole. Note that the protrusion 17 may employ various other shapes in addition to the cylinder shape and the square pole shape. Such alternative shapes will be described in the second and subsequent embodiments below.

Examples According to First Embodiment

Experiments on Arrangement Density of Protrusions

The protrusions are each made of rubber and mainly shaped as a cylinder or a square pole. The protrusions prepared had the protrusion radial-direction length (L) of various sizes in the range of 0.3 mm to 15 mm. The following experimental method was employed. Specifically, the aforementioned protrusions were arranged on a flat heater emitting a constant amount of heat, and the surface thereof was supplied with air by a blower. A heat transfer coefficient was calculated from the surface temperature and the atmospheric temperature acquired at this time. In this way, the characteristics chart shown in FIG. 12 was obtained with the heat transfer coefficient of a flat plate having no protrusions being evaluated as 100.

Figure 12:
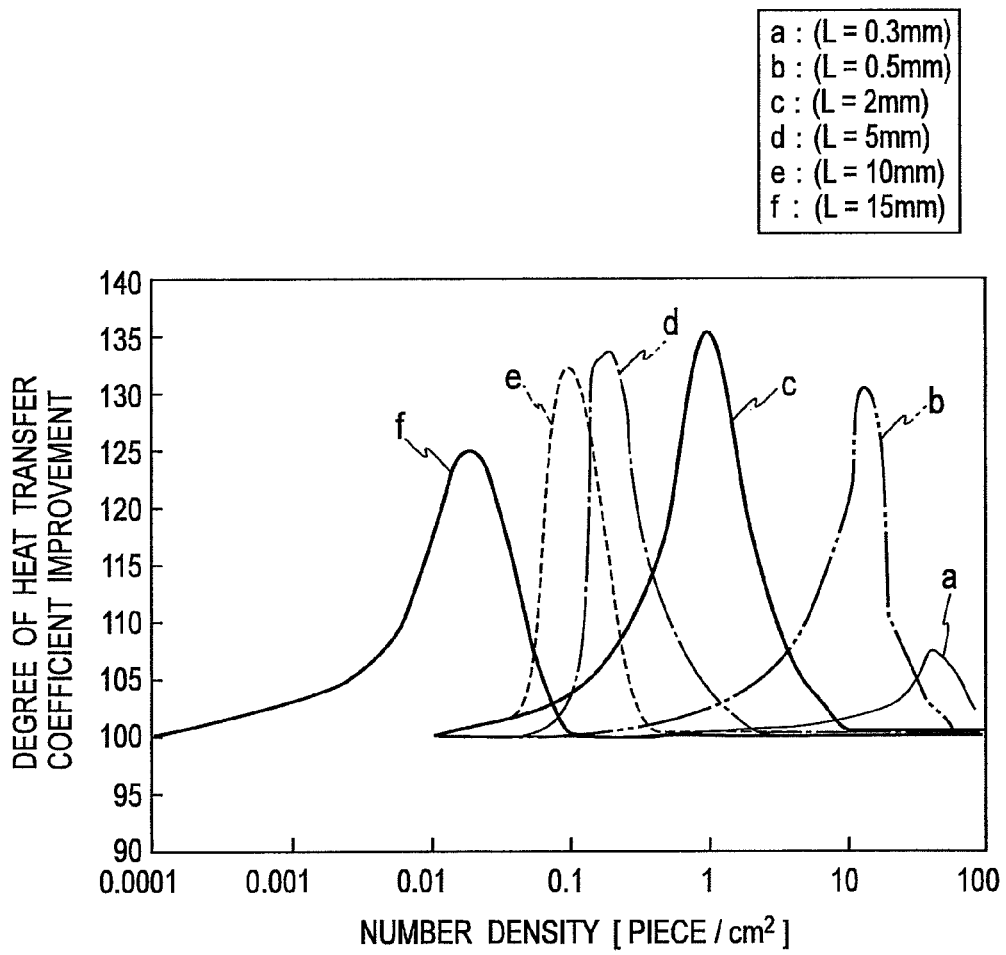
FIG. 12 is a characteristics chart showing an average arrangement density of the protrusions and a degree of heat transfer coefficient improvement, which are obtained by experiments according to the first embodiment.

The inventors have discovered that the heat transfer coefficient improves dramatically when the average arrangement density (ρ) of the protrusions 17 satisfies the relationship $1/\{50H(L+10H)\} \le \rho \le 1/\{H(L+H/3)\}$. Specifically, as FIG. 12 shows, the average arrangement density (ρ) that achieves the heat transfer coefficient improvement of 130 is in the range of 0.0008 to 13 pieces/cm². It was confirmed that the tire temperature was reduced by the protrusions 17 with the average arrangement density (ρ) in this range.

Note that FIG. 12 shows the average arrangement density (ρ) of each of cases (a to f) where the protrusion radial-direction length (L) is 0.3 mm, 0.5 mm, 2 mm, 5 mm, 10 mm, and 15 mm, respectively.

Next, a durability test was conducted using turbulence generation protrusions having different H/√R, p/H, H/e, L/H, (p−w)/w, and inclination angles of the staggered arrangement. The results are shown in FIGS. 13 to 18. The longitudinal axis of each graph shown in FIGS. 13 to 18 is the heat transfer coefficient obtained by measuring the temperature of the tire surface on which a certain amount of heat emitted by a heater applied with a constant voltage was being blown by a blower. Accordingly, the larger the heat transfer coefficient, the higher the cooling effect and the durability. Here, the heat transfer coefficient of a pneumatic tire provided with no protrusions (conventional example) is set to "100."

Figure 13:
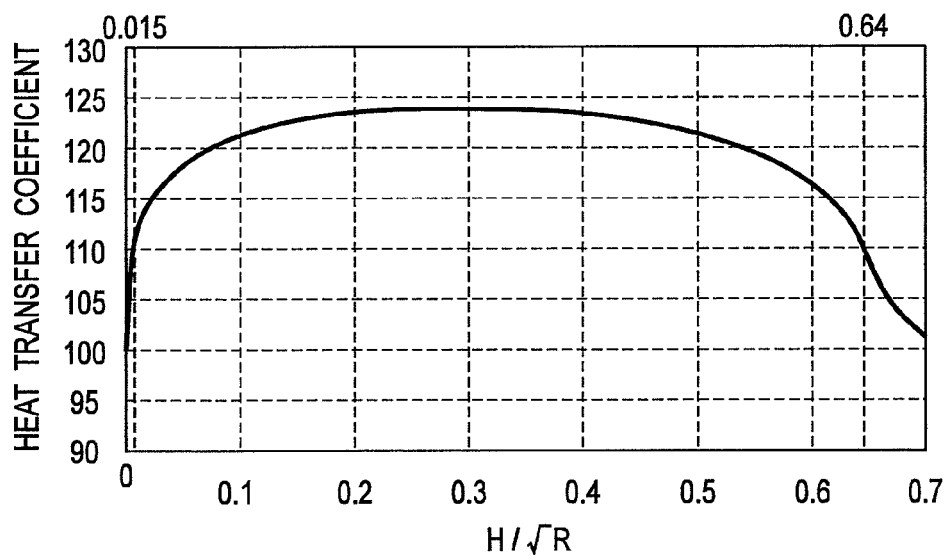
FIG. 13 is a graph showing a heat transfer coefficient of the pneumatic tire of examples according to the first embodiment (part 1).

Note that data on each of the pneumatic tires was acquired by measurement under the following conditions.
Tire Size: 285/50R20
Wheel Size: 8JJ×20
Internal Pressure Condition: 0 kPa (in a punctured state)
Load Condition: 0.5 kN
Speed Condition: 90 km/h As FIG. 13 shows, the heat transfer coefficient improves when the relationship between the tire radius (R) and the protrusion maximum height (H) satisfies $0.015 \leq H/\sqrt{R} \leq 0.64$. Accordingly, it was discovered that the protrusion maximum height (H) should preferably be set based on the tire size. Especially, FIG. 13 shows that the protrusion maximum height (H) should preferably be set in the range of $0.03 \leq H/\sqrt{R} \leq 0.26$.

Figure 14:
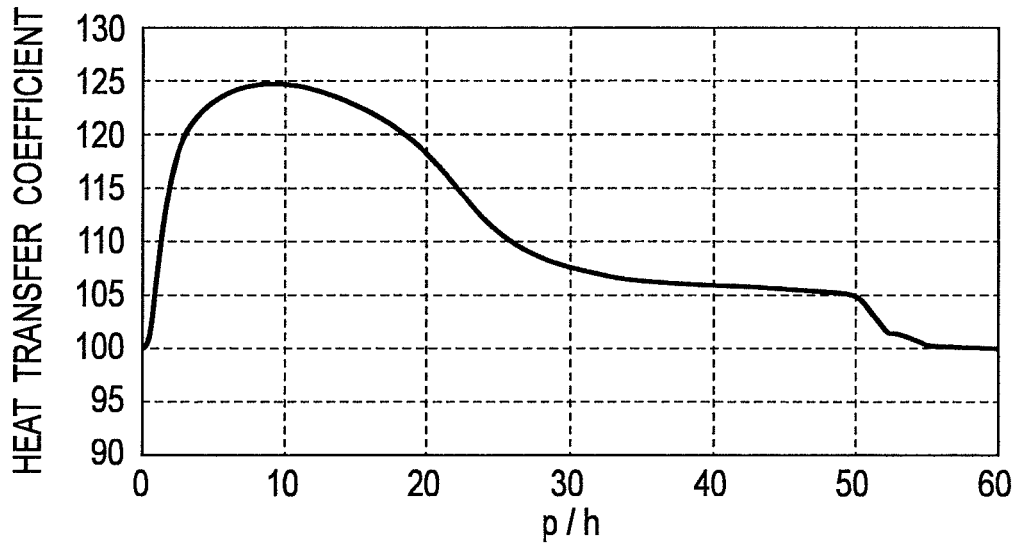
FIG. 14 is a graph showing a heat transfer coefficient of the pneumatic tire of the examples according to the first embodiment (part 2).

As FIG. 14 shows, the heat transfer coefficient improves when (p/H), namely, the relationship between the protrusion maximum height (H) and the protrusion circumferential-direction interval (p), satisfies $1.0 \leq p/H \leq 50.0$. Especially, by setting p/H in the range of $2.0 \leq p/H \leq 24.0$, the heat transfer coefficient improves more, and better durability is obtained.

Figure 15:
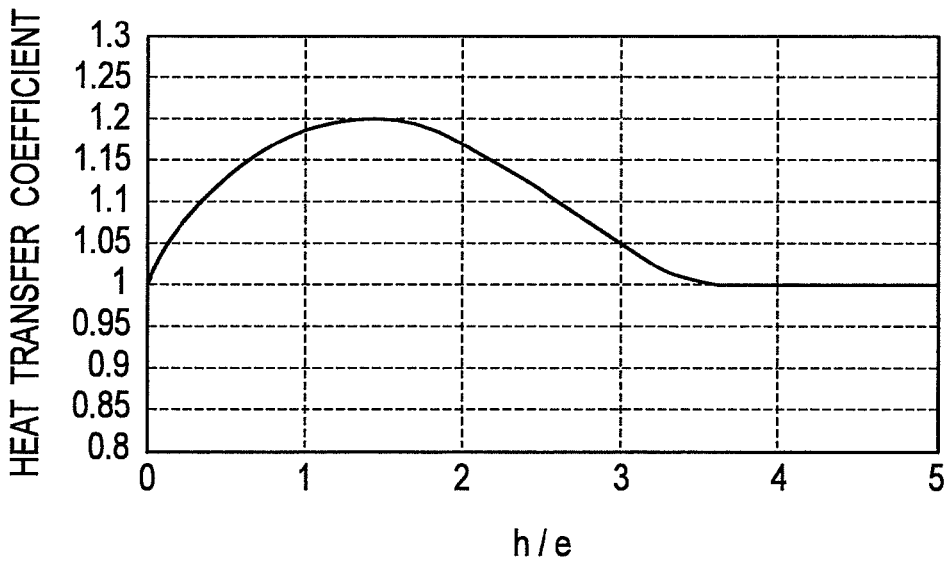
FIG. 15 is a graph showing a heat transfer coefficient of the pneumatic tire of the examples according to the first embodiment (part 3).

As FIG. 15 shows, the heat transfer coefficient improves when (H/e), namely, the relationship between the protrusion maximum height (H) and the protrusion radial-direction interval (e), satisfies $0.1 \leq H/e \leq 3.0$.

Figure 16:
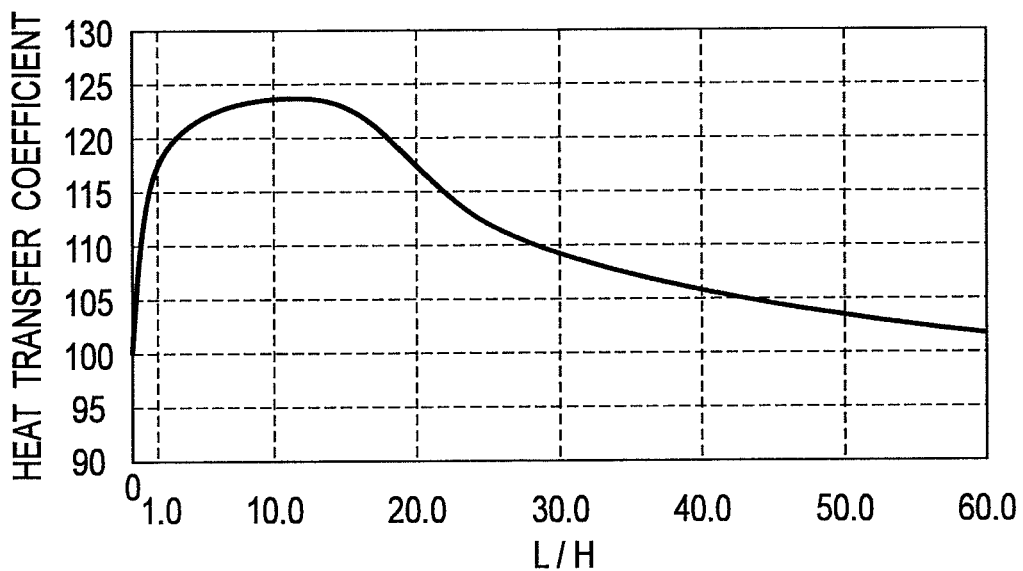
FIG. 16 is a graph showing a heat transfer coefficient of the pneumatic tire of the examples according to the first embodiment (part 4).

As FIG. 16 shows, the heat transfer coefficient improves when (L/H), namely, the relationship between the protrusion maximum height (H) and the protrusion radial-direction length (L), satisfies $1.0 \leq L/H \leq 50.0$. Especially, by setting L/H in the range of $1.0 \leq L/H \leq 20.0$, the heat transfer coefficient improves more, and better durability is obtained.

Figure 17:
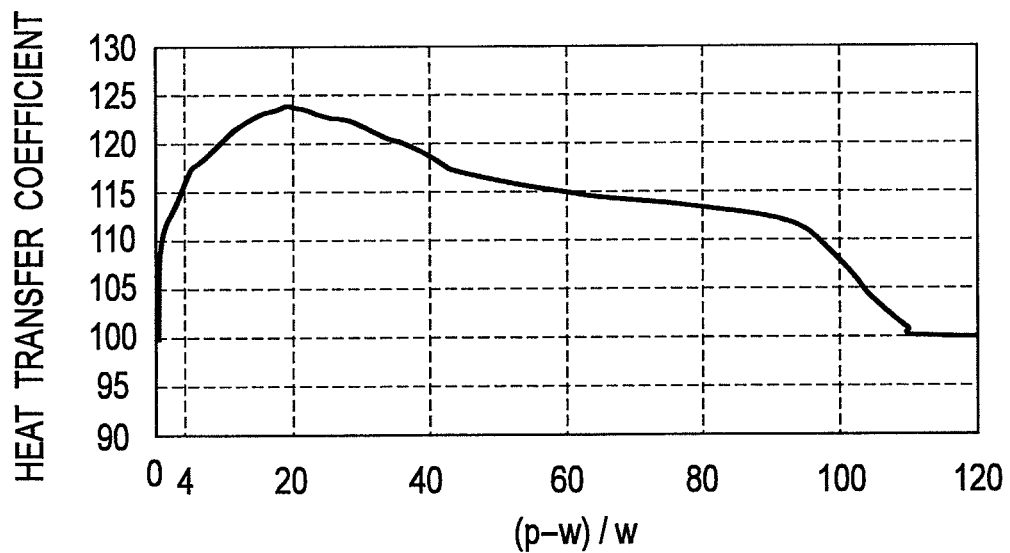
FIG. 17 is a graph showing a heat transfer coefficient of the pneumatic tire of the examples according to the first embodiment (part 5).

As FIG. 17 shows, the heat transfer coefficient improves when the relationship between (p−w)/w and a heat transfer coefficient (measured by the same method as the heat transfer coefficient described above) is set in the range of $1.0 \leq (p-w)/100.0$. Especially, by setting the relationship in the range of $4.0 \leq (p-w)/w \leq 39.0$, the heat transfer coefficient improves more, and better durability is obtained.

Figure 18:
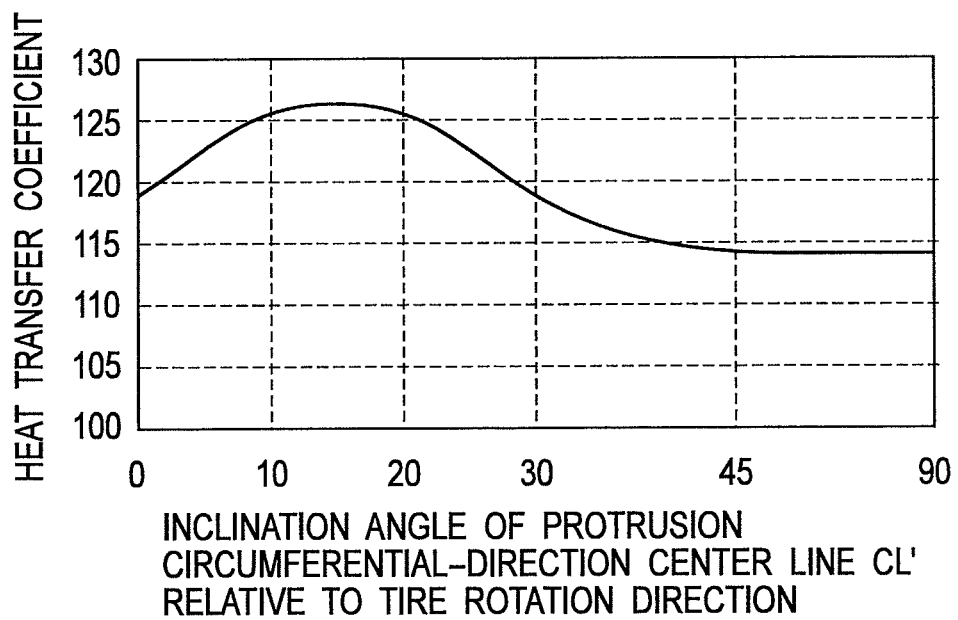
FIG. 18 is a graph showing a heat transfer coefficient of the pneumatic tire of the examples according to the first embodiment (part 6).

A centrifugal force generated by the rotation of the pneumatic tire accelerates the main flow. Accordingly, as FIG. 18 shows, the heat transfer coefficient improves by the 10°-to-20° inclination of the protrusion circumferential-direction center line (CL') relative to the tire rotation direction, with its rear in the tire rotation direction being shifted outward in the tire radial direction from the front in the tire rotation direction.

Next, experiments were conducted on the width of the protrusion and the angle of the front wall face of the protrusion. The protrusions had a cylindrical shape, and had the protrusion radial-direction length (L) of 2 mm, the protrusion maximum height (H) of various sizes in the range of 0.3 mm to 15 mm, the wall face angle (θ) of each of the front wall face and the side wall faces (the front angle θ1, the inner angle θ3, and the outer angle θ4) of 90°, and the arrangement density (ρ) of 0.8 piece/cm².

Data on each of the pneumatic tires was acquired by measurement under the following conditions.
Tire Size: 285/50R20
Wheel Size: 8JJ×20
Internal Pressure Condition: 0 kPa (in a punctured state)
Load Condition: 9.8 kN Each of the pneumatic tires was fitted into a drum test machine placed indoors, was rotated at a constant speed (90 km/h), and was measured for its durable distance until breakage. The durable distance of the pneumatic tire having no protrusions 17 was set to 100. Then, the durability of each of the pneumatic tires having the protrusions 17 was evaluated as a relative value to 100. Note that the larger the index, the better the durability, namely, the better a temperature reduction characteristics.

TABLE 1

| | | | | | | | |
|---|---|---|---|---|---|---|---|
| PROTRUSION RADIAL-DIRECTION LENGTH L (MM) | — | 1 | 2 | 10 | 50 | 70 | 100 |
| PROTRUSION HEIGHT H (MM) | — | 2 | 2 | 2 | 2 | 2 | 2 |
| AVERAGE ARRANGEMENT DENSITY ρ (PIECE/CM²) | — | 2 | 2 | 2 | 2 | 2 | 2 |
| WALL FACE ANGLE θ [°] | — | 90 | 90 | 90 | 90 | 90 | 90 |
| L/H | — | 0.5 | 1.0 | 5.0 | 25.0 | 35.0 | 50.0 |
| DURABILITY | 100 | 101 | 113 | 135 | 137 | 132 | 112 |

TABLE 2

| | | | | | | |
|---|---|---|---|---|---|---|
| PROTRUSION RADIAL-DIRECTION LENGTH L (MM) | — | 2 | 2 | 2 | 2 | 2 |
| PROTRUSION HEIGHT H (MM) | — | 2 | 2 | 2 | 2 | 2 |
| WALL FACE ANGLE θ [°] | — | 4.5 | 70 | 90 | 110 | 135 |
| AVERAGE ARRANGEMENT DENSITY ρ (PIECE/CM²) | — | 0.8 | 0.8 | 0.8 | 0.8 | 0.8 |
| DURABILITY | 100 | 101 | 120 | 133 | 113 | 102 |

As Table 1 shows, it was confirmed that the durability (heat dissipation characteristics) improved when the relationship $1.0 \leq L/H \leq 50.0$ was satisfied.

As Table 2 shows, it was experimentally confirmed that the protrusions improved the durability (heat dissipation characteristics) when each of the wall face angles θ (the front angle θ1, the inner angle θ3, and the outer angle θ4) was set in the range of 70° to 110°.

Second Embodiment

Next, the configuration of a protrusion 17 according to a second embodiment will be described with reference to FIGS. 19 and 20. Note that the same parts as those of the pneumatic tire 1 according to the above-described first embodiment bear the same reference symbols, and different parts will mainly be described. Namely, points such as the configuration of the pneumatic tire 1 and the arrangement and arrangement density of the protrusions 17 are not repeatedly described. However, some points may be partly repeated.

Figure 19:
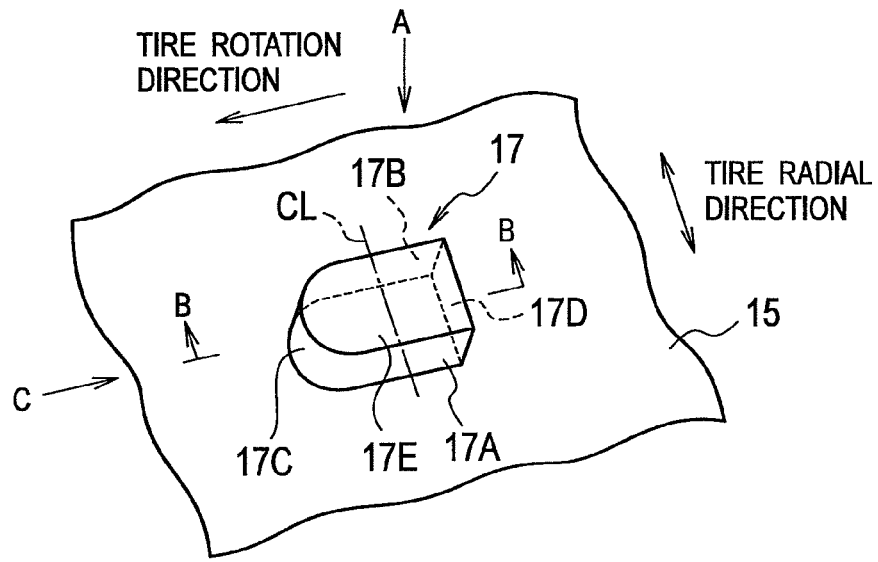
FIG. 19 is a perspective view showing a protrusion according to a second embodiment.

FIG. 19 is a perspective view showing a protrusion according to the second embodiment. Part (a) of FIG. 20 is a top view showing the protrusion according to the second embodiment (a view seen in the arrow A of FIG. 19). Part (b) of FIG. 20 is a cross-sectional view showing the protrusion according to the second embodiment seen in the tire radial direction (a B-B cross-sectional view of FIG. 19). Part (c) of FIG. 20 is a front view showing the protrusion according to the second embodiment seen in the tire rotation direction (a view seen in the arrow C of FIG. 19).

Figure 20:
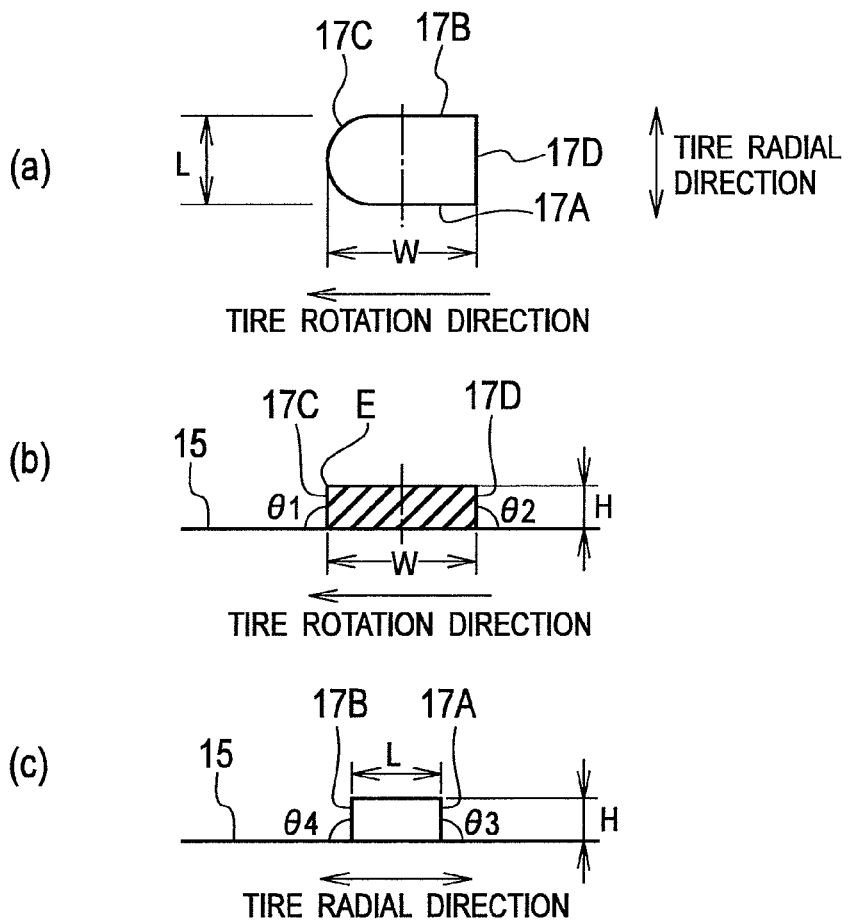
FIG. 20 is top, cross-sectional, and front views each showing the protrusion according to the second embodiment.

As FIGS. 19 and 20 show, the protrusion 17 is formed of: an inner face 17A (inner part) located at an innermost position in the tire radial direction; an outer face 17B (outer part) located at an outermost position in the tire radial direction; a front face 17C located frontward, in the tire rotation direction, of the protrusion radial-direction center line CL; a rear face 17D located rearward, in the tire rotation direction, of the protrusion radial-direction center line CL; and a protrusion face 17E protruding from the tire surface 15.

The protrusion 17 is formed in a parallelogram in a view in the tire radial direction, which is a view that the protrusion 17 is viewed in the tire radial direction (see part (b) of FIG. 20). The protrusion 17 is also formed in a parallelogram in a view in the tire rotation direction, which is a view that the protrusion 17 is viewed from the front side in the tire rotation direction (see part (c) of FIG. 20).

Accordingly, the protrusion 17 has an edge part E which is formed by a portion connecting the inner face 17A and the protrusion face 17E, a portion connecting the outer face 17B and the protrusion face 17E, a portion connecting the front face 17C and the protrusion face 17E, and a portion connecting the rear face 17D and the protrusion face 17E.

As part (a) of FIG. 20 shows, the inner face 17A, the outer face 17B, the rear face 17D, and the protrusion face 17E are formed to be flat. The front face 17C curves toward the front side in the tire rotation direction.

Specifically, the inner face 17A and the outer face 17B are formed substantially perpendicular to the protrusion radial-direction center line CL. The rear face 17D is formed substantially parallel to the protrusion radial-direction center line CL. The protrusion face 17E is formed substantially parallel to the tire surface 15.

As part (b) of FIG. 20 shows, a front angle ($\theta 1$) formed between the front face 17C and the tire surface 15 and a rear angle ($\theta 2$) formed between the rear face 17D and the tire surface 15 are each set to a value between 45° and 135°, inclusive. It is especially preferable to set the front angle ($\theta 1$) and the rear angle ($\theta 2$) to a value between 70° and 110°, inclusive, in order to reduce the tire temperature efficiently.

The front angle ($\theta 1$) and the rear angle ($\theta 2$) smaller than 45° might stop the flow of fluid above the tire surface 15 (on the heat dissipation surface), which might not generate a pressure difference for accelerating the flow of the fluid. On the other hand, the front angle ($\theta 1$) and the rear angle ($\theta 2$) larger than 135° are inadequate to change the flow of fluid passing by around the protrusion 17. Consequently, the tire temperature might not be able to be reduced efficiently.

As part (c) of FIG. 20 shows, an inner angle ($\theta 3$) formed between the inner face 17A and the tire surface 15 and an outer angle ($\theta 4$) formed between the outer face 17B and the tire surface 15 are each set to a value between 45° and 135°, inclusive. It is especially preferable to set the inner angle ($\theta 3$) and the outer angle ($\theta 4$) to a value between 70° and 110°, inclusive, in order to reduce the tire temperature efficiently.

The inner angle ($\theta 3$) and the outer angle ($\theta 4$) smaller than 45° might stop the flow of fluid above the tire surface 15 (on the heat dissipation surface), which might not generate a pressure difference for accelerating the flow of the fluid. On the other hand, the inner angle ($\theta 3$) and the outer angle ($\theta 4$) larger than 135° are inadequate to change the flow of fluid passing by around the protrusion 17. Consequently, the tire temperature might not be able to be reduced efficiently.

(Operations and Effects According to Second Embodiment)

According to the pneumatic tire 1 according to the second embodiment described above, the protrusion 17 has the edge part E, and the average arrangement density ($\rho$) of the protrusions 17 is 0.1 to 13 pieces/cm$^2$. Thereby, the pneumatic tire 1 can reduce the tire temperature efficiently while maintaining general driving performance.

Specifically, the front face 17C curves, and the front angle ($\theta 1$) and the rear angle ($\theta 2$) are each set to a value between 45° and 135°, inclusive. Such shape and angles allow a pressure to increase at the front side, in the tire rotation direction, of the protrusion 17 (the front face 17C). This pressure increase can accelerate the flow of fluid passing by around the protrusion 17 (namely, can improve the heat dissipation rate of the tire temperature). Thereby, without an occurrence of new breakage, the pneumatic tire 1 can reduce the tire temperature efficiently while maintaining the general driving performance.

Figure 21:
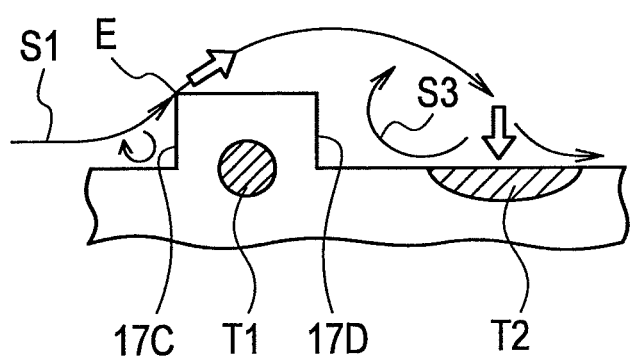
FIG. 21 is a view for illustrating operations and effects of the protrusion according to the second embodiment.
Figure 21:
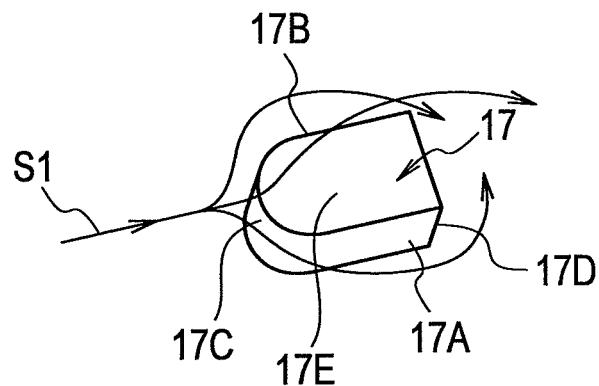

More specifically, as FIG. 21 shows, as the pneumatic tire 1 rotates, the protrusion 17 causes fluid (called a main flow S1 below) in contact with the tire surface 15 (the sidewall part SW) to separate from the sidewall part SW. Then, the main flow S1 flows over the edge E (the front side edge) of the protrusion 17 and accelerates toward the rear side in the tire rotation direction (namely rearward).

Then, the main flow S1 thus accelerated flows in a direction perpendicular to the tire surface 15 at the back side of the rear face 17D. At this time, fluid S3 flows a part (region) where the flow of the fluid stays, thereby draws heat staying at the back side of the rear face 17D, and then again merges with the main flow S1.

The main flow S1 flows over the edge E and thus accelerates, and the fluid S3 draws heat and then again merges with the main flow S1. This allows a temperature reduction in a large area of the tire. Particularly, a temperature can be reduced at a basal part T1 of the protrusion 17 and in a region T2 where the main flow S1 comes in contact in the perpendicular direction.

Moreover, the protrusions 17 are arranged in a staggered manner. Accordingly, even if fluid flowing in the perpendicular direction somewhat shifts its path, the fluid can surely collide with the tire surface 15 at the front side (the front face 17C), in the tire rotation direction, of the protrusion 17 by which the fluid flows thereafter. Consequently, the tire temperature can be reduced further efficiently.

A centrifugal force causes fluid to flow obliquely outward in the tire radial direction, namely, toward the protrusion 17 located outward in the tire radial direction. The temperature of the fluid gradually increases as the fluid passes by the protrusions 17. Accordingly, the tire temperature can be reduced further efficiently by gradually decreasing the average arrangement density ($\rho$) of the protrusions 17 from the inner side in the tire radial direction toward the outer side in the tire radial direction. This is because, by passing by a protrusion 17 located on the inner side in the tire radial direction, fluid in a low temperature state slightly gains a temperature to have a temperature higher than that in the low temperature state, and then passes by a protrusion 17 located on the outer side in the tire radial direction.

Moreover, when the protrusion maximum height (H) is set to a value between 0.3 mm and 15 mm, inclusive, a temperature increase in the basal part T1 of the protrusion 17 can be suppressed. In addition, the flow of fluid passing by around the protrusion 17 can be further accelerated.

Moreover, the front angle ($\theta 1$) and the rear angle ($\theta 2$) are set to a value between 45° and 135°, inclusive. Thereby, the flow of fluid having collided with the front face 17C can increase a pressure at the front face 17C. This pressure increase can further accelerate the flow of fluid passing by around the protrusion 17.

Moreover, the inner angle ($\theta 3$) and the outer angle ($\theta 4$) are set to a value between 45° and 135°, inclusive. Thereby, when fluid separates from (spreads around) the protrusion 17 by colliding with the front face 17C, the flow of the fluid thus spreading around the protrusion 17 can be surely accelerated.

(Modification 1 According to Second Embodiment)

In the above description of the protrusion 17 according to the second embodiment, the front face 17C forming the protrusion 17 is formed as a single face. However, the following modifications may be made. Note that the same parts as those of the protrusion 17 according to the above-described second embodiment bear the same reference symbols, and different points are mainly described.

Figure 22:
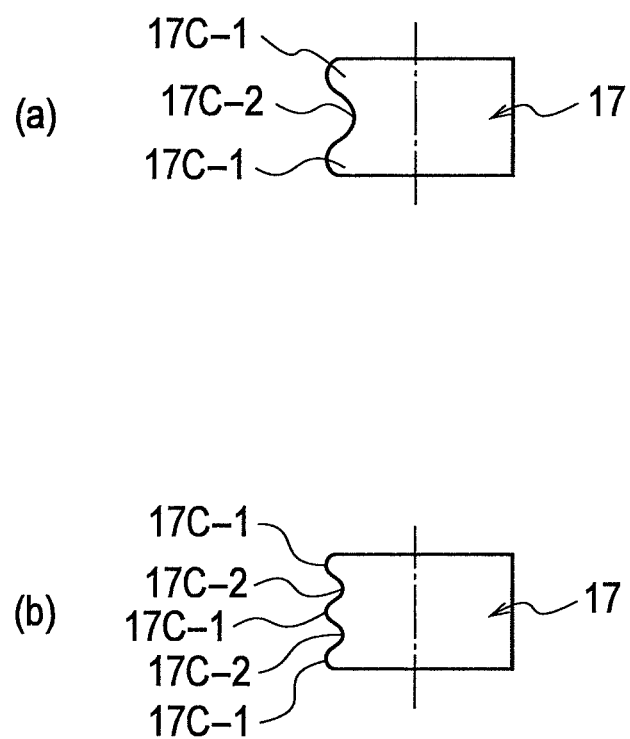
FIG. 22 is a top view showing a protrusion of Modification 1 according to the second embodiment.

FIG. 22 is a top view showing a protrusion of Modification 1 according to the second embodiment. As part (a) of FIG. 22 shows, in a top view of the protrusion, which is a view that the protrusion 17 is viewed from the top, the protrusion is provided with two front convex parts 17C-1 and a single front concave part 17C-2 frontward, in the tire rotation direction, of the protrusion radial-direction center line CL. The front convex parts 17C-1 and the front concave part 17C-2 are each formed in a curve. Accordingly, the front face 17C curves at least partially.

Although described above as such, the protrusion 17 is not limited to being provided with the two front convex parts 17C-1 and the single front concave part 17C-2 frontward, in the tire rotation direction, of the protrusion radial-direction center line CL. As shown in part (b) of FIG. 22 for example, three front convex parts 17C-1 and two front concave parts 17C-2 may be provided. There is no limitation as long as at least any one of the front convex part 17C-1 and the front concave part 17C-2 is provided.

According to the pneumatic tire 1 of Modification 1 according to the second embodiment, the flow of fluid passing by around the protrusion 17 can be smoothly accelerated. Thereby, the tire temperature can be reduced efficiently.

(Modification 2 According to Second Embodiment)

In the above description, the rear face 17D of the protrusion 17 according to the second embodiment is formed substantially parallel to the protrusion radial-direction center line CL. However, the following modifications may be made. Note that the same parts as those of the protrusion 17 according to the above-described second embodiment bear the same reference symbols, and different points are mainly described.

Figure 23:
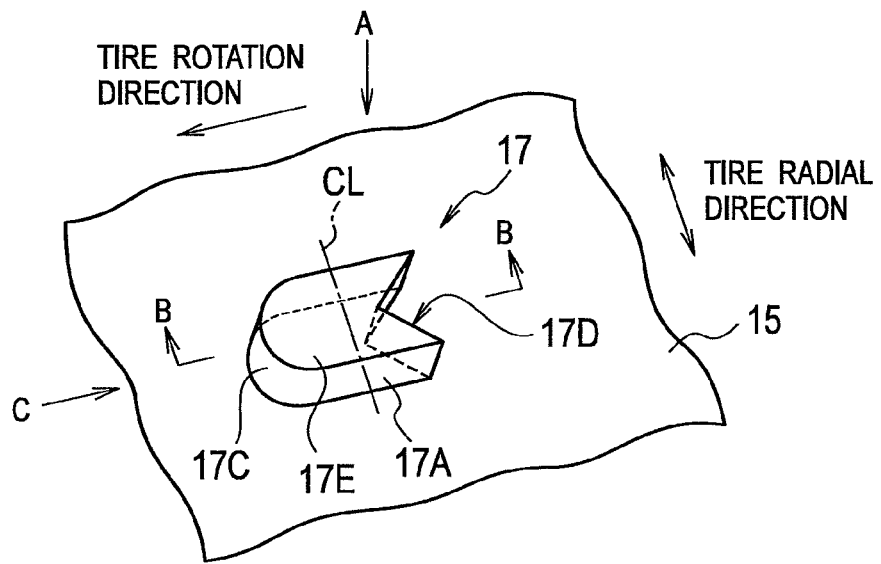
FIG. 23 is a perspective view showing a protrusion of Modification 2 according to the second embodiment.
Figure 24:
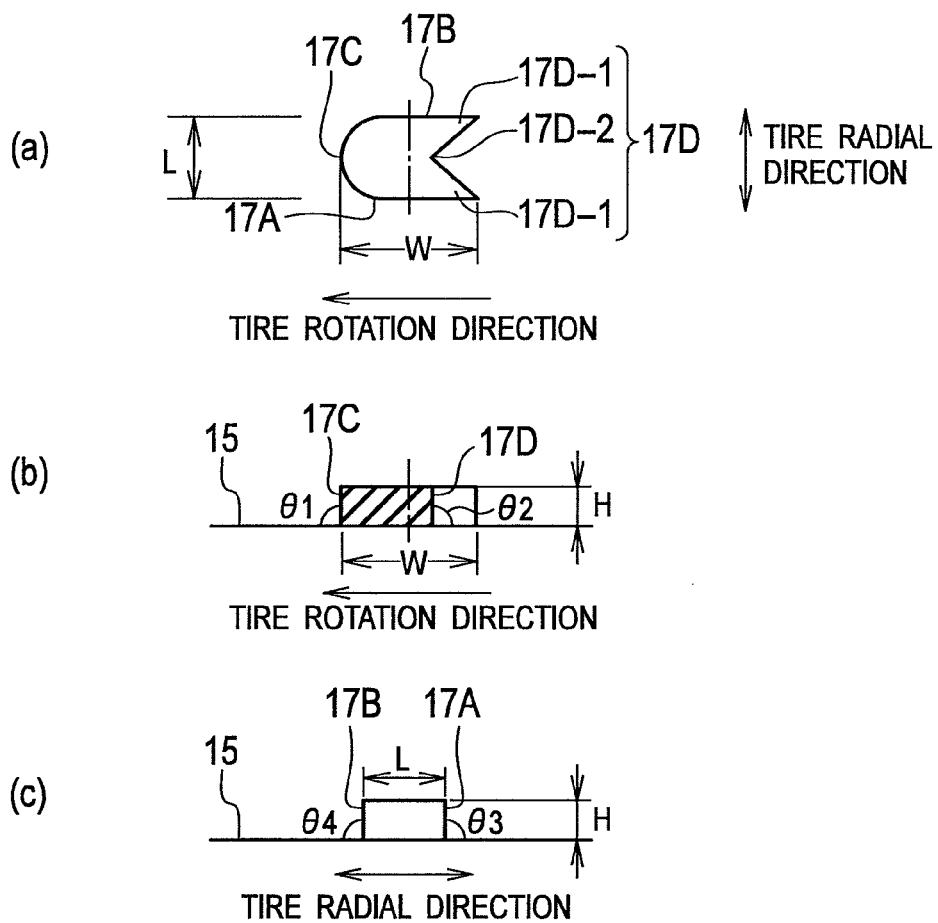
FIG. 24 is top, cross-sectional, and front views each showing the protrusion of Modification 2 according to the second embodiment.

FIG. 23 is a perspective view showing a protrusion of Modification 2 according to the second embodiment. Part (a) of FIG. 24 is a top view showing the protrusion of Modification 2 according to the second embodiment (a view seen in the arrow A of FIG. 23). Part (b) of FIG. 24 is a cross-sectional view showing the protrusion of Modification 2 according to the second embodiment seen in the tire radial direction (a B-B cross-sectional view of FIG. 23). Part (c) of FIG. 24 is a front view showing the protrusion of Modification 2 according to the second embodiment seen in the tire rotation direction (a view seen in the arrow C of FIG. 23).

As FIGS. 23 and 24 show, in a top view of the protrusion, the protrusion is provided with two rear convex parts 17D-1 and a single rear concave part 17D-2 rearward, in the tire rotation direction, of the protrusion radial-direction center line CL. The rear convex parts 17D-1 protrude rearward in the tire rotation direction, and the rear concave part 17D-2 is concave in the tire rotation direction. As part (a) of FIG. 24 shows, the rear convex parts 17D-1 and the rear concave part 17D-2 are linearly formed.

Although described above as such, the protrusion 17 is not limited to being provided with the rear convex parts 17D-1 and the rear concave part 17D-2 rearward, in the tire rotation direction, of the protrusion radial-direction center line CL. As shown in part (a) of FIG. 25 for example, only the rear convex part 17D-1 may be provided. There is no limitation as long as at least any one of the rear convex part 17D-1 and the rear concave part 17D-2 is provided.

In addition, although described above as such, the protrusion 17 is not limited to being provided with the two rear convex parts 17D-1 and the single rear concave part 17D-2 rearward, in the tire rotation direction, of the protrusion radial-direction center line CL. As shown in part (b) of FIG. 25 for example, three rear convex parts 17D-1 and two rear concave parts 17D-2 may be provided.

Figure 25:
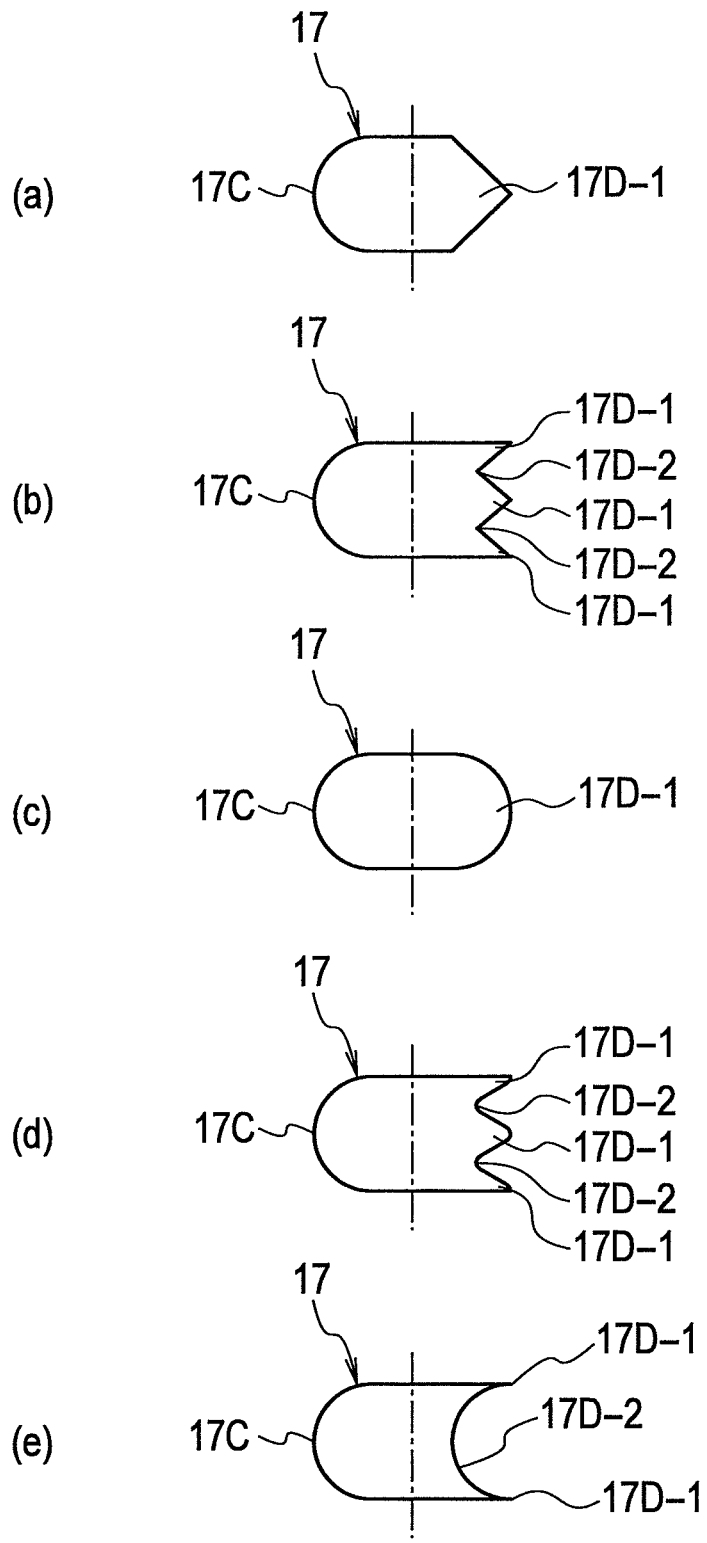
FIG. 25 is a top view showing the protrusion of Modification 2 according to the second embodiment.

Moreover, although described above as such, the rear convex part 17D-1 and the rear concave part 17D-2 are not limited to being formed linearly. For example, the following modifications may of course be made. Specifically, as part (c) of FIG. 25 shows, only the rear convex part 17D-1 may be formed in a curve. As part (d) of FIG. 25 shows, three rear convex parts 17D-1 each having a curved end and two rear concave parts 17D-2 each having a curved end may be formed in a curve. As part (e) of FIG. 25 shows, the rear concave part 17D-2 may be formed in a curve shape between two rear convex parts 17D-1.

According to the pneumatic tire 1 of Modification 2 according to the second embodiment, the rear convex part 17D-1 is provided rearward, in the tire rotation direction, of the protrusion radial-direction center line CL. Accordingly, fluid flowing backward can be smoothly returned to the main flow. Thereby, the tire temperature can be reduced efficiently.

Further, provision of the rear concave part 17D-2 rearward, in the tire rotation direction, of the protrusion radial-direction center line CL makes the volume of the protrusion 17 smaller and the distance between the basal part of the protrusion 17 and the tire surface 15 shorter. Thereby, a temperature increase in the basal part of the protrusion 17 can be suppressed.

Furthermore, by providing the rear convex part 17D-1 and the rear concave part 17D-2 rearward, in the tire rotation direction, of the protrusion radial-direction center line CL, not only can the flow of fluid passing by around the protrusion 17 be accelerated, a temperature increase in the basal part of the protrusion 17 can be suppressed. Consequently, the tire temperature can be reduced more efficiently.

(Modification 3 According to Second Embodiment)

In the above description of the protrusion 17 according to the second embodiment, the protrusion 17 is formed in a parallelogram when viewed in the tire radial direction. However, the following modifications may be made. Note that the same parts as those of the protrusion 17 according to the above-described second embodiment bear the same reference symbols, and different points are mainly described.

Figure 26:
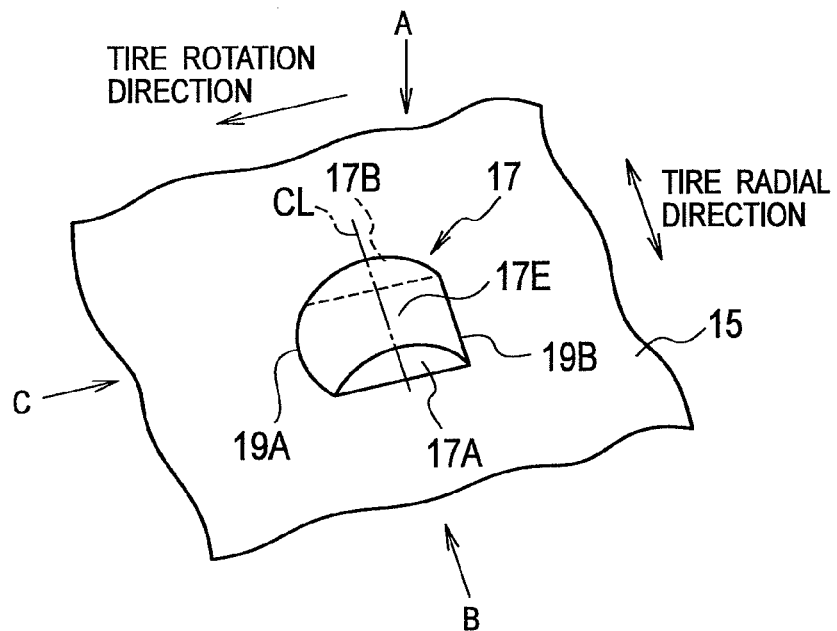
FIG. 26 is a perspective view showing a protrusion of Modification 3 according to the second embodiment.
Figure 27:
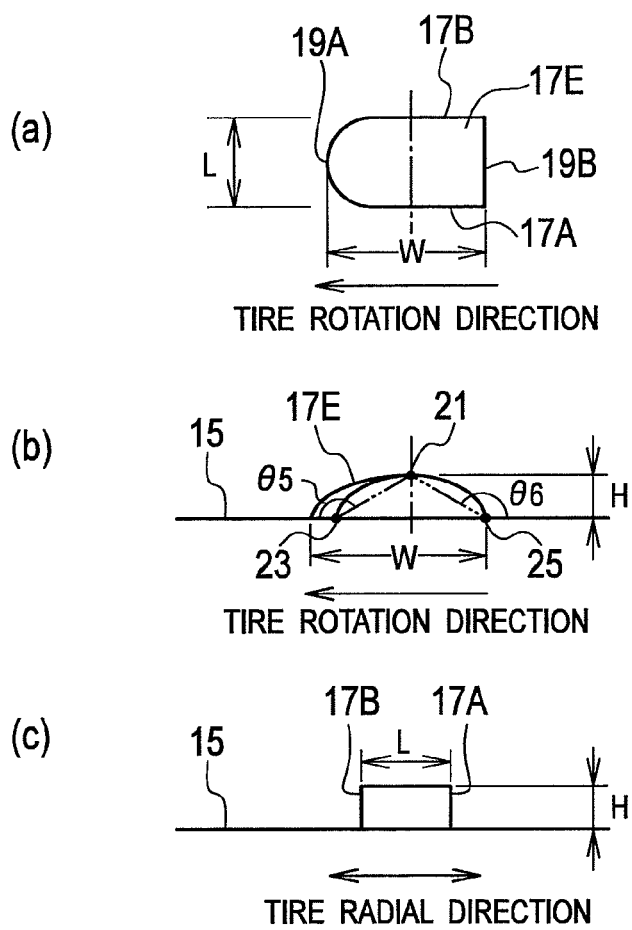
FIG. 27 is top, side, and front views each showing the protrusion of Modification 3 according to the second embodiment.

FIG. 26 is a perspective view showing a protrusion of Modification 3 according to the second embodiment. Part (a) of FIG. 27 is a top view showing the protrusion of Modification 3 according to the second embodiment (a view seen in the arrow A of FIG. 26). Part (b) of FIG. 27 is a side view showing the protrusion of Modification 3 according to the second embodiment seen in the tire radial direction (a view seen in the arrow B of FIG. 26). Part (c) of FIG. 27 is a front view showing the protrusion of Modification 3 according to the second embodiment seen in the tire rotation direction (a view seen in the arrow C of FIG. 26).

As FIGS. 26 and 27 show, the protrusion 17 is formed of the inner face 17A, the outer face 17B, and the protrusion face 17E. The protrusion face 17E curves. Accordingly, the protrusion 17 is formed in a semi-sphere when viewed in the tire radial direction.

As part (a) of FIG. 27 shows, the protrusion maximum height (H) according to this embodiment is a height from the tire surface 15 to a most-protruded position 21 where the protrusion 17 protrudes farthest from the tire surface 15.

As part (b) of FIG. 27 shows, a front maximum angle (θ5) and a rear maximum angle (θ6) are each set to a value between 45° and 135°, inclusive. It is especially preferable to set the front maximum angle (θ5) and the rear maximum angle (θ6) to a value between 70° and 110°, inclusive, in order to efficiently reduce the tire temperature.

Here, the front maximum angle (θ5) is an angle formed between an intersection position 23 of a front part 19A and the tire surface 15, and the most-protruded position 21. The rear maximum angle (θ6) is an angle formed between an intersection position 25 of a rear part 19B and the tire surface 15, and the most-protruded position 21. Here, the rear part 19B is located at the rearmost side, in the tire rotation direction, of the protrusion radial-direction center line CL.

The front maximum angle (θ5) and the rear maximum angle (θ6) smaller than 45° might stop the flow of fluid on the tire surface 15 (on the heat dissipation surface), which might not generate a pressure difference for accelerating the flow of the fluid. On the other hand, the front maximum angle (θ5) and the rear maximum angle (θ6) larger than 135° are inadequate to change the flow of fluid passing by around the protrusion 17. Consequently, the tire temperature might not be able to be reduced efficiently.

Figure 28:
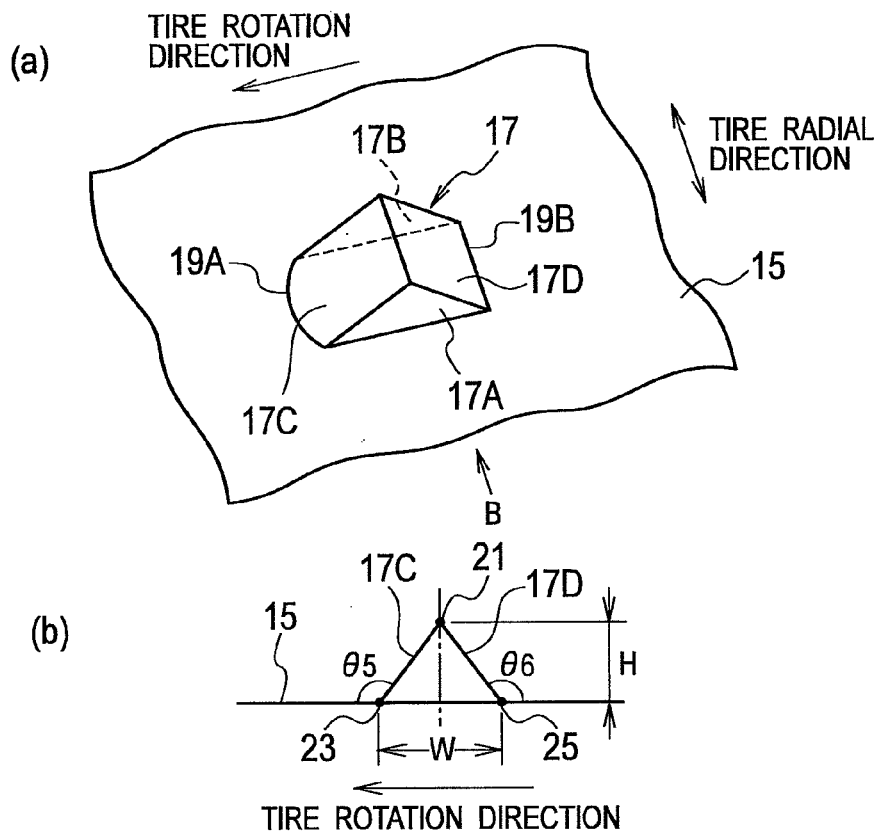
FIG. 28 is perspective and side views each showing the protrusion of Modification 3 according to the second embodiment (part 1).
Figure 29:
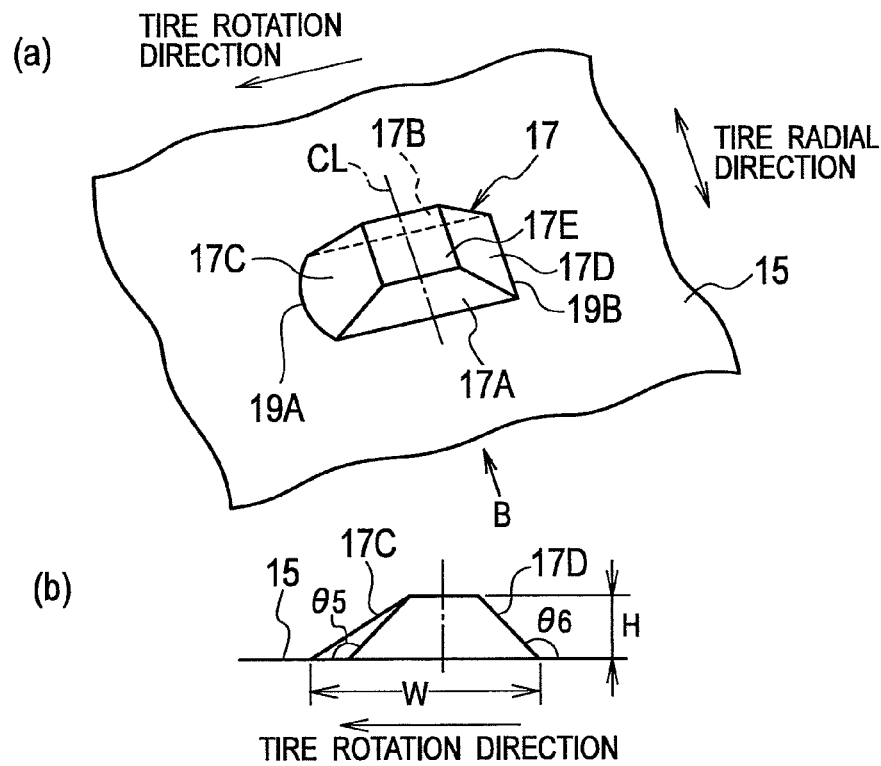
FIG. 29 is perspective and side views each showing the protrusion of Modification 3 according to the second embodiment (part 2).
Figure 30:
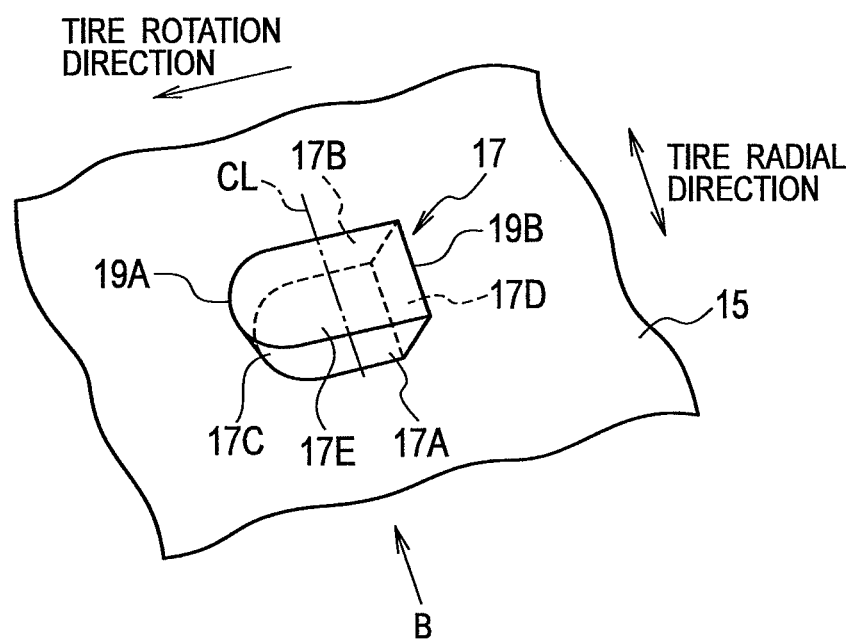
FIG. 30 is perspective and side views each showing the protrusion of Modification 3 according to the second embodiment (part 3).
Figure 30:
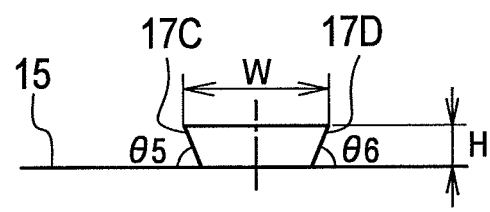

Although described above as such, the protrusion 17 is not limited to being formed in a semi-sphere when viewed in the tire radial direction. For example, the following modifications may be made. Specifically, as FIG. 28 shows, the protrusion 17 may be formed in a triangular when viewed in the tire radial direction. As FIG. 29 shows, the protrusion 17 may be formed in a trapezoid when viewed in the tire radial direction. Here, the trapezoid has a bottom face (the bottom face of the protrusion 17, which is in contact with the tire surface 15) wider than the protrusion face 17E. Moreover, as FIG. 30 shows, the protrusion 17 may be formed in a trapezoid when viewed in the tire radial direction. Here, the trapezoid has a bottom face narrower than the protrusion face 17E.

According to the pneumatic tire 1 of Modification 3 according to the second embodiment, the flow of fluid passing by around the protrusion 17 can be smoothly accelerated. Thereby, the tire temperature can be reduced efficiently.

Moreover, by setting the front maximum angle (θ5) and the rear maximum angle (θ6) to a value between 45° and 135°, inclusive, the flow of fluid having collided with the front part 19A (the front side of the protrusion face 17E) can increase a pressure near the front part 19A. Thereby, the flow of fluid passing by around the protrusion 17 can further be accelerated.

(Modification 4 According to Second Embodiment)

In the above description of the protrusion 17 according to the second embodiment, the protrusion 17 is formed in a parallelogram when viewed in the tire rotation direction. However, the following modifications may be made. Note that the same parts as those of the protrusion 17 according to the above-described second embodiment bear the same reference symbols, and different points are mainly described.

Figure 31:
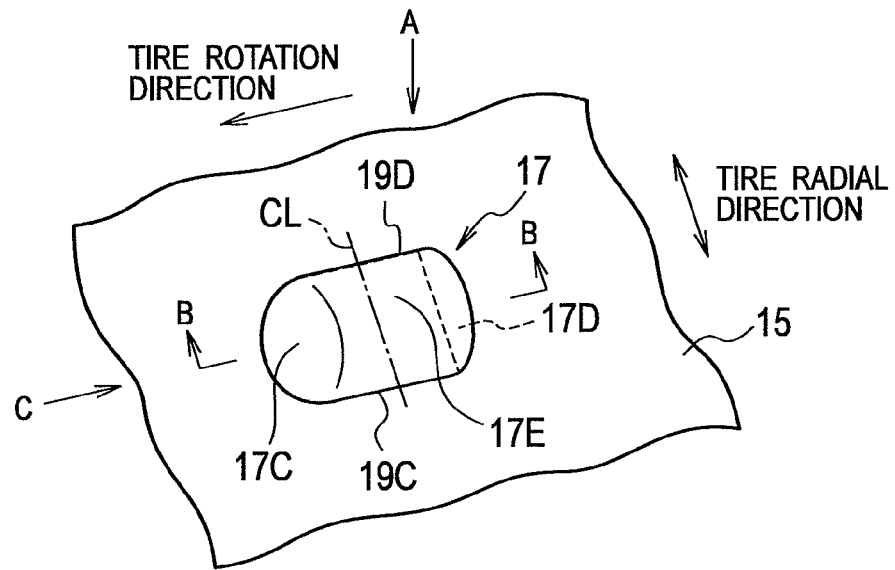
FIG. 31 is a perspective view showing a protrusion of Modification 4 according to the second embodiment.
Figure 32:
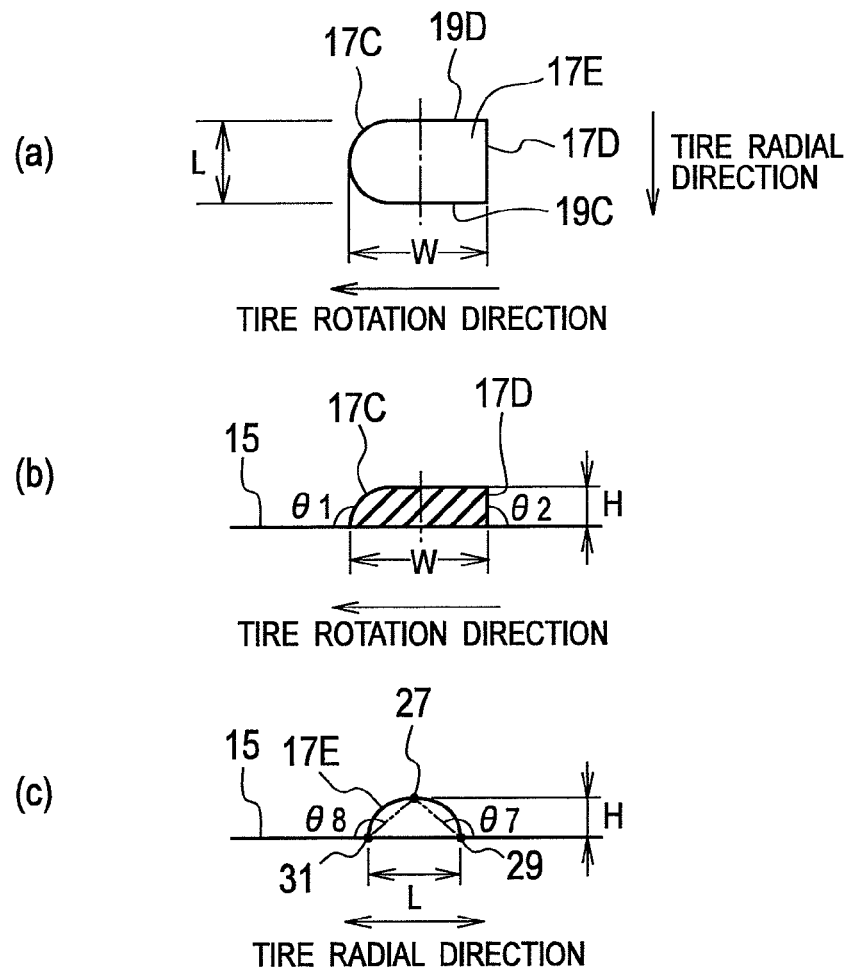
FIG. 32 is top, cross-sectional, and front views each showing the protrusion of Modification 4 according to the second embodiment.

FIG. 31 is a perspective view showing a protrusion of Modification 4 according to the second embodiment. Part (a) of FIG. 32 is a top view showing the protrusion of Modification 4 according to the second embodiment (a view seen in the arrow A of FIG. 31). Part (b) of FIG. 32 is a cross-sectional view showing the protrusion of Modification 4 according to the second embodiment seen in the tire radial direction (a B-B cross-sectional view of FIG. 31). Part (c) of FIG. 32 is a front view showing the protrusion of Modification 4 according to the second embodiment seen in the tire rotation direction (a view seen in the arrow C of FIG. 31).

As FIGS. 31 and 32 show, the protrusion 17 is formed of the front face 17C, the rear face 17D, and the protrusion face 17E. The protrusion face 17E curves. Accordingly, the protrusion 17 is formed in a semi-sphere when viewed in the tire rotation direction.

As part (a) of FIG. 32 shows, the protrusion maximum height (H) according to this embodiment is a height from the tire surface 15 to a most-protruded position 27 where the protrusion 17 protrudes farthest from the tire surface 15.

As part (c) of FIG. 32 shows, an inner maximum angle (θ7) and an outer maximum angle (θ8) are each set to a value between 45° and 135°, inclusive. It is especially preferable to set the inner maximum angle (θ7) and the outer maximum angle (θ8) to a value between 70° and 110°, inclusive, in order to efficiently reduce the tire temperature.

Here, the inner maximum angle (θ7) is an angle formed between an intersection position 29 of an inner part 19C and the tire surface 15, and the most-protruded position 27. Here, the inner part 19C is located at the innermost position in the tire radial direction. The outer maximum angle (θ8) is an angle formed between an intersection position 31 of an outer part 19D and the tire surface 15, and the most-protruded position 27. Here, the outer part 19D is located at the outermost position in the tire radial direction.

The inner maximum angle (θ7) and the outer maximum angle (θ8) smaller than 45° might stop the flow of fluid above the tire surface 15 (on the heat dissipation surface), which might not generate a pressure difference for accelerating the flow of the fluid. On the other hand, the inner maximum angle (θ7) and the outer maximum angle (θ8) larger than 135° are inadequate to change the flow of fluid passing by around the protrusion 17. Consequently, the tire temperature might not be able to be reduced efficiently.

Figure 33:
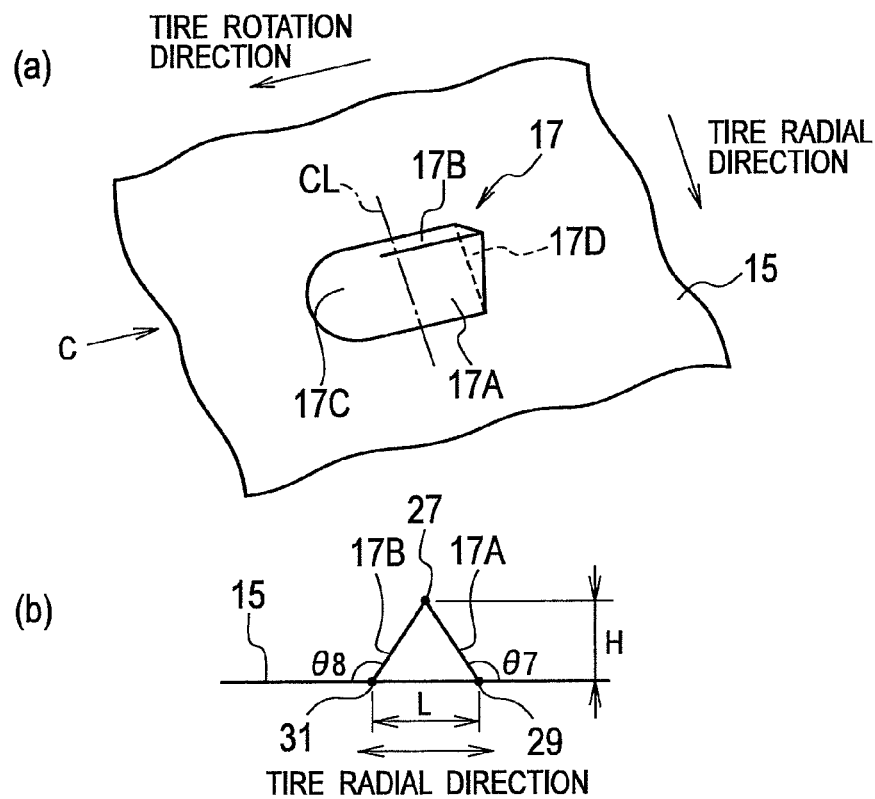
FIG. 33 is perspective and front views each showing the protrusion of Modification 4 according to the second embodiment (part 1).
Figure 34:
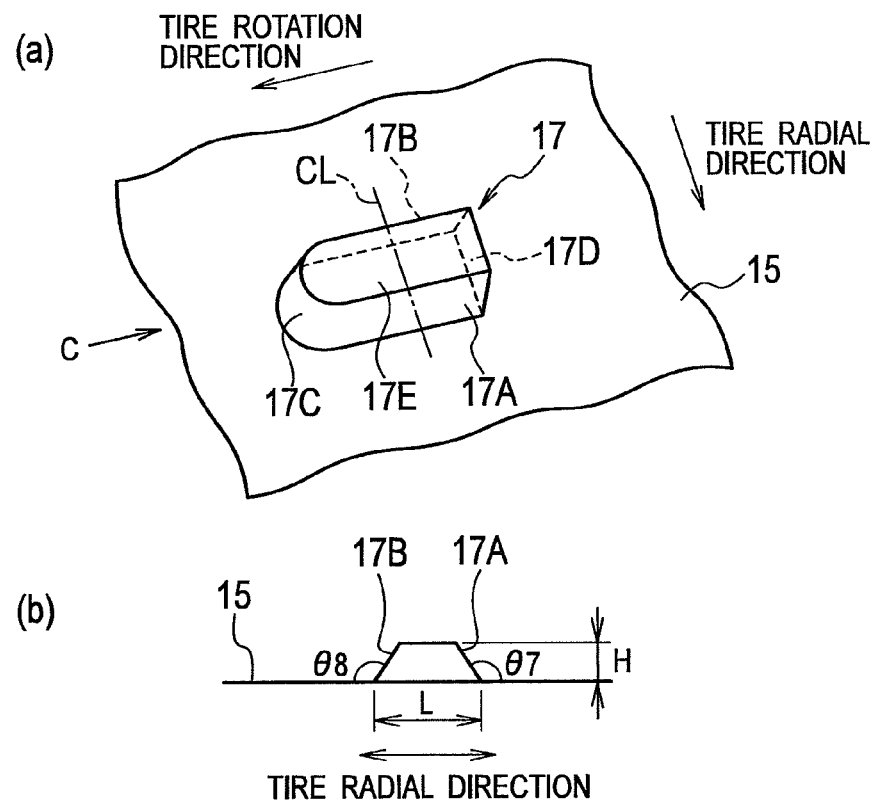
FIG. 34 is perspective and front views each showing the protrusion of Modification 4 according to the second embodiment (part 2).
Figure 35:
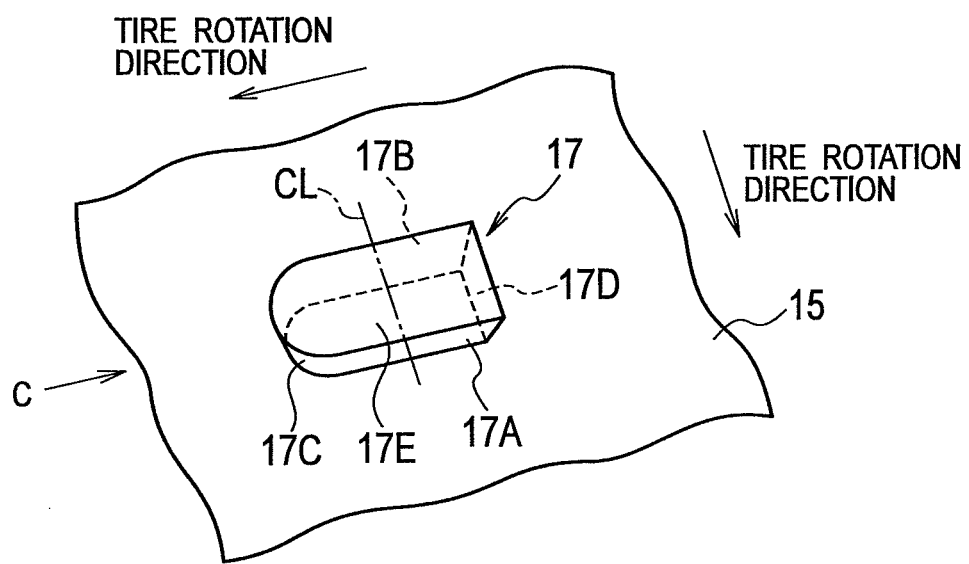
FIG. 35 is perspective and front views each showing the protrusion of Modification 4 according to the second embodiment (part 2).
Figure 35:
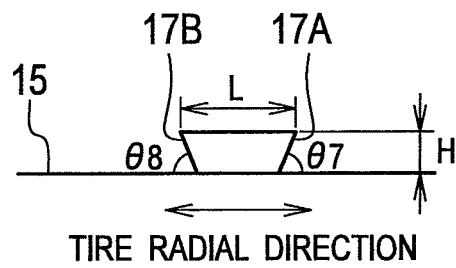

Although described above as such, the protrusion 17 is not limited to being formed in a semi-sphere when viewed in the tire rotation direction. For example, the following modifications may be made. Specifically, as FIG. 33 shows, the protrusion 17 may be formed in a triangular when viewed in the tire rotation direction. As FIG. 34 shows, the protrusion 17 may be formed in a trapezoid when viewed in the tire rotation direction. Here, the trapezoid has a bottom face wider than the protrusion face 17E. Moreover, as FIG. 35 shows, the protrusion 17 may be formed in a trapezoid when viewed in the tire rotation direction. Here, the trapezoid has a bottom face narrower than the protrusion face 17E.

According to the pneumatic tire 1 of Modification 4 according to the second embodiment, the flow of fluid passing by around the protrusion 17 can be smoothly accelerated. Thereby, the tire temperature can be reduced efficiently.

Moreover, the inner maximum angle (θ7) and the outer maximum angle (θ8) are set to a value between 45° and 135°, inclusive. Thereby, when fluid spreads around the protrusion 17 by colliding with the front face 17C, the flow of the fluid thus separating from (spreading around) the protrusion 17 can be surely accelerated.

Examples According to Second Embodiment

Next, in order to further clarify the effects of the invention according to the second embodiment, results obtained from tests performed using the following pneumatic tires will be described. It should be noted that these examples do not limit the present invention whatsoever.

Data on each of the pneumatic tires was acquired by measurement under the following conditions.

Tire Size: 285/50R20
Wheel Size: 8JJ×20
Internal Pressure Condition: 0 kPa (in a punctured state)
Load Condition: 9.8 kN As shown in the following Tables 3 to 6, test tires A, test tires B, test tires C, and test tires D were prepared to test durability of each of these pneumatic tires. Pneumatic tires according to comparative examples 1 to 4 have no protrusions. Pneumatic tires according to examples 1 to 36 have protrusions, and have different protrusion configurations (such as shapes, the protrusion radial-direction length (L), and the protrusion maximum height (H)), as shown in the following Tables 3 to 6.

TABLE 3

| | TEST TIRE A | | | | | | | | | |
|---|---|---|---|---|---|---|---|---|---|---|
| | COMPARATIVE EXAMPLE 1 | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
| PROTRUSION TOP VIEW (TOP) | — | | | | | | | | | |
| TIRE RADIAL DIRECTION VIEW (SIDE) | — | | | | | | | | | |
| TIRE ROTATION DIRECTION VIEW (FRONT) | — | | | | | | | | | |
| PROTRUSION RADIAL DIRECTION LENGTH (L) | — | 0.4 | 2 | 8 | 2 | 2 | 2 | 2 | 2 | 2 |
| PROTRUSION MAXIMUM HEIGHT (H) | — | 2 | 2 | 2 | 0.4 | 8 | 2 | 2 | 2 | 2 |
| θ1, θ2 (DEGREES) | — | 90 | 90 | 90 | 90 | 90 | 50 | 130 | 90 | 90 |
| θ3, θ4 (DEGREES) | — | 90 | 90 | 90 | 90 | 90 | 90 | 90 | 50 | 130 |
| DURABILITY | 100 | 101 | 135 | 102 | 105 | 108 | 107 | 105 | 105 | 104 |

TABLE 4

| | TEST TIRE B | | | | | | | | | |
|---|---|---|---|---|---|---|---|---|---|---|
| | COMPARATIVE EXAMPLE 2 | EXAMPLE 10 | EXAMPLE 11 | EXAMPLE 12 | EXAMPLE 13 | EXAMPLE 14 | EXAMPLE 15 | EXAMPLE 16 | EXAMPLE 17 | EXAMPLE 18 |
| PROTRUSION TOP VIEW (TOP) | — | | | | | | | | | |
| TIRE RADIAL DIRECTION VIEW (SIDE) | — | | | | | | | | | |
| TIRE ROTATION DIRECTION VIEW (FRONT) | — | | | | | | | | | |
| PROTRUSION RADIAL DIRECTION LENGTH (L) | — | 0.4 | 2 | 8 | 2 | 2 | 2 | 2 | 2 | 2 |
| PROTRUSION MAXIMUM HEIGHT (H) | — | 2 | 2 | 2 | 0.4 | 8 | 2 | 2 | 2 | 2 |

TABLE 4-continued

| | TEST TIRE B | | | | | | | | | |
|---|---|---|---|---|---|---|---|---|---|---|
| | COMPARATIVE EXAMPLE 2 | EXAMPLE 10 | EXAMPLE 11 | EXAMPLE 12 | EXAMPLE 13 | EXAMPLE 14 | EXAMPLE 15 | EXAMPLE 16 | EXAMPLE 17 | EXAMPLE 18 |
| θ1, θ2 (DEGREES) | — | 90 | 90 | 90 | 90 | 90 | 50 | 130 | 90 | 90 |
| θ3, θ4 (DEGREES) | — | 90 | 90 | 90 | 90 | 90 | 90 | 90 | 50 | 130 |
| DURABILITY | 100 | 101 | 136 | 108 | 105 | 112 | 108 | 105 | 106 | 104 |

TABLE 5

| | TEST TIRE C | | | | | | | | | |
|---|---|---|---|---|---|---|---|---|---|---|
| | COMPARATIVE EXAMPLE 3 | EXAMPLE 19 | EXAMPLE 20 | EXAMPLE 21 | EXAMPLE 22 | EXAMPLE 23 | EXAMPLE 24 | EXAMPLE 25 | EXAMPLE 26 | EXAMPLE 27 |
| PROTRUSION TOP VIEW (TOP) | — | | | | | | ⇒☒ | | | |
| TIRE RADIAL DIRECTION VIEW (SIDE) | — | | ⇒ | | | | | | | |
| TIRE ROTATION DIRECTION VIEW (FRONT) | — | | | | | | | | | |
| PROTRUSION RADIAL DIRECTION LENGTH (L) | — | 0.4 | 2 | 8 | 2 | 2 | 2 | 2 | 2 | 2 |
| PROTRUSION MAXIMUM HEIGHT (H) | — | 2 | 2 | 2 | 0.4 | 8 | 2 | 2 | 2 | 2 |
| θ1, θ2 (DEGREES) | — | 90 | 90 | 90 | 90 | 90 | 50 | 130 | 90 | 90 |
| θ3, θ4 (DEGREES) | — | 90 | 90 | 90 | 90 | 90 | 90 | 90 | 50 | 130 |
| DURABILITY | 100 | 101 | 133 | 109 | 104 | 111 | 107 | 104 | 105 | 102 |

TABLE 6

| | TEST TIRE D | | | | | | | | | |
|---|---|---|---|---|---|---|---|---|---|---|
| | COMPARATIVE EXAMPLE 4 | EXAMPLE 28 | EXAMPLE 29 | EXAMPLE 30 | EXAMPLE 31 | EXAMPLE 32 | EXAMPLE 33 | EXAMPLE 34 | EXAMPLE 35 | EXAMPLE 36 |
| PROTRUSION TOP VIEW (TOP) | — | | | | | | ⇒☒ | | | |
| TIRE RADIAL DIRECTION VIEW (SIDE) | — | | ⇒ | | | | | | | |
| TIRE ROTATION DIRECTION VIEW (FRONT) | — | | | | | | | | | |
| PROTRUSION RADIAL DIRECTION LENGTH (L) | — | 0.4 | 2 | 8 | 2 | 2 | 2 | 2 | 2 | 2 |

TABLE 6-continued

TEST TIRE D

|  | COMPARATIVE EXAMPLE 4 | EXAMPLE 28 | EXAMPLE 29 | EXAMPLE 30 | EXAMPLE 31 | EXAMPLE 32 | EXAMPLE 33 | EXAMPLE 34 | EXAMPLE 35 | EXAMPLE 36 |
|---|---|---|---|---|---|---|---|---|---|---|
| PROTRUSION MAXIMUM HEIGHT (H) | — | 2 | 2 | 2 | 0.4 | 8 | 2 | 2 | 2 | 2 |
| $\theta1, \theta2$ (DEGREES) | — | 90 | 90 | 90 | 90 | 90 | 50 | 130 | 90 | 90 |
| $\theta3, \theta4$ (DEGREES) | — | 90 | 90 | 90 | 90 | 90 | 90 | 90 | 50 | 130 |
| DURABILITY | 100 | 101 | 133 | 109 | 104 | 111 | 107 | 105 | 106 | 104 |

<Durability>

Each of the pneumatic tires was fitted into a drum test machine placed indoors, was rotated at a constant speed (90 km/h), and was measured for its durable distance until breakage. The durability of the pneumatic tire of each of the comparative examples 1 to 4 was set to '100.' Then, the durability of each of the other pneumatic tires was evaluated by a relative value to 100. Note that the larger the index, the better the durability.

Figure 36:
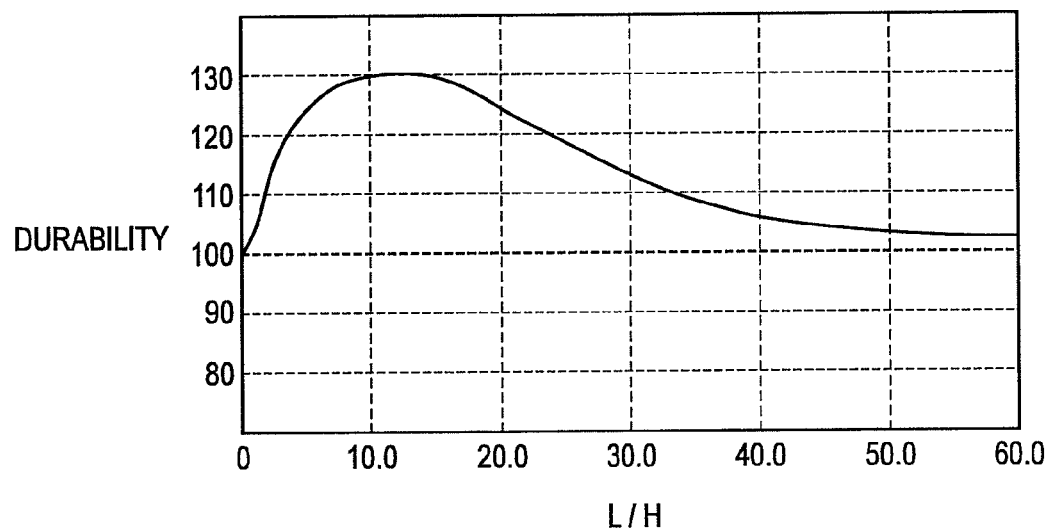
FIG. 36 is a graph showing durability of the pneumatic tires of examples according to the second embodiment (part 1).

As a result, as shown in Tables 3 to 6, it was found that the pneumatic tires according to the examples 1 to 36 have excellent durability compared to that of the pneumatic tires according to the comparative examples 1 to 4. Particularly, as shown in FIG. 36, the pneumatic tire satisfying the relationship $1.0 \leq L/H \leq 50.0$ was found to have excellent durability. Also, as shown in FIG. 37, the pneumatic tire having the protrusion maximum height (H) of 0.3 mm to 15 mm was found to have excellent durability.

Third Embodiment

Next, the configuration of a protrusion 17 according to a third embodiment will be described with reference to FIGS. 38 and 39. Note that the same parts as those of the pneumatic tire 1 according to the above-described first embodiment bear the same reference symbols, and different parts will mainly be described. Namely, points such as the configuration of the pneumatic tire 1 and the arrangement and arrangement density of the protrusions 17 are not repeatedly described. However, some points may be partly repeated.

Figure 38:
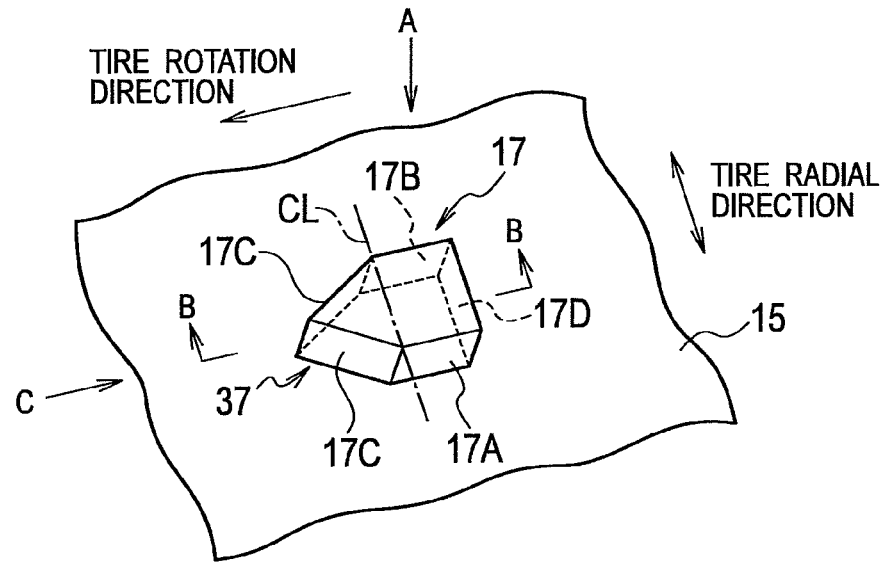
FIG. 38 is a perspective view showing a protrusion according to a third embodiment.

FIG. 38 is a perspective view showing the protrusion according to the third embodiment. Part (a) of FIG. 39 is a top view showing the protrusion according to the third embodiment (a view seen in the arrow A of FIG. 38). Part (b) of FIG. 39 is a cross-sectional view showing the protrusion according to the third embodiment seen in the tire radial direction (a B-B cross-sectional view of FIG. 38). Part (c) of FIG. 39 is a front view showing the protrusion according to the third embodiment seen in the tire rotation direction (a view seen in the arrow C of FIG. 38).

Figure 39:
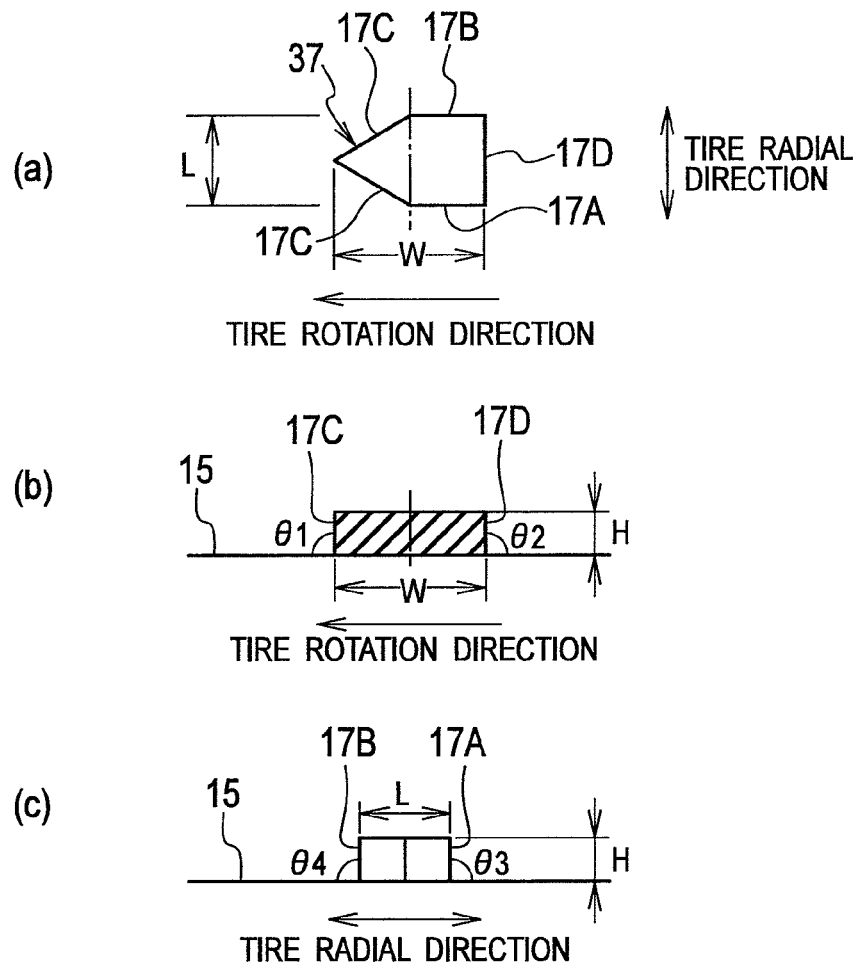
FIG. 39 is top, cross-sectional, and front views each showing the protrusion according to the third embodiment.

As FIGS. 38 and 39 show, the protrusion 17 is formed of an inner face 17A, an outer face 17B, two front faces 17C, a rear face 17D, and a protrusion face 17E.

As part (a) of FIG. 39 shows, in a top view of the protrusion, the protrusion is provided with a front convex part 37 frontward, in the tire rotation direction, of the protrusion radial-direction center line CL. The front convex part 37 protrudes in the tire rotation direction in a triangle. The two front faces 17C form the front convex part 37 and have the same size.

In a top view of the protrusion 17, each of the inner face 17A, the outer face 17B, the front faces 17C and the rear face 17D is linearly (flatly) formed. As part (b) of FIG. 39 shows, the protrusion 17 is formed in a parallelogram when viewed in the tire radial direction. As part (c) of FIG. 39 shows, the protrusion 17 is formed in a parallelogram when viewed in the tire rotation direction as well.

In this way, the inner face 17A and the outer face 17B are formed substantially perpendicular to the protrusion radial-direction center line CL. The rear face 17D is formed substantially parallel to the protrusion radial-direction center line CL. Further, the protrusion face 17E is formed substantially parallel to the tire surface 15.

As part (b) of FIG. 39 shows, a front angle ($\theta1$) and a rear angle ($\theta2$) are each set to a value between 45° and 135°, inclusive. It is especially preferable to set the front angle ($\theta1$) and the rear angle ($\theta2$) to a value between 70° and 110°, inclusive.

As part (c) of FIG. 39 shows, an inner angle ($\theta3$) and an outer angle ($\theta4$) are each set to a value between 45° and 135°, inclusive. It is especially preferable to set the inner angle ($\theta3$) and the outer angle ($\theta4$) to a value between 70° and 110°, inclusive, in order to reduce the tire temperature efficiently.

(Operations and Effects According to Third Embodiment)

According to the pneumatic tire 1 according to the third embodiment described above, the front convex part 37 is provided frontward, in the tire rotation direction, of the protrusion radial-direction center line CL. This allows a pressure to increase at the front side (front face 17C), in the tire rotation direction, of the protrusion 17. This pressure increase can accelerate the flow of fluid passing by around the protrusion 17 (namely, can improve a heat dissipation rate of the tire temperature). Thereby, without an occurrence of new breakage, the pneumatic tire 1 can reduce the tire temperature efficiently while maintaining the general driving performance.

Figure 40:
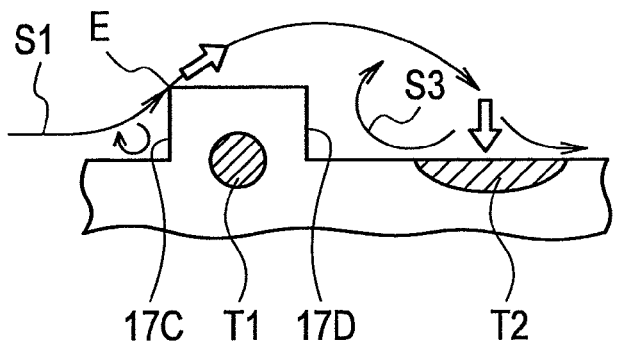
FIG. 40 is a view for illustrating operations and effects of the protrusion according to the third embodiment.
Figure 40:
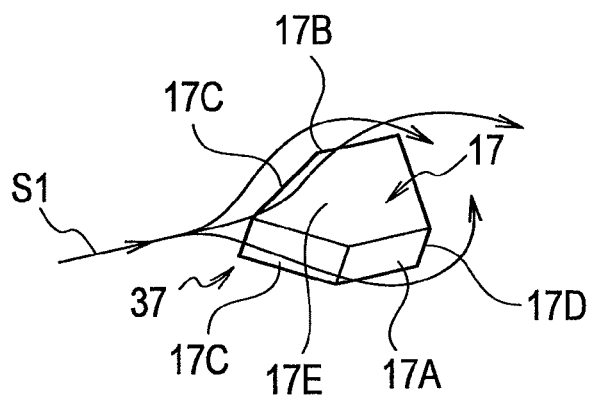

More specifically, as FIG. 40 shows, as the pneumatic tire 1 rotates, the protrusion 17 causes fluid (called a main flow S1 below) in contact with the tire surface 15 (the sidewall part SW) to separate from the sidewall part SW. Then, the main flow S1 flows over an edge E of the protrusion 17 and accelerates toward the rear side in the tire rotation direction (namely rearward).

Here, by the sharp front convex part 37 provided frontward, in the tire rotation direction, of the protrusion radial-direction center line CL, the main flow S1 is, before flowing over the edge E, separated from an apex at which one and the other of the front faces 17C intersect. Thus, the main flow S1 is accelerated when flowing over the edge E.

The main flow S1 thus accelerated flows in a direction perpendicular to the tire surface 15 at the back side of the rear face 17D. At this time, fluid S3 flows a part (region) where the flow of the fluid stays, thereby draws heat staying at the back side of the rear face 17D, and then again merges with the main flow S1.

As described, the main flow S1 flows over the edge E and thus accelerates, and the fluid S3 draws heat and then again merges with the main flow S1. This allows a temperature reduction in a large area of the tire. Particularly, a temperature can be reduced at a basal part T1 of the protrusion 17 and at a region T2 where the main flow S1 comes in contact in the perpendicular direction.

(Modification 1 According to Third Embodiment)

In the above description of the protrusion 17 according to the third embodiment, the front faces 17C constituting the protrusion 17 have the same size. However, the following modifications may be made. Note that the same parts as those of the protrusion 17 according to the above-described third embodiment bear the same reference symbols, and different points are mainly described.

Figure 41:
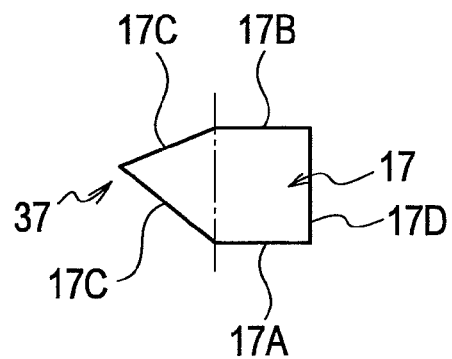
FIG. 41 is a top view showing a protrusion of Modification 1 according to the third embodiment.

FIG. 41 is a top view showing a protrusion of Modification 1 according to the third embodiment. As FIG. 41 shows, the two front faces 17C have different sizes.

According to the pneumatic tire 1 of Modification 1 according to the third embodiment, it is possible to allow for the fact that a centrifugal force causes fluid to flow obliquely outward in the tire radial direction. Thereby, the flow of fluid passing by around the protrusion 17 can be smoothly accelerated, and the tire temperature can be reduced efficiently.

(Modification 2 According to Third Embodiment)

In the above description of the protrusion 17 according to the third embodiment given above, the protrusion 17 has the rear face 17D formed substantially parallel to the protrusion radial-direction center line CL. However, the following modifications may be made. Note that the same parts as those of the protrusion 17 according to the above-described third embodiment bear the same reference symbols, and different points are mainly described.

Figure 42:
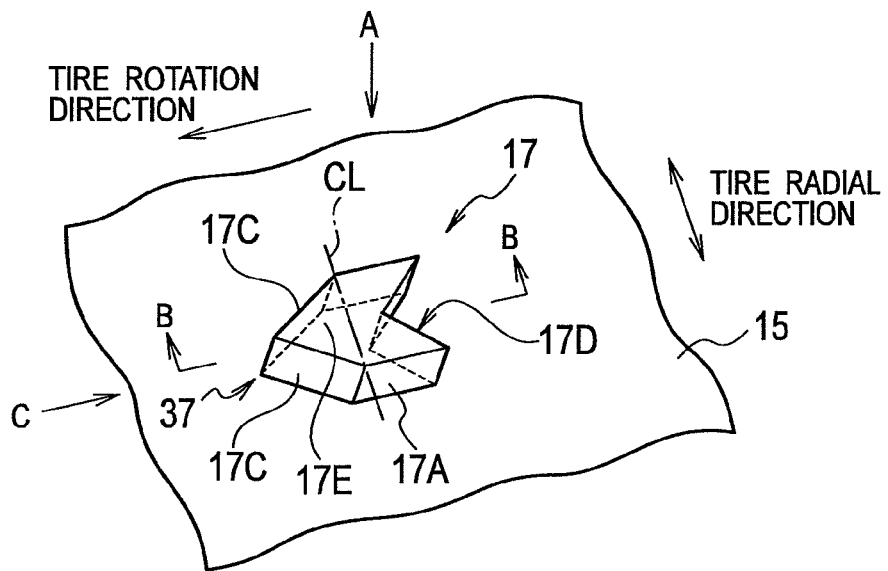
FIG. 42 is a perspective view showing a protrusion of Modification 2 according to the third embodiment.
Figure 43:
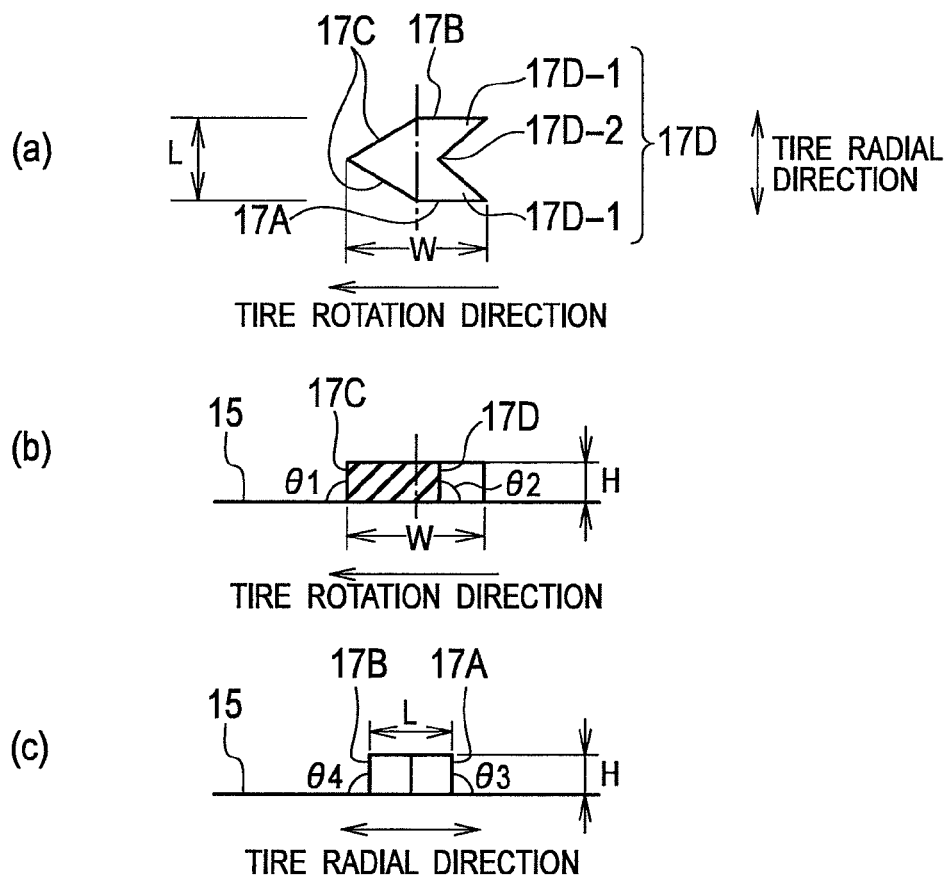
FIG. 43 is top, cross-sectional, and front views each showing the protrusion of Modification 2 according to the third embodiment.

FIG. 42 is a perspective view showing a protrusion of Modification 2 according to the third embodiment. Part (a) of FIG. 43 is a top view showing the protrusion of Modification 2 according to the third embodiment (a view seen in the arrow A of FIG. 42). Part (b) of FIG. 43 is a cross-sectional view showing the protrusion of Modification 2 according to the third embodiment seen in the tire radial direction (a B-B cross-sectional view of FIG. 42). Part (c) of FIG. 43 is a front view showing the protrusion of Modification 2 according to the third embodiment seen in the tire rotation direction (a view seen in the arrow C of FIG. 42).

As FIGS. 42 and 43 show, the protrusion 17 is formed of the inner face 17A, the outer face 17B, two front faces 17C, two rear faces 17D, and the protrusion face 17E.

The protrusion 17 is provided with two rear convex parts 17D-1 and a single rear concave part 17D-2 rearward, in the tire rotation direction, of the protrusion radial-direction center line CL. The rear convex parts 17D-1 protrude rearward in the tire rotation direction, and the rear concave part 17D-2 is concave in the tire rotation direction.

As part (a) of FIG. 43 shows, the rear convex parts 17D-1 and the rear concave part 17D-2 are linearly formed. The two rear faces 17D have the same size. Note that the two rear faces 17D are not limited to having the same size, and may of course have different sizes.

Figure 44:
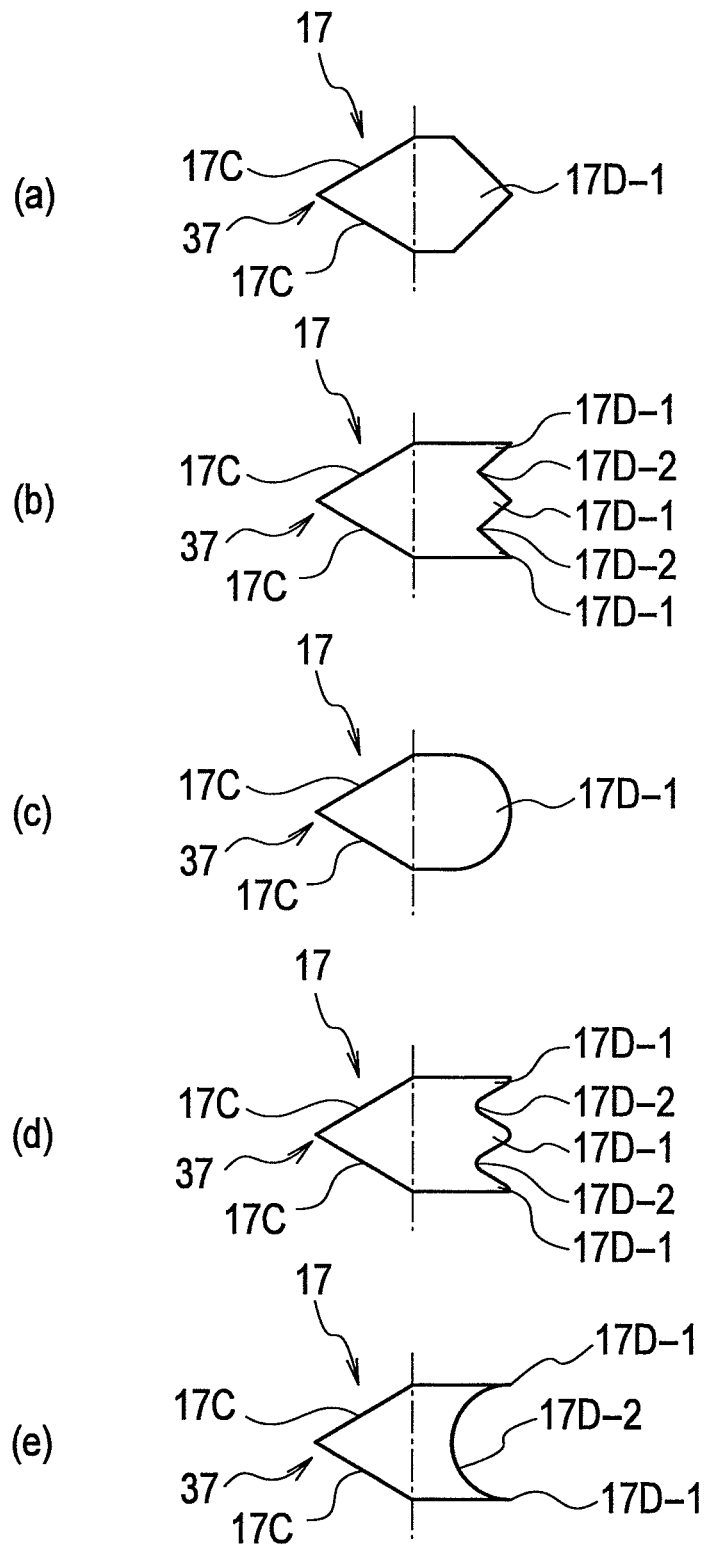
FIG. 44 is a top view showing the protrusion of Modification 2 according to the third embodiment.

Although described above as such, the protrusion 17 is not limited to being provided with the rear convex parts 17D-1 and the rear concave part 17D-2 rearward, in the tire rotation direction, of the protrusion radial-direction center line CL. For example, as part (a) of FIG. 44 shows, only the rear convex part 17D-1 may be provided. There is no limitation as long as any one of the rear convex part 17D-1 and the rear concave part 17D-2 is provided.

Further, although described above as such, the protrusion 17 is not limited to being provided with the two rear convex parts 17D-1 and the single rear concave part 17D-2 rearward, in the tire rotation direction, of the protrusion radial-direction center line CL. For example, as part (b) of FIG. 44 shows, the rear face 17D may be formed of three rear convex parts 17D-1 and two rear concave parts 17D-2.

Moreover, although described above as such, the rear convex parts 17D-1 and the rear concave part 17D-2 are not limited to being linearly formed. For example, the following modifications may of course be made. Specifically, as part (c) of FIG. 44 shows, only the rear convex part 17D-1 may be formed in a curve. As part (d) of FIG. 44 shows, three rear convex parts 17-D2 each having a curved end and two rear concave parts 17-D2 each having a curved end may be formed. Moreover, as part (e) of FIG. 44 shows, a rear concave part 17D-2 may be formed in a curve between two rear convex parts 17D-1.

According to the pneumatic tire 1 of Modification 2 according to the third embodiment, the rear convex part 17D-1 is provided rearward, in the tire rotation direction, of the protrusion radial-direction center line CL. Accordingly, fluid flowing backward can smoothly be returned to the main flow. Thereby, the tire temperature can be reduced efficiently.

Further, provision of the rear concave part 17D-2 rearward, in the tire rotation direction, of the protrusion radial-direction center line CL makes the volume of the protrusion 17 smaller and the distance between the basal part of the protrusion 17 and the tire surface 15 shorter. Thereby, a temperature increase in the basal part of the protrusion 17 can be suppressed.

Furthermore, by providing the rear convex part 17D-1 and the rear concave part 17D-2 rearward, in the tire rotation direction, of the protrusion radial-direction center line CL, not only can the flow of fluid passing by around the protrusion 17 be accelerated, a temperature increase in the basal part of the protrusion 17 can be suppressed. Consequently, the tire temperature can be reduced more efficiently.

(Modification 3 According to Third Embodiment)

In the above description of the protrusion 17 according to the third embodiment, the protrusion 17 is formed in a parallelogram when viewed in the tire radial direction (a B-B cross-sectional view). However, the following modifications may be made. Note that the same parts as those of the protrusion 17 according to the above-described third embodiment bear the same reference symbols, and different points are mainly described.

Figure 45:
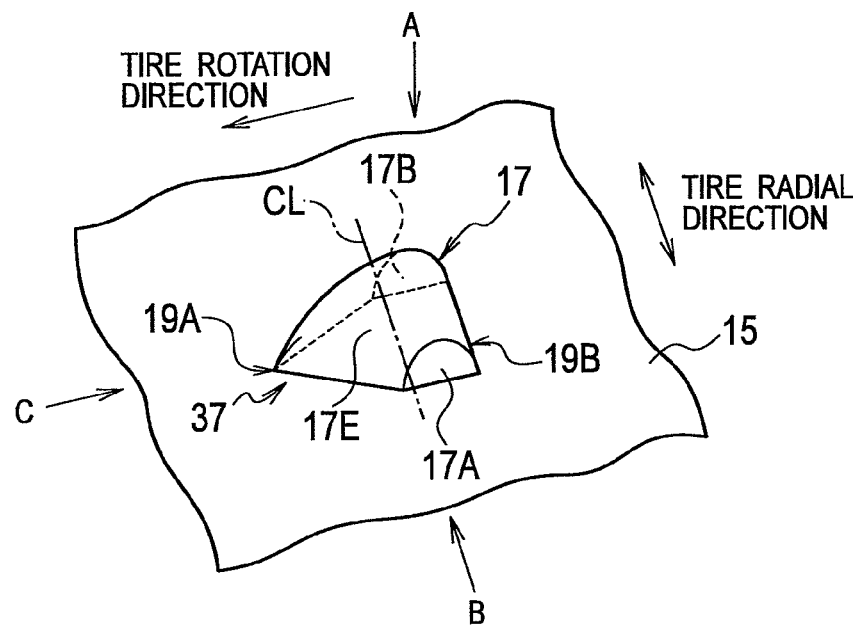
FIG. 45 is a perspective view showing a protrusion of Modification 3 according to the third embodiment.
Figure 46:
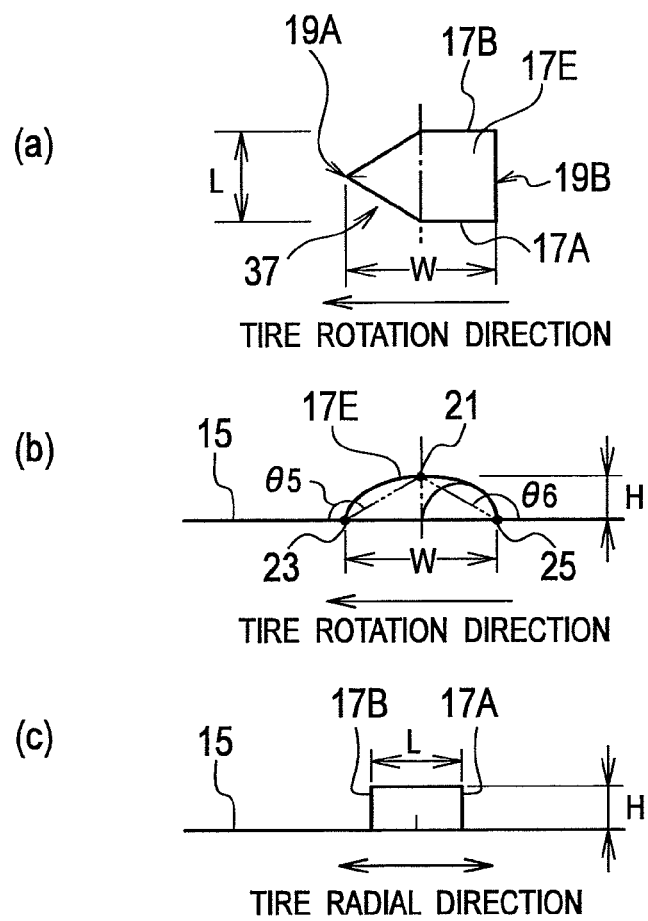
FIG. 46 is a top view showing the protrusion of Modification 3 according to the third embodiment.

FIG. 45 is a perspective view showing a protrusion of Modification 3 according to the third embodiment. Part (a) of FIG. 46 is a top view showing the protrusion of Modification 3 according to the third embodiment (a view seen in the arrow A of FIG. 45). Part (b) of FIG. 46 is a side view showing the protrusion of Modification 3 according to the third embodiment seen in the tire radial direction (a view seen in the arrow B of FIG. 45). Part (c) of FIG. 46 is a front view showing the protrusion of Modification 3 according to the third embodiment seen in the tire rotation direction (a view seen in the arrow C of FIG. 45).

As FIGS. 45 and 46 show, the protrusion 17 is formed of the inner face 17A, the outer face 17B, and the protrusion face 17E. The protrusion face 17E curves. Accordingly, the protrusion 17 is formed in a semi-sphere when viewed in the tire radial direction.

As part (b) of FIG. 46 shows, the front protrusion angle ($\theta 5$) and the rear protrusion angle ($\theta 6$) are each set to a value between 45° and 135°, inclusive. It is especially preferable to set the front protrusion angle ($\theta 5$) and the rear protrusion angle ($\theta 6$) to a value between 70° and 110°, inclusive, in order to efficiently reduce the tire temperature.

Figure 47:
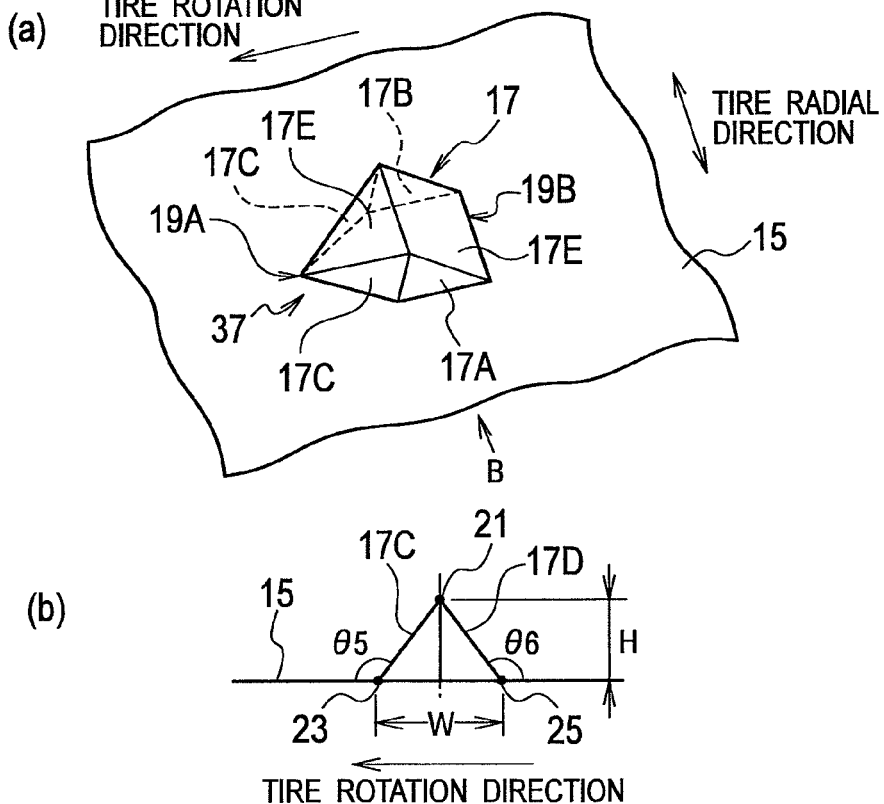
FIG. 47 is perspective and side views each showing the protrusion of Modification 3 according to the third embodiment (part 1).
Figure 48:
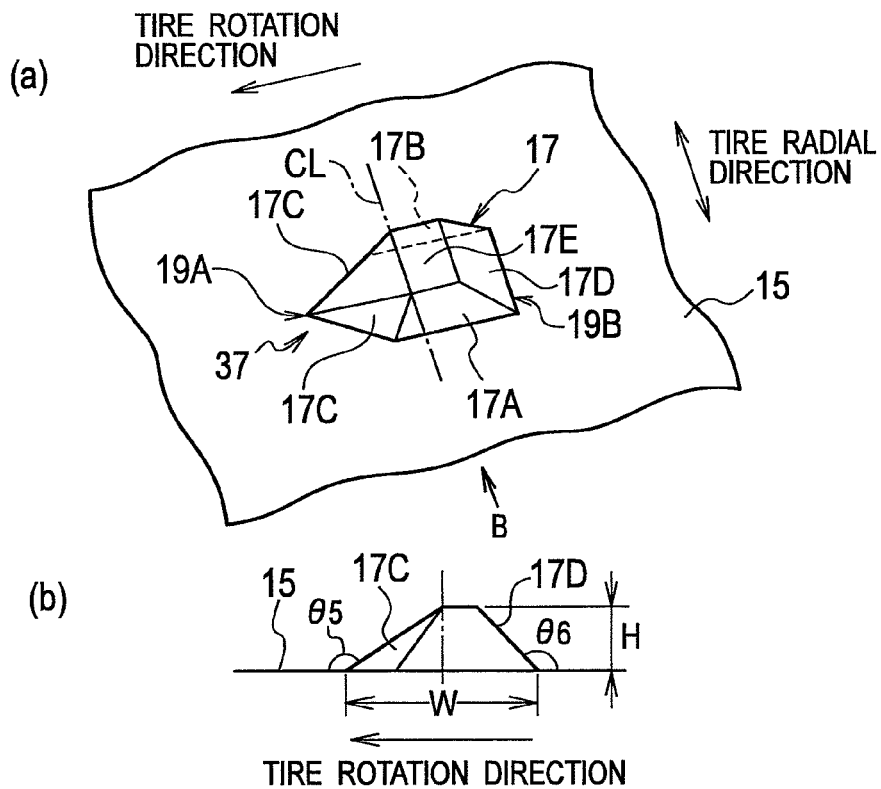
FIG. 48 is perspective and side views each showing the protrusion of Modification 3 according to the third embodiment (part 2).
Figure 49:
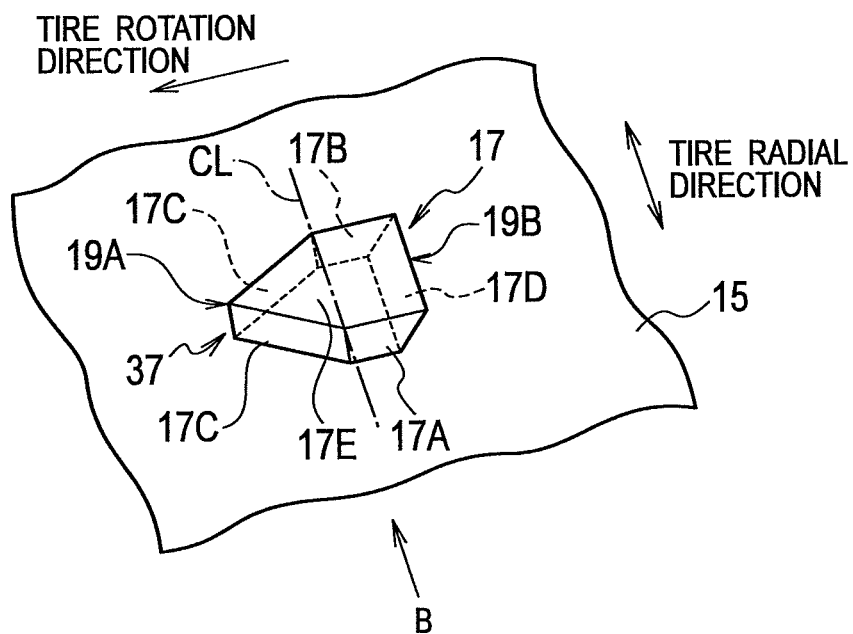
FIG. 49 is perspective, top, and side views each showing the protrusion of Modification 3 according to the third embodiment (part 3).
Figure 49:
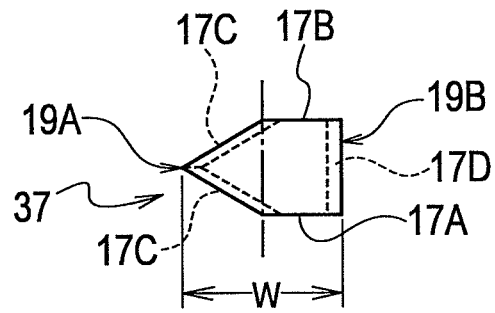
Figure 49:
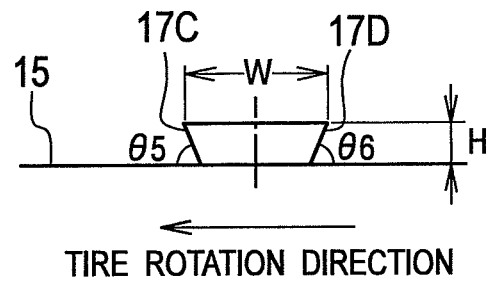

Although described above as such, the protrusion 17 is not limited to being formed in a semi-sphere when viewed in the tire radial direction. For example, the following modifications may be made. Specifically, as FIG. 47 shows, the protrusion 17 may be formed in a triangular when viewed in the tire radial direction. As FIG. 48 shows, the protrusion 17 may be formed in a trapezoid when viewed in the tire radial direction. Here, the trapezoid has a bottom face (the bottom face of the protrusion 17, which is in contact with the tire surface 15) wider than the protrusion face 17E. Moreover, as FIG. 49 shows, the protrusion 17 may be formed in a trapezoid when viewed in the tire radial direction. Here, the trapezoid has a bottom face narrower than the protrusion face 17E.

According to the pneumatic tire 1 of Modification 3 according to the third embodiment, the flow of fluid passing by around the protrusion 17 can be smoothly accelerated. Thereby, the tire temperature can be reduced efficiently.

Moreover, by setting the front protrusion angle ($\theta 5$) and the rear protrusion angle ($\theta 6$) to a value between 45° and 135°, inclusive, the flow of fluid having collided with the front part 19A (the front side of the protrusion face 17E) can increase a pressure near the front part 19A. Thereby, the flow of fluid passing by around the protrusion 17 can further be accelerated.

(Modification 4 According to Third Embodiment)

In the above description of the protrusion 17 according to the third embodiment, the protrusion 17 is formed in a parallelogram when viewed in the tire rotation direction (in a view of the arrow C). However, the following modifications may be made. Note that the same parts as those of the protrusion 17 according to the above-described third embodiment bear the same reference symbols, and different points are mainly described.

Figure 50:
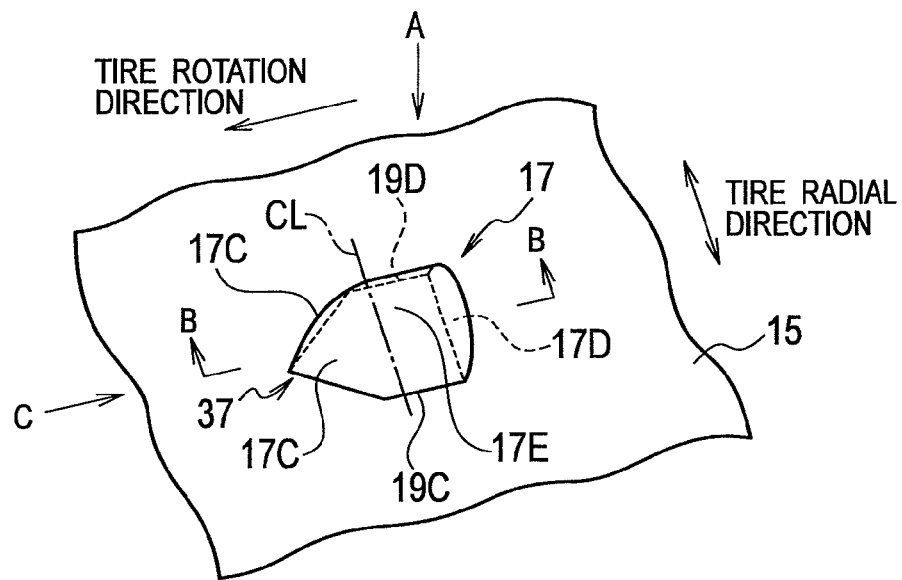
FIG. 50 is a perspective view showing a protrusion of Modification 4 according to the third embodiment.
Figure 51:
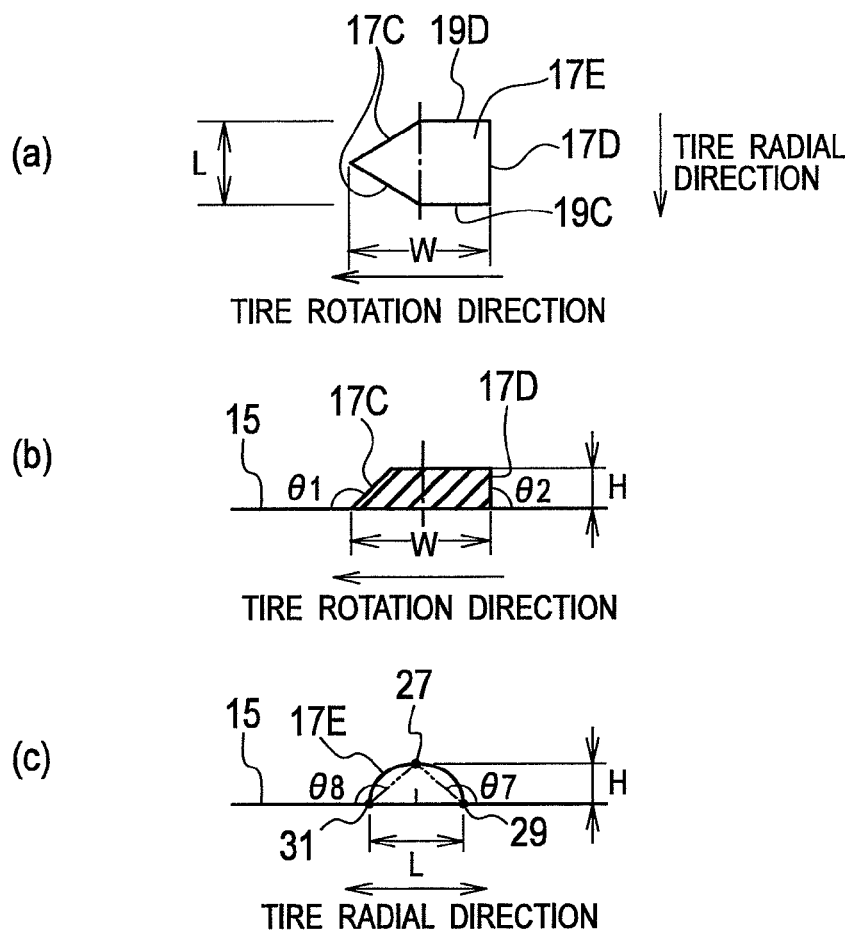
FIG. 51 is top, cross-sectional, and front views each showing the protrusion of Modification 4 according to the third embodiment.

FIG. 50 is a perspective view showing a protrusion of Modification 4 according to the third embodiment. Part (a) of FIG. 51 is a top view showing the protrusion of Modification 4 according to the third embodiment (a view seen in the arrow A of FIG. 50). Part (b) of FIG. 51 is a cross-sectional view showing the protrusion of Modification 4 according to the third embodiment seen in the tire radial direction (a B-B cross-sectional view of FIG. 50). Part (c) of FIG. 51 is a front view showing the protrusion of Modification 4 according to the third embodiment seen in the tire rotation direction (a view seen in the arrow C of FIG. 50).

As FIGS. 50 and 51 show, the protrusion 17 is formed of two front faces 17C, the rear face 17D, and two protrusion faces 17E. The protrusion faces 17E curve. Accordingly, the protrusion 17 is formed in a semi-sphere when viewed in the tire rotation direction.

As part (c) of FIG. 51 shows, the inner maximum angle ($\theta 7$) and the outer maximum angle ($\theta 8$) are each set to a value between 45° and 135°, inclusive. It is especially preferable to set the inner maximum angle ($\theta 7$) and the outer maximum angle ($\theta 8$) to a value between 70° and 110°, inclusive, in order to efficiently reduce the tire temperature.

Figure 52:
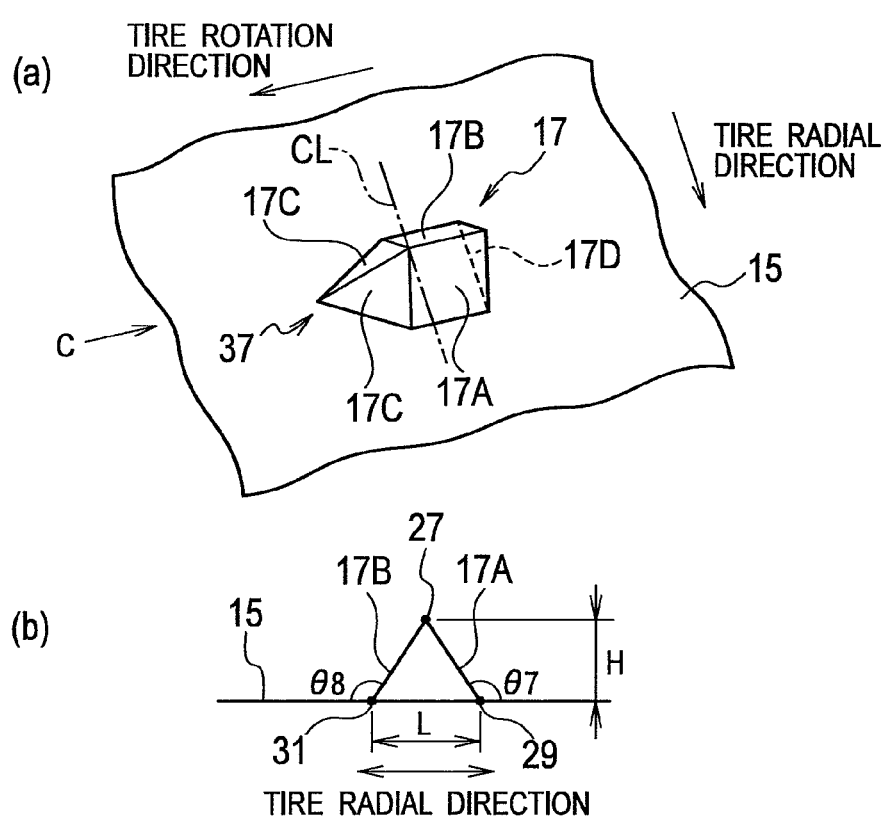
FIG. 52 is perspective and front views each showing the protrusion of Modification 4 according to the third embodiment (part 1).
Figure 53:
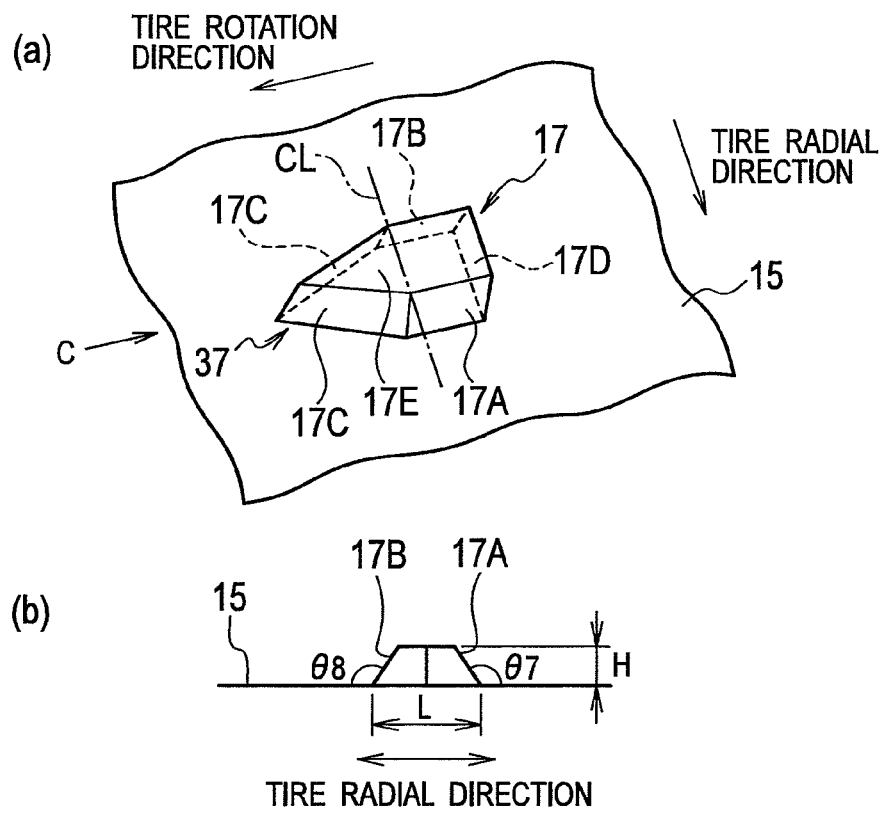
FIG. 53 is perspective and front views each showing the protrusion of Modification 4 according to the third embodiment (part 2).
Figure 54:
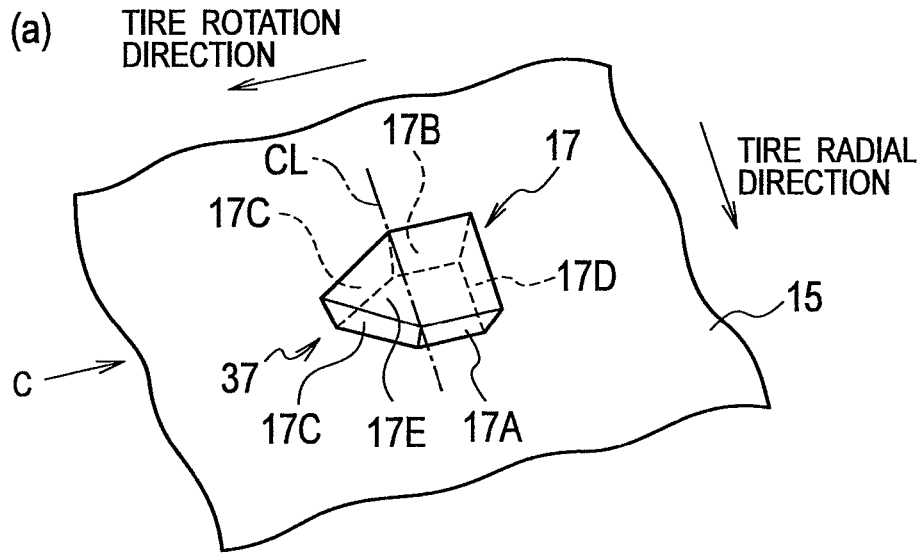
FIG. 54 is perspective, top, and front views each showing the protrusion of Modification 4 according to the third embodiment (part 3).
Figure 54:
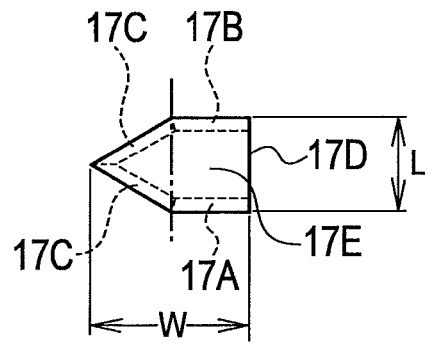
Figure 54:
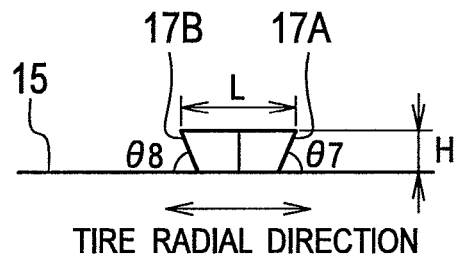

Although described above as such, the protrusion 17 is not limited to being formed in a semi-sphere when viewed in the tire rotation direction. For example, the following modifications may be made. Specifically, as FIG. 52 shows, the protrusion 17 may be formed in a triangular when viewed in the tire rotation direction. As FIG. 53 shows, the protrusion 17 may be formed in a trapezoid when viewed in the tire rotation direction. Here, the trapezoid has a bottom face wider than the protrusion face 17E. Moreover, as FIG. 54 shows, the protrusion 17 may be formed in a trapezoid when viewed in the tire rotation direction. Here, the trapezoid has a bottom face narrower than the protrusion face 17E.

According to the pneumatic tire 1 of Modification 4 according to the third embodiment, the flow of fluid passing by around the protrusion 17 can be smoothly accelerated. Thereby, the tire temperature can be reduced efficiently.

Moreover, the inner maximum angle ($\theta 7$) and the outer maximum angle ($\theta 8$) are set to a value between 45° and 135°, inclusive. Thereby, when fluid spreads around the protrusion 17 by colliding with the front faces 17C, the flow of the fluid thus separating from (spreading around) the protrusion 17 can be surely accelerated.

Examples According to Third Embodiment

Next, in order to further clarify the effects of the present invention, results obtained from tests performed using the following pneumatic tires according to comparative examples 1 to 3 and examples 1 to 23 will be described. It should be noted that these examples do not limit the present invention whatsoever.

Data on each of the pneumatic tires was acquired by measurement under the following conditions.

Tire Size: 285/50R20

Wheel Size: 8JJ×20

Internal Pressure Condition: 0 kPa (in a punctured state)

Load Condition: 9.8 kN

As shown in the following Tables 7 to 9, test tires A, test tires B, and test tires C were prepared to test durability of each of the pneumatic tires. The pneumatic tires according to the comparative examples 1 to 3 have no protrusions. The pneumatic tires according to the examples 1 to 23 have protrusions, and have different protrusion configurations (such as shapes, the protrusion radial-direction length (L), and the protrusion maximum height (H)), as shown in the following Tables 7 to 9.

TABLE 7

| | | | | TEST TIRE A | | | | | |
|---|---|---|---|---|---|---|---|---|---|
| | COMPARATIVE EXAMPLE 1 | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
| PROTRUSION TOP VIEW (TOP) | — | | | | | ⇨◁ | | | | |
| TIRE RADIAL DIRECTION VIEW (SIDE) | — | | | ⇨ | | | | | | |
| TIRE ROTATION DIRECTION VIEW (FRONT) | — | | | | | | | | | |
| PROTRUSION RADIAL DIRECTION LENGTH (L) | — | 0.4 | 2 | 8 | 2 | 2 | 2 | 2 | 2 | 2 |
| PROTRUSION MAXIMUM HEIGHT (H) | — | 2 | 2 | 2 | 0.4 | 8 | 2 | 2 | 2 | 2 |
| θ1, θ2 (DEGREES) | — | 90 | 90 | 90 | 90 | 90 | 50 | 130 | 90 | 90 |
| θ3, θ4 (DEGREES) | — | 90 | 90 | 90 | 90 | 90 | 90 | 90 | 50 | 130 |
| DURABILITY | 100 | 101 | 140 | 104 | 104 | 105 | 102 | 105 | 104 | 105 |

TABLE 8

| | | | | TEST TIRE B | | | | | |
|---|---|---|---|---|---|---|---|---|---|
| | COMPARATIVE EXAMPLE 2 | EXAMPLE 10 | EXAMPLE 11 | EXAMPLE 12 | EXAMPLE 13 | EXAMPLE 14 | EXAMPLE 15 | EXAMPLE 16 | EXAMPLE 17 | EXAMPLE 18 |
| PROTRUSION TOP VIEW (TOP) | — | | | | | ⇨◁ | | | | |
| TIRE RADIAL DIRECTION VIEW (SIDE) | — | | | ⇨ | | | | | | |
| TIRE ROTATION DIRECTION VIEW (FRONT) | — | | | | | | | | | |
| PROTRUSION RADIAL DIRECTION LENGTH (L) | — | 0.4 | 2 | 8 | 2 | 2 | 2 | 2 | 2 | 2 |
| PROTRUSION MAXIMUM HEIGHT (H) | — | 2 | 2 | 2 | 0.4 | 8 | 2 | 2 | 2 | 2 |
| θ1, θ2 (DEGREES) | — | 90 | 90 | 90 | 90 | 90 | 50 | 130 | 90 | 90 |
| θ3, θ4 (DEGREES) | — | 90 | 90 | 90 | 90 | 90 | 90 | 90 | 50 | 130 |
| DURABILITY | 100 | 101 | 142 | 104 | 104 | 105 | 103 | 106 | 104 | 105 |

TABLE 9

| | TEST TIRE C | | | | | |
|---|---|---|---|---|---|---|
| | COMPARATIVE EXAMPLE 3 | EXAMPLE 19 | EXAMPLE 20 | EXAMPLE 21 | EXAMPLE 22 | EXAMPLE 23 |
| PROTRUSION TOP VIEW (TOP) | — | | | ⇨◁ | | |
| TIRE RADIAL DIRECTION VIEW (SIDE) | — | | | ⇨⌒ | | |
| TIRE ROTATION DIRECTION VIEW (FRONT) | — | | | ⌒ | | |
| PROTRUSION RADIAL DIRECTION LENGTH (L) | — | 0.4 | 2 | 8 | 2 | 2 |
| PROTRUSION MAXIMUM HEIGHT (H) | — | 2 | 2 | 2 | 0.4 | 8 |
| DURABILITY | 100 | 101 | 130 | 104 | 104 | 105 |

<Durability>

Each of the pneumatic tires was fitted into a drum test machine placed indoors, was rotated at a constant speed (90 km/h), and measured for its durable distance until breakage. The durability of the pneumatic tire of each of the comparative examples 1 to 3 was set to '100.' Then, the durability of each of the other pneumatic tires was evaluated by a relative value to 100. Note that the larger the index, the better the durability.

As a result, as shown in Tables 7 to 9, it was found that the pneumatic tires according to the examples 1 to 23 have excellent durability compared to that of the pneumatic tires according to the comparative examples 1 to 3. Particularly, similarly to the examples according to the second embodiment, the pneumatic tire satisfying the relationship $1.0 \leq L/H \leq 50.0$ was found to have excellent durability, as shown in FIG. 36. Also, the pneumatic tire having the protrusion maximum height (H) of 0.3 mm to 15 mm was found to have excellent durability, as shown in FIG. 37.

Fourth Embodiment

Next, the configuration of a protrusion 17 according to a fourth embodiment will be described with reference to FIGS. 55 and 56. Note that the same parts as those of the pneumatic tire 1 according to the above-described first embodiment bear the same reference symbols, and different parts will mainly be described. Namely, points such as the configuration of the pneumatic tire 1 and the arrangement and arrangement density of the protrusions 17 are not repeatedly described. However, some points may be partly repeated.

Figure 55:
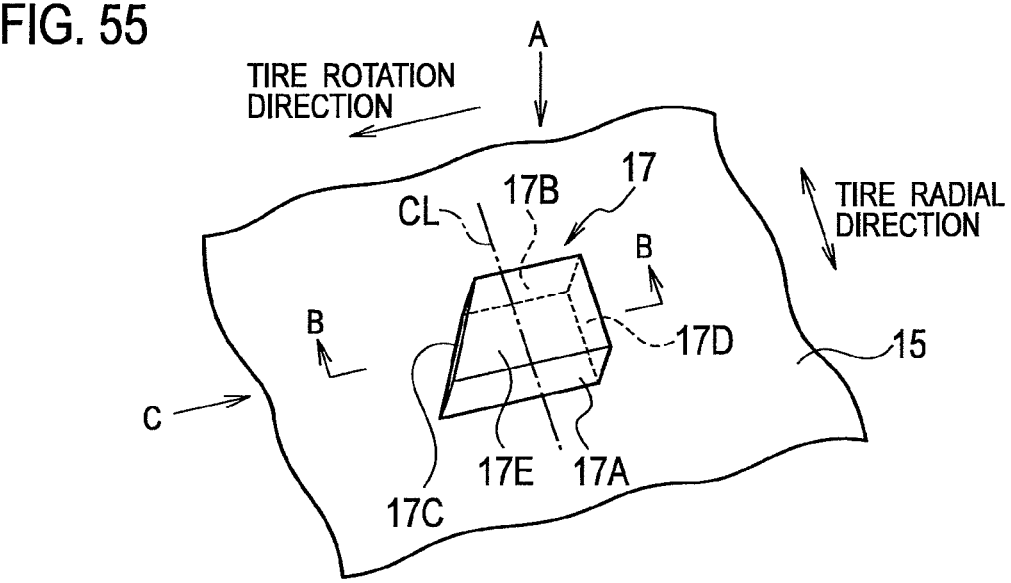
FIG. 55 is a perspective view showing a protrusion according to a fourth embodiment.

FIG. 55 is a perspective view showing the protrusion according to the fourth embodiment. Part (a) of FIG. 56 is a top view showing the protrusion according to the fourth embodiment (a view seen in the arrow A of FIG. 55). Part (b) of FIG. 56 is a cross-sectional view showing the protrusion according to the fourth embodiment seen in the tire radial direction (a B-B cross-sectional view of FIG. 55). Part (c) of FIG. 56 is a front view showing the protrusion according to the fourth embodiment seen in the tire rotation direction (a view seen in the arrow C of FIG. 55).

Figure 56:
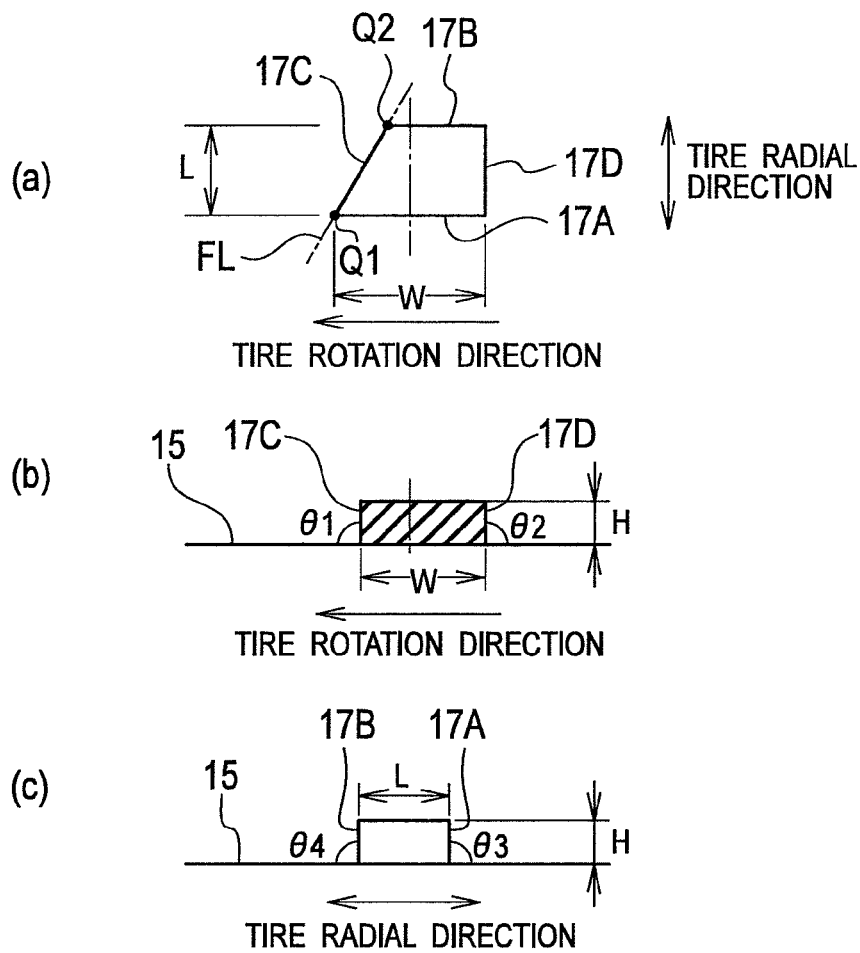
FIG. 56 is top, cross-sectional, and front views each showing the protrusion according to the fourth embodiment.

As FIGS. 55 and 56 show, the protrusion 17 is formed of an inner face 17A, an outer face 17B, a front face 17C, a rear face 17D, and a protrusion face 17E.

As part (a) of FIG. 56 shows, in a top view of the protrusion, the front face 17C has a front inner point (Q1) located at an innermost position in the tire radial direction, and a front outer point (Q2) located at an outermost position in the tire radial direction. The front inner point (Q1) is located frontward, in the tire rotation direction, of the front outer point (Q2). In other words, a protrusion front line FL connecting the front inner point (Q1) and the front outer point (Q2) inclines relative to the protrusion radial-direction center line CL.

In a top view of the protrusion 17, each of the inner face 17A, the outer face 17B, the front face 17C, and the rear face 17D is linearly (flatly) formed.

As part (b) of FIG. 56 shows, the protrusion 17 is formed in a parallelogram in a view in the tire radial direction, which is a view that the protrusion 17 is viewed in the tire radial direction. In addition, as part (c) of FIG. 56 shows, the protrusion 17 is formed in a parallelogram also in a view in the tire rotation direction, which is a view that the protrusion 17 is viewed from the front side in the tire rotation direction.

Accordingly, the inner face 17A and the outer face 17B are formed substantially perpendicular to the protrusion radial-direction center line CL. Further, the front face 17C (protrusion front line FL) inclines relative to the protrusion radial-direction center line CL. The rear face 17D is formed substantially parallel to the protrusion radial-direction center line CL. The protrusion face 17E is formed substantially parallel to the tire surface 15.

As part (b) of FIG. 56 shows, a front angle ($\theta 1$) and a rear angle ($\theta 2$) are each set to a value between 45° and 135°, inclusive. It is especially preferable to set the front angle ($\theta 1$) and the rear angle ($\theta 2$) to a value between 70° and 110°, inclusive, in order to reduce the tire temperature efficiently.

As part (c) of FIG. 56 shows, an inner angle ($\theta 3$) and an outer angle ($\theta 4$) are each set to a value between 45° and 135°, inclusive. It is especially preferable to set the inner angle ($\theta 3$) and the outer angle ($\theta 4$) to a value between 70° and 110°, inclusive.

(Operations and Effects According to Fourth Embodiment)

According to the pneumatic tire 1 according to the fourth embodiment described above, the front inner point (Q1) is located frontward, in the tire rotation direction, of the front outer point (Q2) (the front face 17C (protrusion front line FL) inclines relative to the protrusion radial-direction center line CL). This allows a pressure to increase at the front side (front face 17C), in the tire rotation direction, of the protrusion 17. This pressure increase can accelerate the flow of fluid passing by around the protrusion 17 (namely, can improve a heat dissipation rate of the tire temperature). Thereby, without an occurrence of new breakage, the pneumatic tire 1 can reduce the tire temperature efficiently while maintaining general driving performance.

Figure 57:
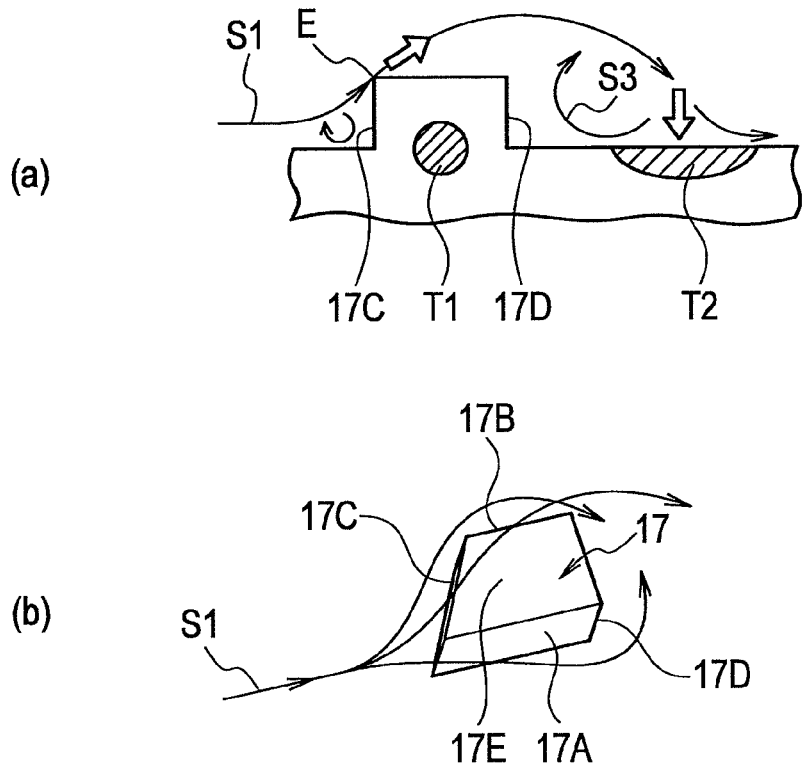
FIG. 57 is a view for illustrating operations and effects of the protrusion according to the fourth embodiment.

Specifically, as FIG. 57 shows, as the pneumatic tire 1 rotates, the protrusion 17 causes fluid (called a main flow S1 below) in contact with the tire surface 15 (the sidewall part SW) to separate from the sidewall part SW. Then, the main flow S1 flows over an edge E of the protrusion 17 and accelerates toward the rear side in the tire rotation direction (namely rearward).

Then, by the inclination of the front face 17C (protrusion front line FL) relative to the protrusion radial-direction center line CL, the main flow S1 is separated from the front inner point (Q1) located frontward, in the tire rotation direction, of the front outer point (Q2) before flowing over the edge E. Thus, the main flow S1 is accelerated when flowing over the edge E.

The main flow S1 thus accelerated flows in a direction perpendicular to the tire surface 15 at the back side of the rear face 17D. At this time, fluid S3 flows a part (region) where the flow of the fluid stays, thereby draws heat staying at the back side of the rear face 17D, and then again merges with the main flow S1.

The main flow S1 flows over the edge E and thus accelerates, and the fluid S3 draws heat and then again merges with the main flow S1. This allows a temperature reduction in a large area of the tire. Particularly, a temperature can be reduced at a basal part T1 of the protrusion 17 and at a region T2 where the main flow S1 comes in contact in the perpendicular direction.

(Modification 1 According to Fourth Embodiment)

In the above description of the protrusion 17 according to the fourth embodiment, the inner face 17A and the outer face 17B forming the protrusion 17 are formed substantially perpendicular to the protrusion radial-direction center line CL. However, the following modifications may be made. Note that the same parts as those of the protrusion 17 according to the above-described fourth embodiment bear the same reference symbols, and different points are mainly described.

Figure 58:
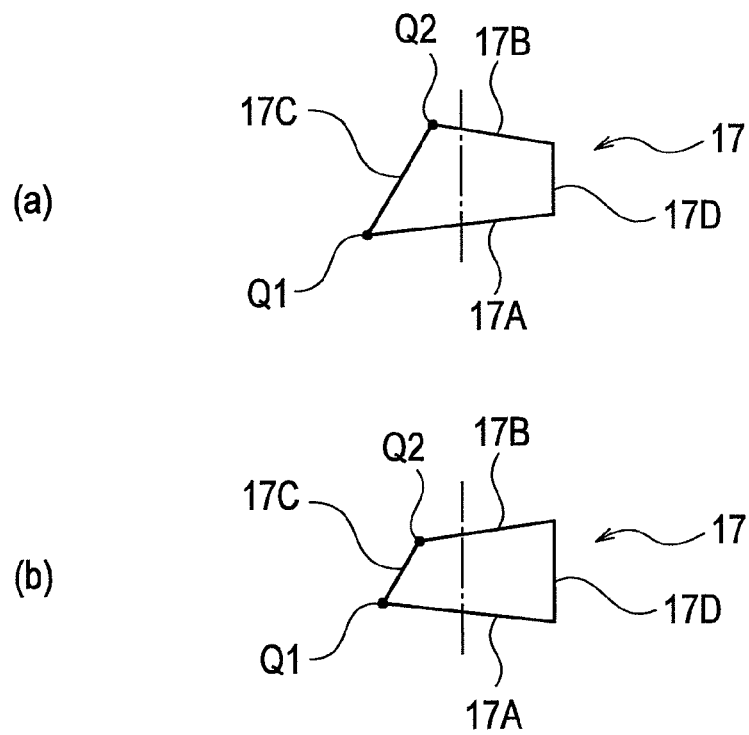
FIG. 58 is a top view showing a protrusion of Modification 1 according to the fourth embodiment.

FIG. 58 is a top view showing a protrusion of Modification 1 according to the fourth embodiment. As parts (a) and (b) of FIG. 58 show, the inner face 17A and the outer face 17B incline relative to the protrusion radial-direction center line CL. Also in this case, the front inner point (Q1) is located frontward, in the tire rotation direction, of the front outer point (Q2). In other words, the front face 17C (protrusion front line FL) inclines relative to the protrusion radial-direction center line CL.

According to the pneumatic tire 1 of Modification 1 according to the fourth embodiment, the flow of fluid passing by around the protrusion 17 can be smoothly accelerated. Thereby, the tire temperature can be reduced efficiently.

(Modification 2 According to Fourth Embodiment)

In the above description of the protrusion 17 according to the fourth embodiment, the rear face 17D is formed substantially parallel to the protrusion radial-direction center line CL. However, the following modifications may be made. Note that the same parts as those of the protrusion 17 according to the above-described fourth embodiment bear the same reference symbols, and different points are mainly described.

Figure 59:
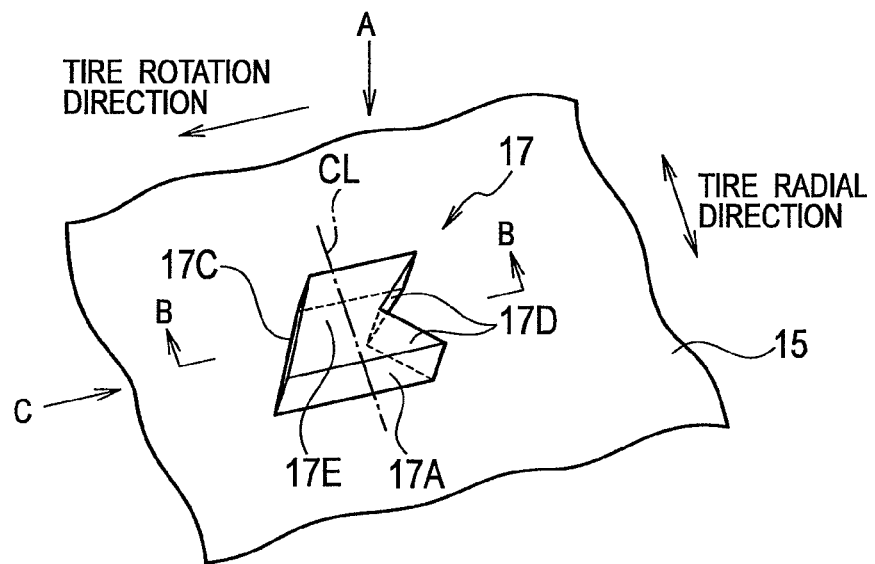
FIG. 59 is a perspective view showing a protrusion of Modification 2 according to the fourth embodiment.
Figure 60:
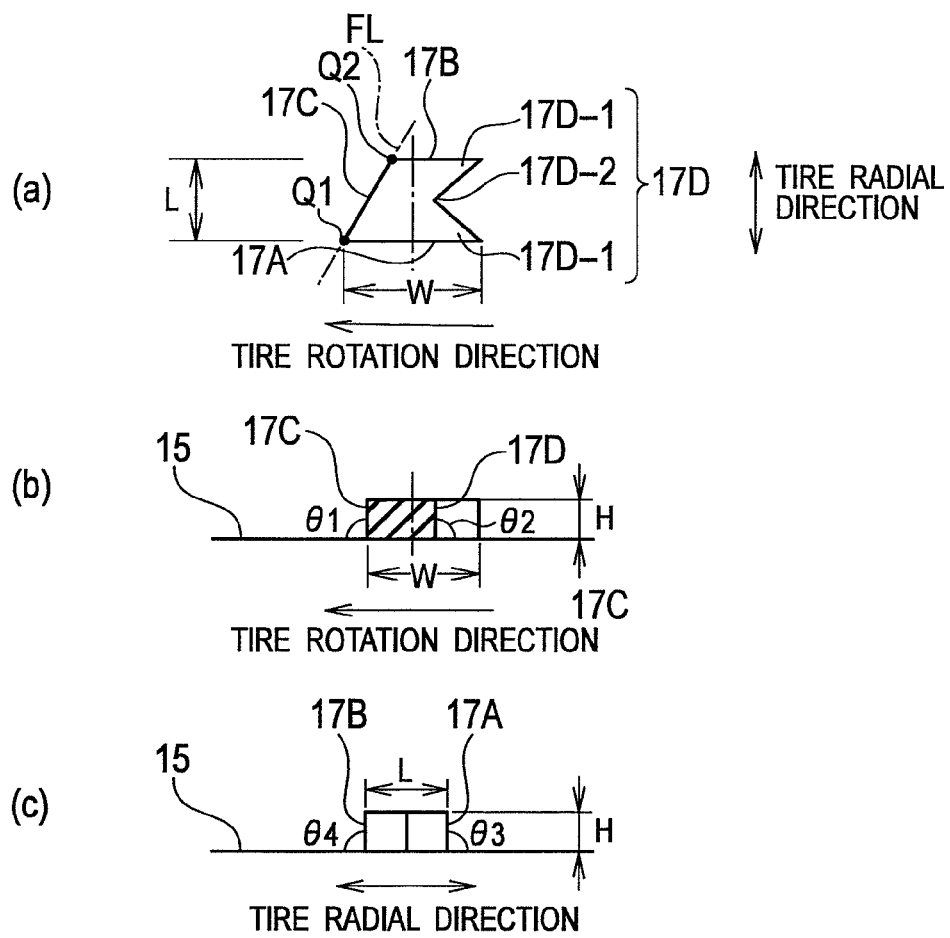
FIG. 60 is top, cross-sectional, and front views each showing the protrusion of Modification 2 according to the fourth embodiment.

FIG. 59 is a perspective view showing a protrusion of Modification 2 according to the fourth embodiment. Part (a) of FIG. 60 is a top view showing the protrusion of Modification 2 according to the fourth embodiment (a view seen in the arrow A of FIG. 59). Part (b) of FIG. 60 is a cross-sectional view showing the protrusion of Modification 2 according to the fourth embodiment seen in the tire radial direction (a B-B cross-sectional view of FIG. 59). Part (c) of FIG. 60 is a front view showing the protrusion of Modification 2 according to the fourth embodiment seen in the tire rotation direction (a view seen in the arrow C of FIG. 59).

As FIGS. 59 and 60 show, the protrusion 17 is formed of the inner face 17A, the outer face 17B, the front face 17C, two rear faces 17D, and the protrusion face 17E.

The protrusion 17 is provided with two rear convex parts 17D-1 and a single rear concave part 17D-2 rearward, in the tire rotation direction, of the protrusion radial-direction center line CL. The rear convex parts 17D-1 protrude rearward in the tire rotation direction, and the rear concave part 17D-2 is concave in the tire rotation direction.

The rear convex parts 17D-1 and the rear concave part 17D-2 are linearly formed. The two rear faces 17D have the same size. However, the two rear faces 17D are not limited to having the same size, and may of course have different sizes.

Figure 61:
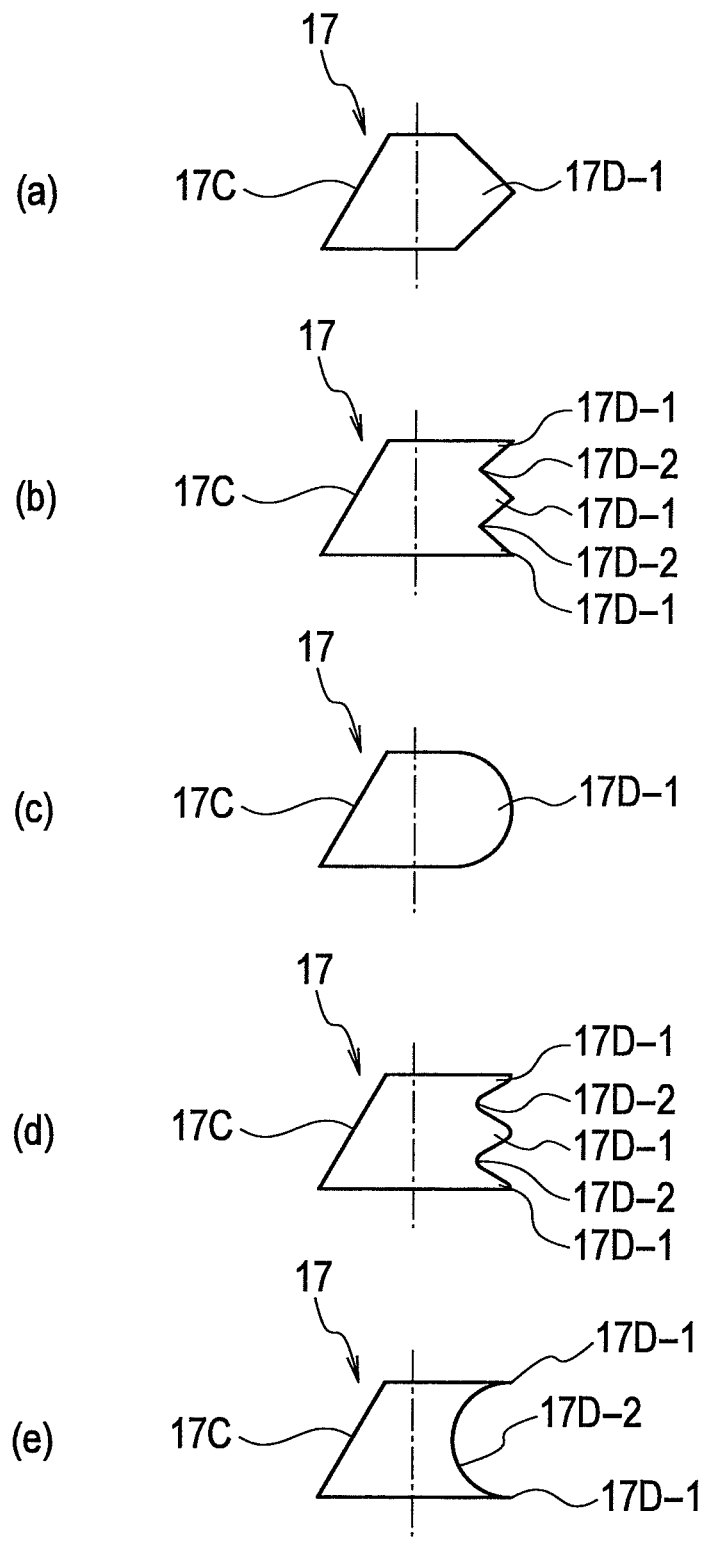
FIG. 61 is a top view showing the protrusion of Modification 2 according to the fourth embodiment.

Although described above as such, the protrusion 17 is not limited to being provided, at its rear part, with the rear convex parts 17D-1 and the rear concave part 17D-2 rearward, in the tire rotation direction, of the protrusion radial-direction center line CL. For example, as part (a) of FIG. 61 shows, only the rear convex part 17D-1 may be provided. There is no limitation as long as any one of the rear convex part 17D-1 and the rear concave part 17D-2 is provided.

Further, although described above as such, the protrusion 17 is not limited to being provided with the two rear convex parts 17D-1 and the single rear concave part 17D-2 rearward, in the tire rotation direction, of the protrusion radial-direction center line CL. For example, as part (b) of FIG. 61 shows, three rear convex parts 17D-1 and two rear concave parts 17D-2 may be provided.

Moreover, although described above as such, the protrusion 17 is not limited to being linearly formed. For example, the following modifications may be made. Specifically, as part (c) of FIG. 61 shows, only the rear convex part 17D-1 may be formed in a curve. As part (d) of FIG. 61 shows, three rear convex parts 17D-1 each having a curved end and two rear concave parts 17D-1 each having a curved end may be formed in a curve. Moreover, as part (e) of FIG. 61 shows, the rear concave part 17D-2 may be formed in a curve between two rear convex parts 17D-1.

According to the pneumatic tire 1 of Modification 2 according to the fourth embodiment, the rear convex part 17D-1 is provided rearward, in the tire rotation direction, of the protrusion radial-direction center line CL. Accordingly, fluid flowing backward can be smoothly returned to the main flow. Thereby, the tire temperature can be reduced efficiently.

Further, provision of the rear concave part 17D-2 rearward, in the tire rotation direction, of the protrusion radial-direction center line CL makes the volume of the protrusion 17 smaller and the distance between the basal part of the protrusion 17 and the tire surface 15 shorter. Thereby, a temperature increase in the basal part of the protrusion 17 can be suppressed.

Furthermore, by providing the rear convex part 17D-1 and the rear concave part 17D-2 rearward, in the tire rotation direction, of the protrusion radial-direction center line CL, not only can the flow of fluid passing by around the protrusion 17 be accelerated, a temperature increase in the basal part of the protrusion 17 can be suppressed. Consequently, the tire temperature can be reduced more efficiently.

(Modification 3 According to Fourth Embodiment)

In the above description of the protrusion 17 according to the fourth embodiment, the protrusion 17 is formed in a parallelogram when viewed in the tire radial direction (a B-B cross-sectional view). However, the following modifications may be made. Note that the same parts as those of the protrusion 17 according to the above-described fourth embodiment bear the same reference symbols, and different points are mainly described.

Figure 62:
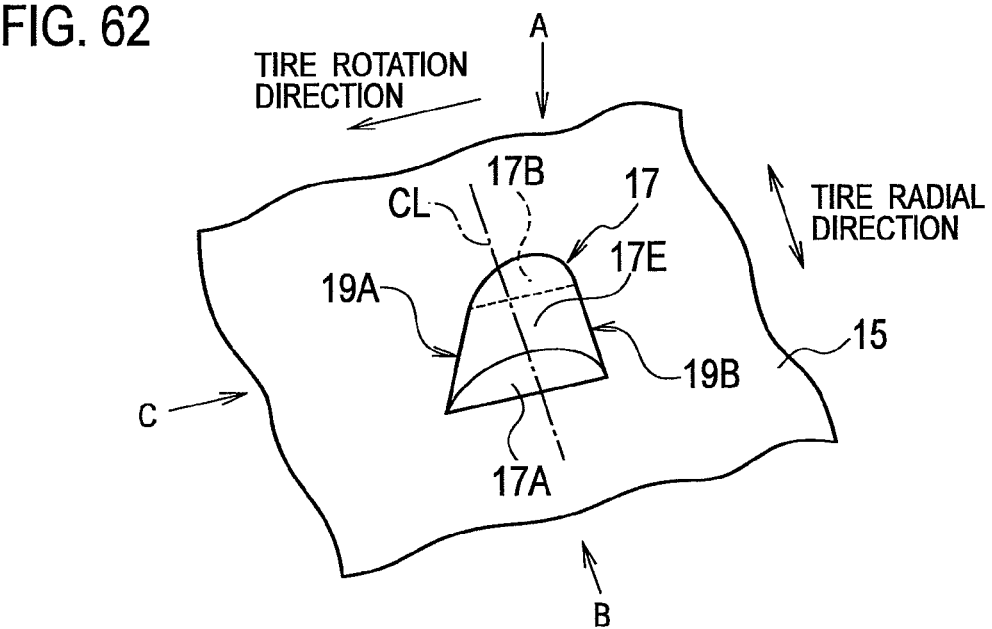
FIG. 62 is a perspective view showing a protrusion of Modification 3 according to the fourth embodiment.
Figure 63:
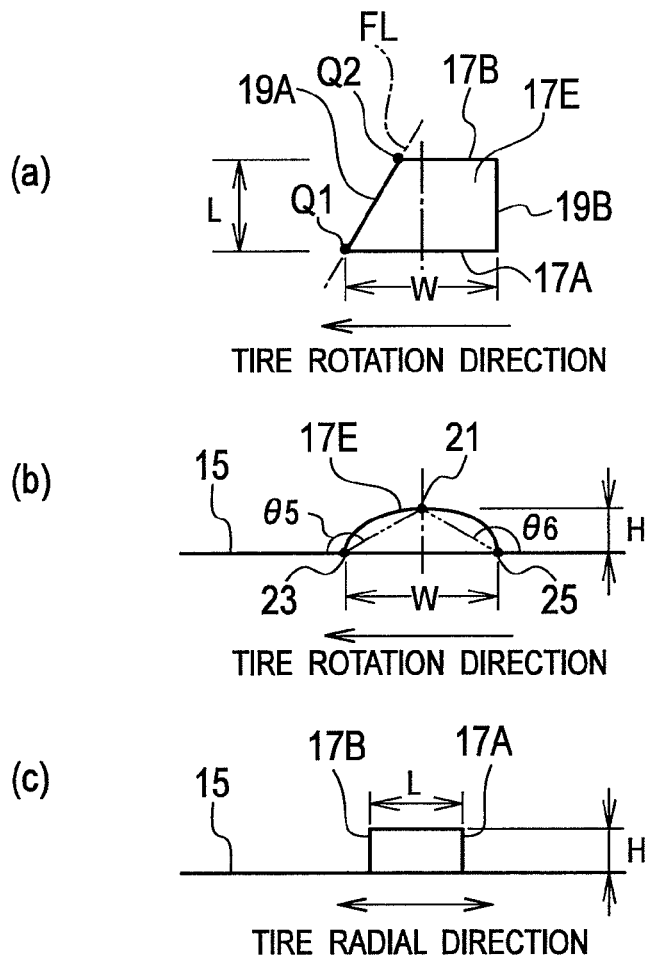
FIG. 63 is top, side, and front views each showing the protrusion of Modification 3 according to the fourth embodiment (part 1).

FIG. 62 is a perspective view showing a protrusion of Modification 3 according to the fourth embodiment. Part (a) of FIG. 63 is a top view showing the protrusion of Modification 3 according to the fourth embodiment (a view seen in the arrow A of FIG. 62). Part (b) of FIG. 63 is a side view showing the protrusion of Modification 3 according to the fourth embodiment seen in the tire radial direction (a view seen in the arrow B of FIG. 62). Part (c) of FIG. 63 is a front view showing the protrusion of Modification 3 according to the fourth embodiment seen in the tire rotation direction (a view seen in the arrow C of FIG. 62).

As FIGS. 62 and 63 show, the protrusion 17 is formed of the inner face 17A, the outer face 17B, and the protrusion face 17E. The protrusion face 17E curves. Accordingly, the protrusion 17 is formed in a semi-sphere when viewed in the tire radial direction.

As part (a) of FIG. 63 shows, in a top view of the protrusion, a front part 35 (front face) has the front inner point (Q1) located at an innermost position in the tire radial direction and the front outer point (Q2) located at an outermost position in the tire radial direction. The front inner point (Q1) is located frontward, in the tire rotation direction, of the front outer point (Q2). In other words, the protrusion front line FL connecting the front inner point (Q1) and the front outer point (Q2) inclines relative to the protrusion radial-direction center line CL.

As part (b) of FIG. 63 shows, the front protrusion angle (θ5) and the rear protrusion angle (θ6) are each set to a value between 45° and 135°, inclusive. It is especially preferable to set the front protrusion angle (θ5) and the rear protrusion angle (θ6) to a value between 70° and 110°, inclusive, in order to efficiently reduce the tire temperature.

Figure 64:
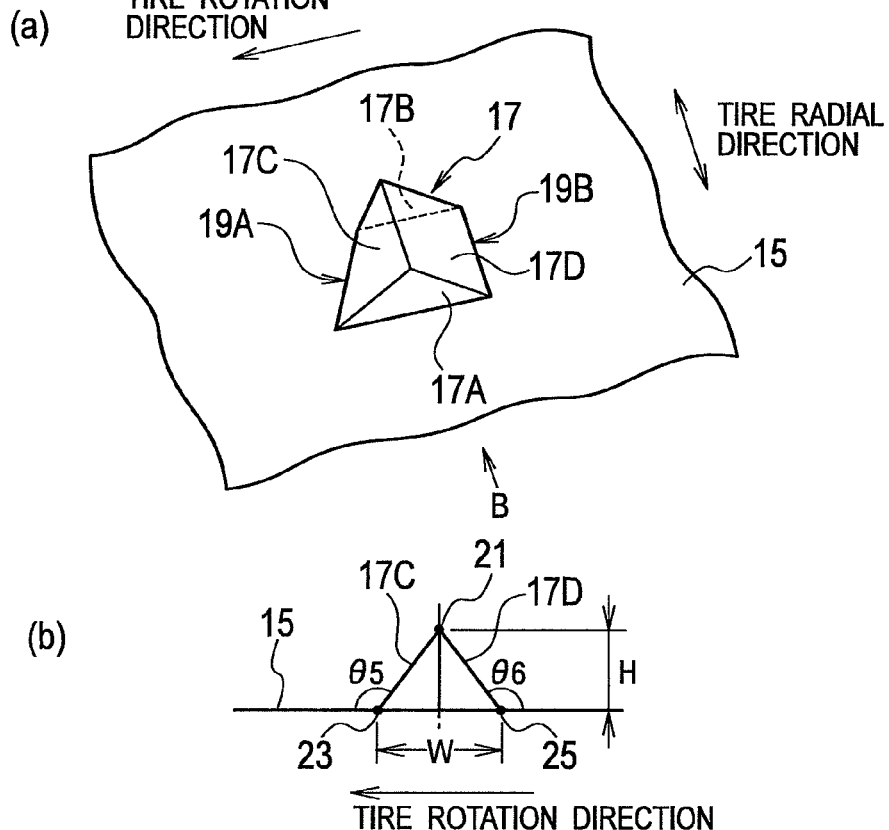
FIG. 64 is perspective and side views each showing the protrusion of Modification 3 according to the fourth embodiment (part 1).
Figure 65:
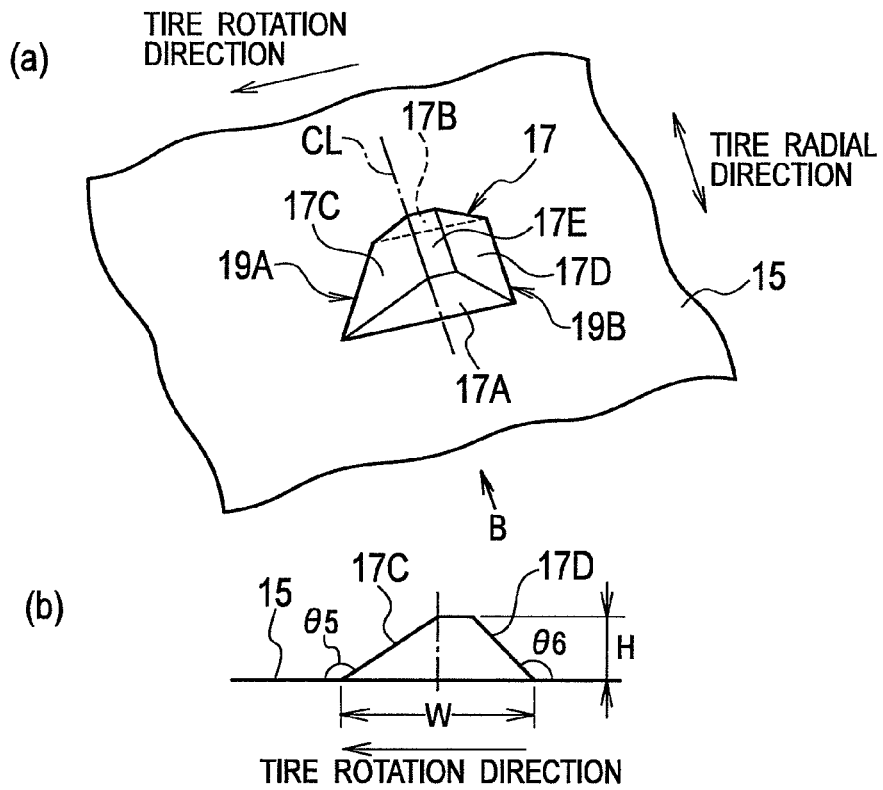
FIG. 65 is perspective and side views each showing the protrusion of Modification 3 according to the fourth embodiment (part 2).
Figure 66:
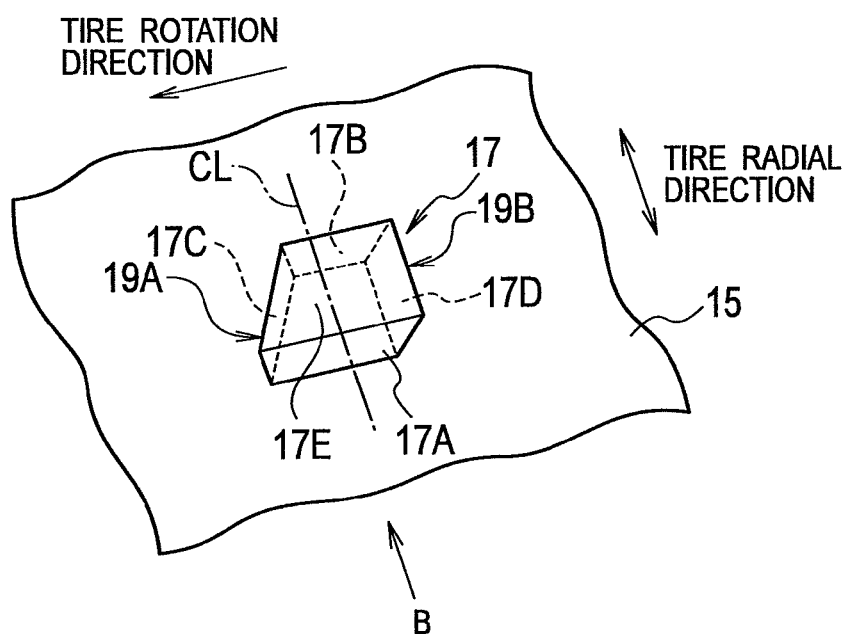
FIG. 66 is perspective, top, and side views each showing the protrusion of Modification 3 according to the fourth embodiment (part 2).
Figure 66:
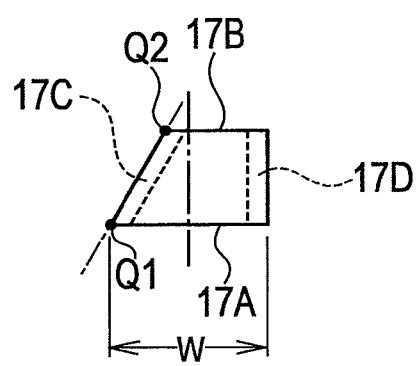
Figure 66:
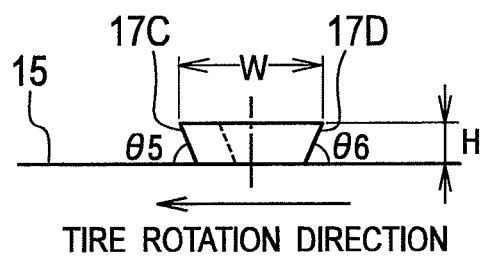

Although described above as such, the protrusion 17 is not limited to being formed in a semi-sphere when viewed in the tire radial direction. For example, the following modifications may be made. Specifically, as FIG. 64 shows, the protrusion 17 may be formed in a triangular when viewed in the tire radial direction. As FIG. 65 shows, the protrusion 17 may be formed in a trapezoid when viewed in the tire radial direction. Here, the trapezoid has a bottom face (the bottom face of the protrusion 17, which is in contact with the tire surface 15) wider than the protrusion face 17E. Moreover, as FIG. 66 shows, the protrusion 17 may be formed in a trapezoid when viewed in the tire radial direction. Here, the trapezoid has a bottom face narrower than the protrusion face 17E.

According to the pneumatic tire 1 of Modification 3 according to the fourth embodiment, the flow of fluid passing by around the protrusion 17 can be smoothly accelerated. Thereby, the tire temperature can be reduced efficiently.

Moreover, by setting the front protrusion angle (θ5) and the rear protrusion angle (θ6) to a value between 45° and 135°, inclusive, the flow of fluid having collided with the front part 19A (the front side of the protrusion face 17E) can increase a pressure near the front part 19A. Thereby, the flow of fluid passing by around the protrusion 17 can further be accelerated.

(Modification 4 According to Fourth Embodiment)

In the above description of the protrusion 17 according to the fourth embodiment, the protrusion 17 is formed in a parallelogram when viewed in the tire rotation direction (in a view of the arrow C). However, the following modifications may be made. Note that the same parts as those of the protrusion 17 according to the above-described fourth embodiment bear the same reference symbols, and different points are mainly described.

Figure 67:
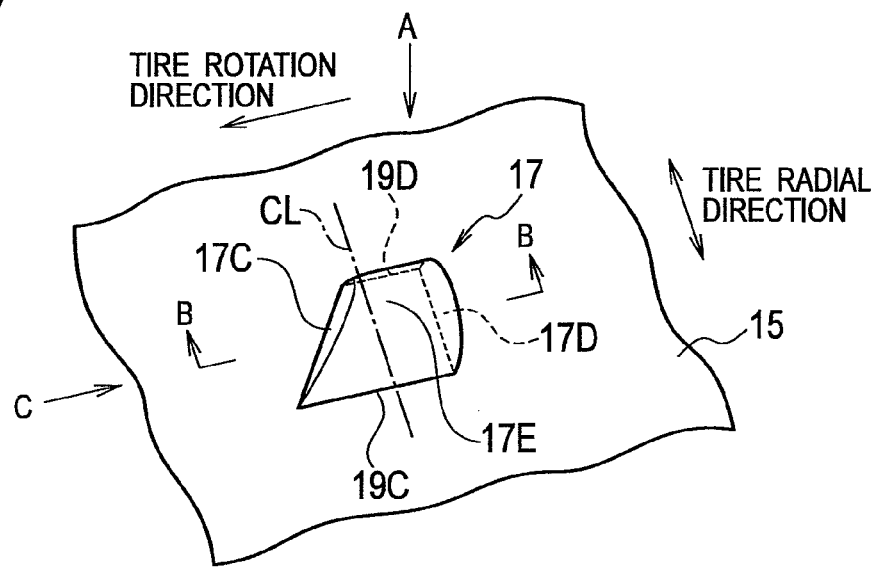
FIG. 67 is a perspective view showing a protrusion of Modification 4 according to the fourth embodiment.
Figure 68:
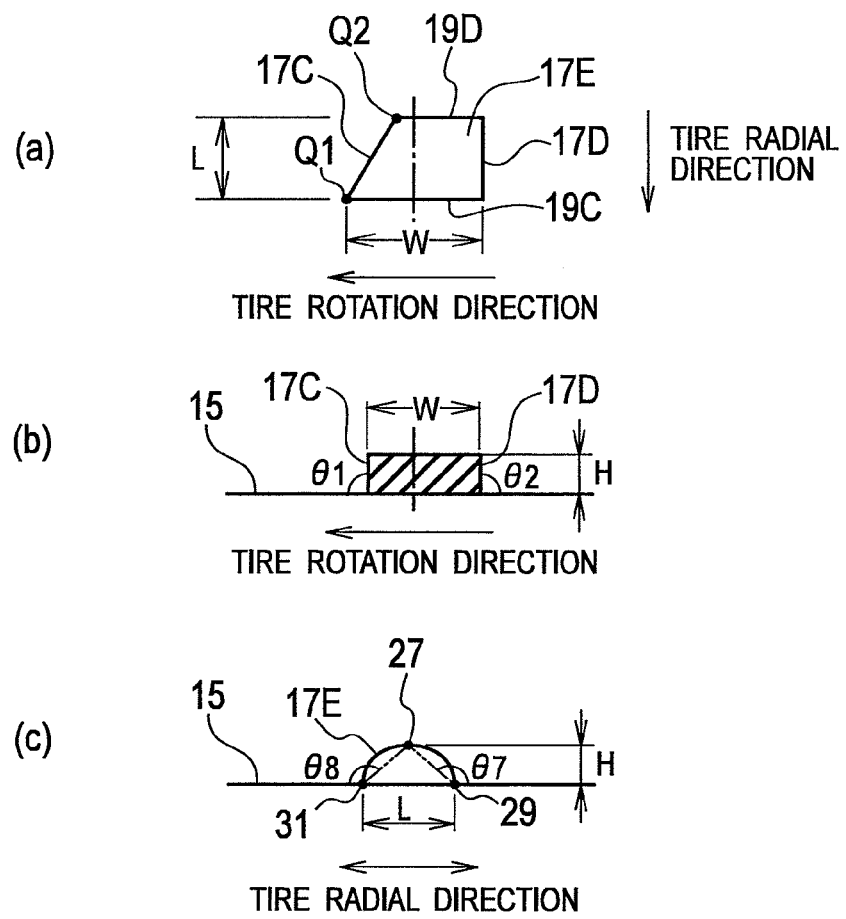
FIG. 68 is top, cross-sectional, and front views each showing the protrusion of Modification 4 according to the fourth embodiment (part 1).

FIG. 67 is a perspective view showing a protrusion of Modification 4 according to the fourth embodiment. Part (a) of FIG. 68 is a top view showing the protrusion of Modification 4 according to the fourth embodiment (a view seen in the arrow A of FIG. 67). Part (b) of FIG. 68 is a cross-sectional view showing the protrusion of Modification 4 according to the fourth embodiment seen in the tire radial direction (a B-B cross-sectional view of FIG. 67). Part (c) of FIG. 68 is a front view showing the protrusion of Modification 4 according to the fourth embodiment seen in the tire rotation direction (a view seen in the arrow C of FIG. 67).

As FIGS. 67 and 68 show, the protrusion 17 is formed of the front face 17C, the rear face 17D, and the protrusion face 17E. The protrusion face 17E curves. Accordingly, the protrusion 17 is formed in a semi-sphere when viewed in the tire rotation direction.

As part (a) of FIG. 68 shows, in a top view of the protrusion, the front inner point (Q1) is located frontward, in the tire rotation direction, of the front outer point (Q2). In other words, the protrusion front line FL connecting the front inner point (Q1) and the front outer point (Q2) inclines relative to the protrusion radial-direction center line CL.

As part (c) of FIG. 68 shows, the inner protrusion angle (θ7) and the outer maximum angle (θ8) are each set to a value between 45° and 135°, inclusive. It is especially preferable to set the inner protrusion angle (θ7) and the outer maximum angle (θ8) to a value between 70° and 110°, inclusive, in order to efficiently reduce the tire temperature.

Figure 69:
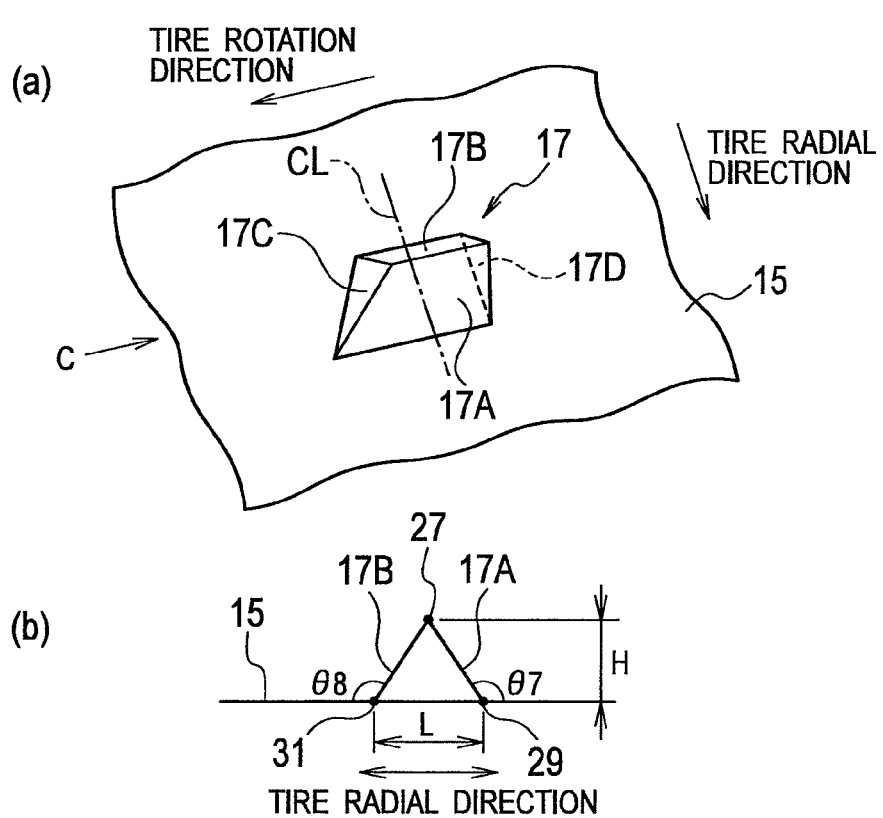
FIG. 69 is perspective and front views each showing the protrusion of Modification 4 according to the fourth embodiment (part 1).
Figure 70:
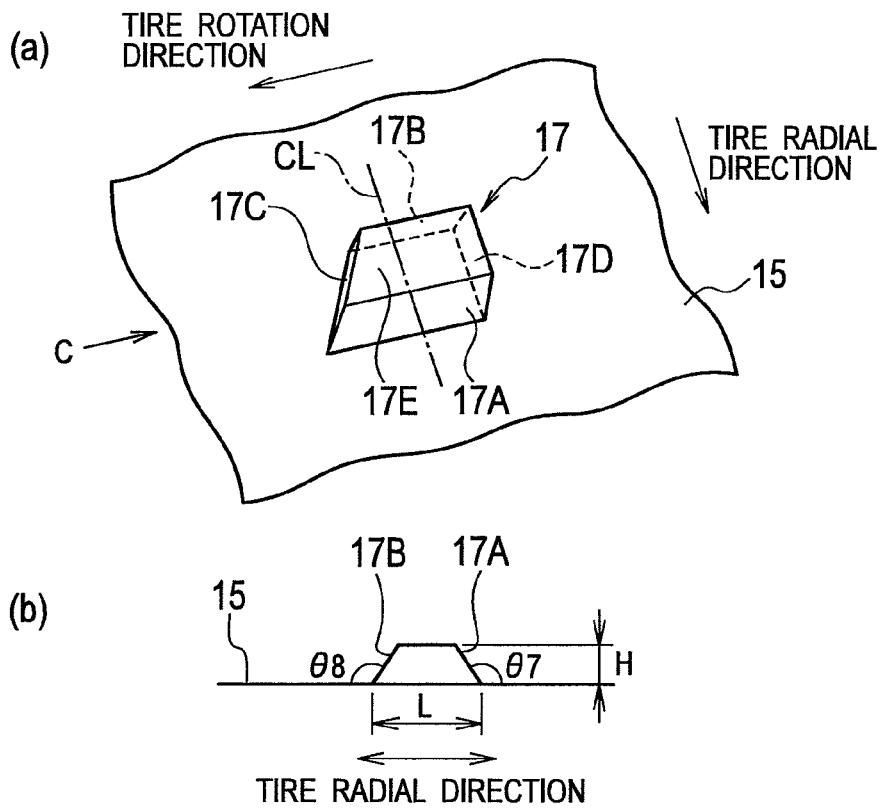
FIG. 70 is perspective and front views each showing the protrusion of Modification 4 according to the fourth embodiment (part 2).
Figure 71:
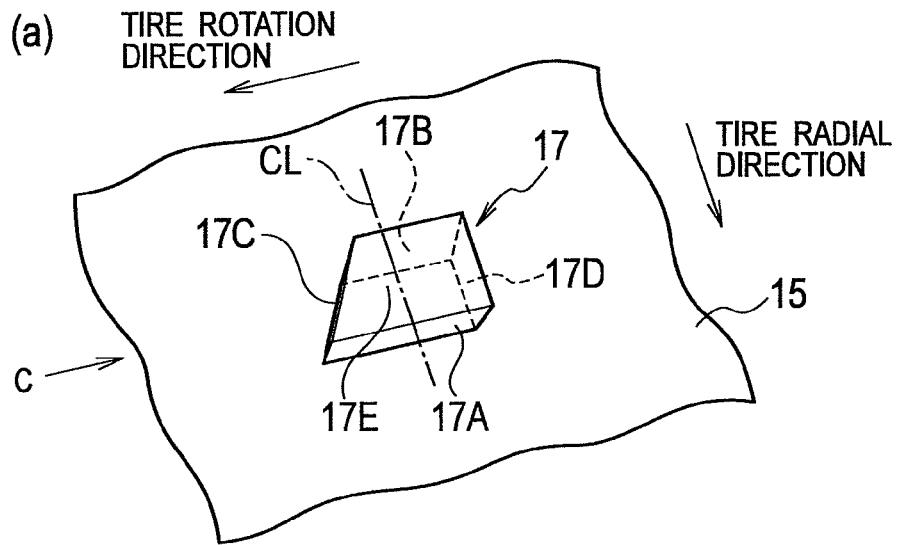
FIG. 71 is perspective, top, and front views each showing the protrusion of Modification 4 according to the fourth embodiment (part 2).
Figure 71:
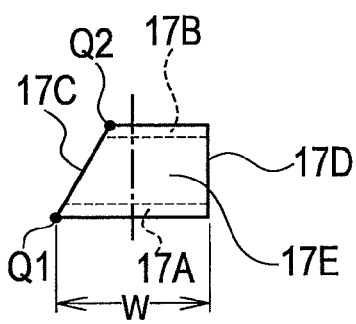
Figure 71:
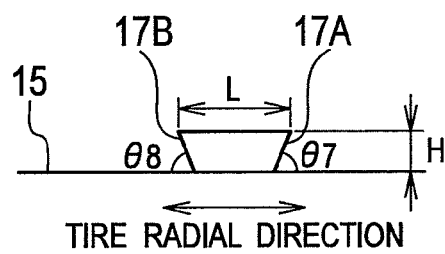

Although described above as such, the protrusion 17 is not limited to being formed in a semi-sphere when viewed in the tire rotation direction. For example, the following modifications may be made. Specifically, as FIG. 69 shows, the protrusion 17 may be formed in a triangular when viewed in the tire rotation direction. As FIG. 70 shows, the protrusion 17 may be formed in a trapezoid when viewed in the tire rotation direction. Here, the trapezoid has a bottom face wider than the protrusion face 17E. Moreover, as FIG. 71 shows, the protrusion 17 may be formed in a trapezoid when viewed in the tire rotation direction. Here, the trapezoid has a bottom face narrower than the protrusion face 17E.

According to the pneumatic tire 1 of Modification 4 according to the fourth embodiment, the flow of fluid passing by around the protrusion 17 can be smoothly accelerated. Thereby, the tire temperature can be reduced efficiently.

Moreover, by setting the inner protrusion angle (θ7) and the outer maximum angle (θ8) to a value between 45° and 135°, inclusive, when fluid spreads around the protrusion 17 by colliding with the front face 17C, the flow of the fluid thus separating from (spreading around) the protrusion 17 can be surely accelerated.

Examples According to Fourth Embodiment

Next, in order to further clarify the effects of the present invention, results obtained from tests performed using the following pneumatic tires according to comparative examples 1 to 3 and examples 1 to 23 will be described. It should be noted that these examples do not limit the present invention whatsoever.

Data on each of the pneumatic tires was acquired by measurement under the following conditions.

Tire Size: 285/50R20
Wheel Size: 8JJ×20
Internal Pressure Condition: 0 kPa (in a punctured state)
Load Condition: 9.8 kN As shown in the following Tables 10 to 12, test tires A, test tires B, and test tires C were prepared to test durability of each of the pneumatic tires. The pneumatic tires according to the comparative examples 1 to 3 have no protrusions. The pneumatic tires according to the examples 1 to 23 have protrusions, and have different protrusion configurations (such as shapes, the protrusion radial-direction length (L), and the protrusion maximum height (H)), as shown in the following Tables 10 to 12.

TABLE 10

| | TEST TIRE A | | | | | | | | | |
|---|---|---|---|---|---|---|---|---|---|---|
| | COMPARATIVE EXAMPLE 1 | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
| PROTRUSION TOP VIEW (TOP) | — | | | | | | | | | |
| TIRE RADIAL DIRECTION VIEW (SIDE) | — | | | | | | | | | |
| TIRE ROTATION DIRECTION VIEW (FRONT) | — | | | | | | | | | |
| PROTRUSION RADIAL DIRECTION LENGTH (L) | — | 0.4 | 2 | 8 | 2 | 2 | 2 | 2 | 2 | 2 |
| PROTRUSION MAXIMUM HEIGHT (H) | — | 2 | 2 | 2 | 0.4 | 8 | 2 | 2 | 2 | 2 |
| θ1, θ2 (DEGREES) | — | 90 | 90 | 90 | 90 | 90 | 50 | 130 | 90 | 90 |
| θ3, θ4 (DEGREES) | — | 90 | 90 | 90 | 90 | 90 | 90 | 90 | 50 | 130 |
| DURABILITY | 100 | 101 | 135 | 104 | 104 | 105 | 102 | 105 | 104 | 105 |

TABLE 11

| | TEST TIRE B | | | | | | | | | |
|---|---|---|---|---|---|---|---|---|---|---|
| | COMPARATIVE EXAMPLE 2 | EXAMPLE 10 | EXAMPLE 11 | EXAMPLE 12 | EXAMPLE 13 | EXAMPLE 14 | EXAMPLE 15 | EXAMPLE 16 | EXAMPLE 17 | EXAMPLE 18 |
| PROTRUSION TOP VIEW (TOP) | — | | | | | | | | | |
| TIRE RADIAL DIRECTION VIEW (SIDE) | — | | | | | | | | | |
| TIRE ROTATION DIRECTION VIEW (FRONT) | — | | | | | | | | | |
| PROTRUSION RADIAL DIRECTION LENGTH (L) | — | 0.4 | 2 | 8 | 2 | 2 | 2 | 2 | 2 | 2 |
| PROTRUSION MAXIMUM HEIGHT (H) | — | 2 | 2 | 2 | 0.4 | 8 | 2 | 2 | 2 | 2 |
| θ1, θ2 (DEGREES) | — | 90 | 90 | 90 | 90 | 90 | 50 | 130 | 90 | 90 |

TABLE 11-continued

| | TEST TIRE B | | | | | | | | |
|---|---|---|---|---|---|---|---|---|---|
| | COMPARATIVE EXAMPLE 2 | EXAMPLE 10 | EXAMPLE 11 | EXAMPLE 12 | EXAMPLE 13 | EXAMPLE 14 | EXAMPLE 15 | EXAMPLE 16 | EXAMPLE 17 | EXAMPLE 18 |
| θ3, θ4 (DEGREES) | — | 90 | 90 | 90 | 90 | 90 | 90 | 90 | 50 | 130 |
| DURABILITY | 100 | 101 | 136 | 108 | 104 | 107 | 103 | 105 | 105 | 105 |

TABLE 12

| | TEST TIRE C | | | | | |
|---|---|---|---|---|---|---|
| | COMPARATIVE EXAMPLE 3 | EXAMPLE 19 | EXAMPLE 20 | EXAMPLE 21 | EXAMPLE 22 | EXAMPLE 23 |
| PROTRUSION TOP VIEW (TOP) | — | | | ⇒ △ | | |
| TIRE RADIAL DIRECTION VIEW (SIDE) | — | | | ⇒ ⌒ | | |
| TIRE ROTATION DIRECTION VIEW (FRONT) | — | | | ⌒ | | |
| PROTRUSION RADIAL DIRECTION LENGTH (L) | — | 0.4 | 2 | 8 | 2 | 2 |
| PROTRUSION MAXIMUM HEIGHT (H) | — | 2 | 2 | 2 | 0.4 | 8 |
| DURABILITY | 100 | 101 | 129 | 104 | 104 | 106 |

<Durability>

Each of the pneumatic tires was fitted into a drum test machine placed indoors, was rotated at a constant speed (90 km/h), and was measured for its durable distance until breakage. The durability of the pneumatic tire of each of the comparative examples 1 to 3 was set to '100.' Then, the durability of each of the other pneumatic tires was evaluated by a relative value to 100. Note that the larger the index, the better the durability.

As a result, as shown in Tables 10 to 12, it was found that the pneumatic tires according to the examples 1 to 23 have excellent durability compared to that of the pneumatic tires according to the comparative examples 1 to 3. Particularly, similarly to the examples according to the second embodiment, the pneumatic tire satisfying the relationship $1.0 \leq L/H \leq 50.0$ was found to have excellent durability, as shown in FIG. 36. Also, the pneumatic tire having the protrusion maximum height (H) of 0.3 mm to 15 mm was found to have excellent durability, as shown in FIG. 37.

Fifth Embodiment

Figure 72:
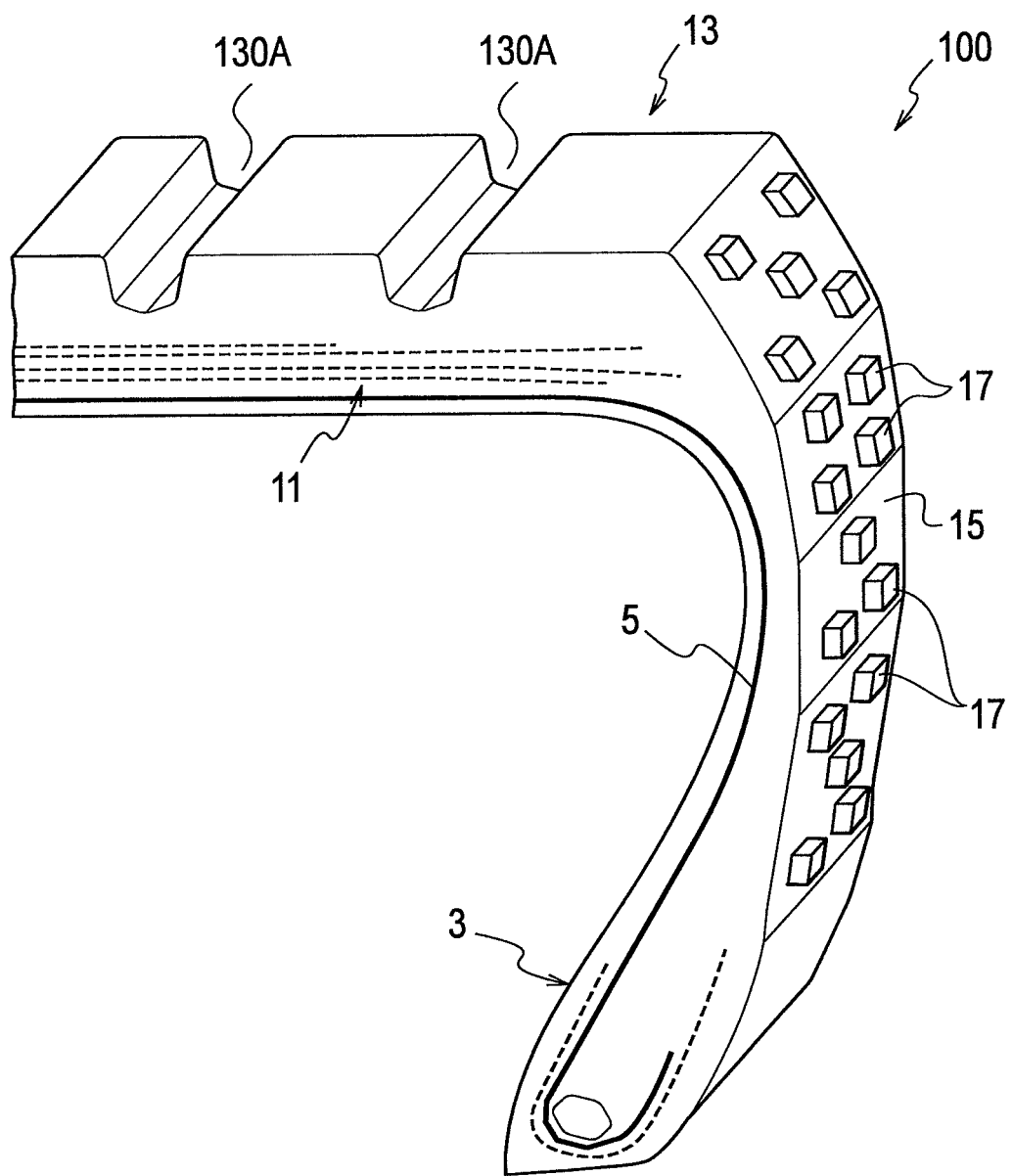
FIG. 72 is a partially-exploded perspective view showing a pneumatic tire according to a fifth embodiment (part 1).

Next, the configuration of a pneumatic tire according to a fifth embodiment will be described with reference to FIG. 72. FIG. 72 is a cross-sectional view of the pneumatic tire according to the fifth embodiment, taken in the tread width direction. Note that the same parts (the same configurations) as those of the pneumatic tire 1 according to the above-described first embodiment bear the same reference symbols, and different points are mainly described.

As FIG. 72 shows, a pneumatic tire 100 is a truck and bus radial tire (TBR) in which ribs 130A are formed in a tread part 13. The pneumatic tire 100 has more layers in a belt layer 11 and has a larger tire radius than the passenger-car radial tire (PCR) described in the first embodiment.

In the pneumatic tire 100, when heat in the surface of a bead part 3 is to be dissipated, protrusions 17 may be arranged inward, in the tire radial direction, of the tire maximum width position (i.e., on the bead part 3 side). When the belt layer 11 has many layers, the protrusions 17 may be arranged outward, in the tire radial direction, of the tire maximum width position (i.e., on the tread part 13 side).

Figure 73:
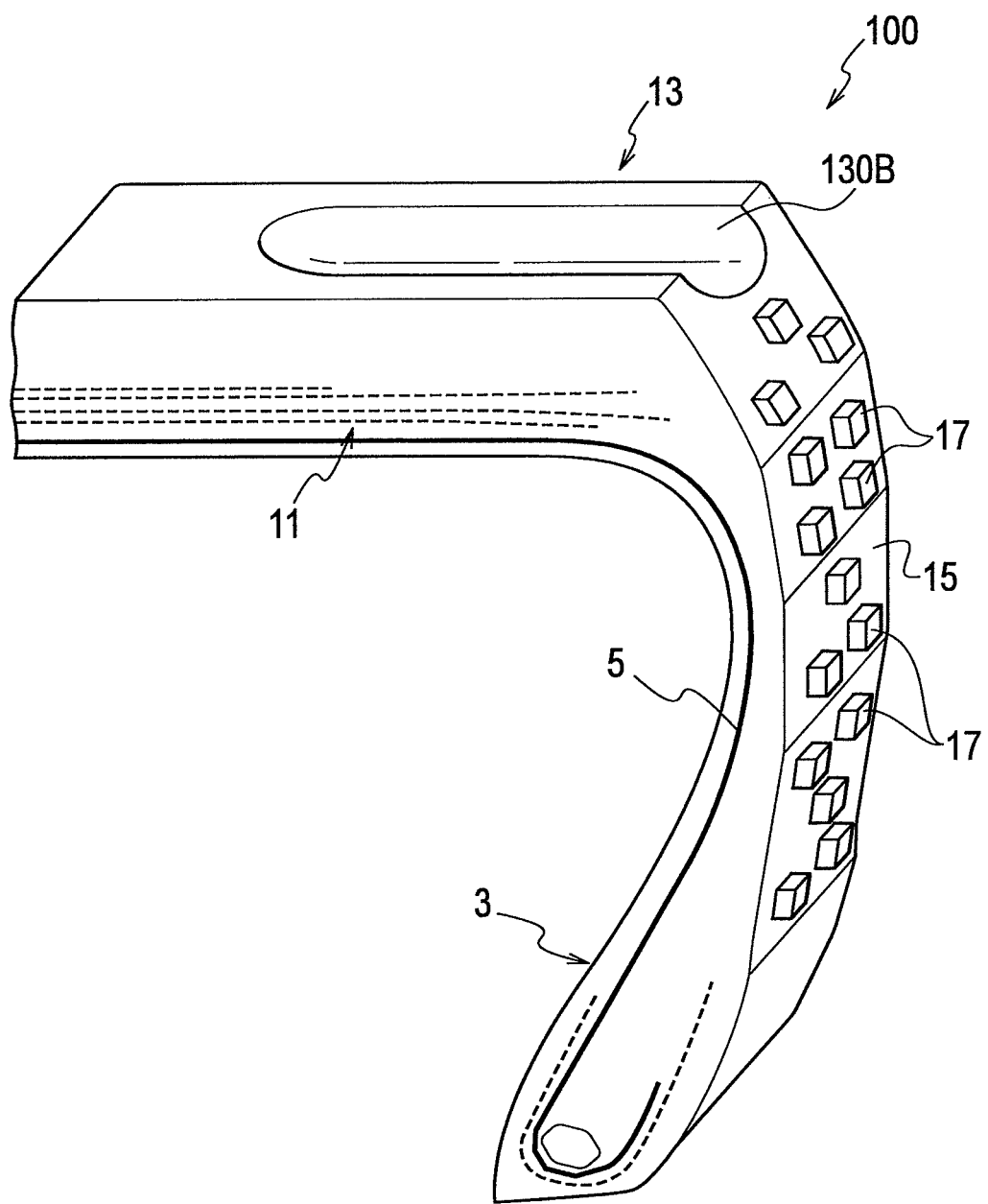
FIG. 73 is a partially-exploded perspective view showing the pneumatic tire according to the fifth embodiment (part 2).
Figure 74:
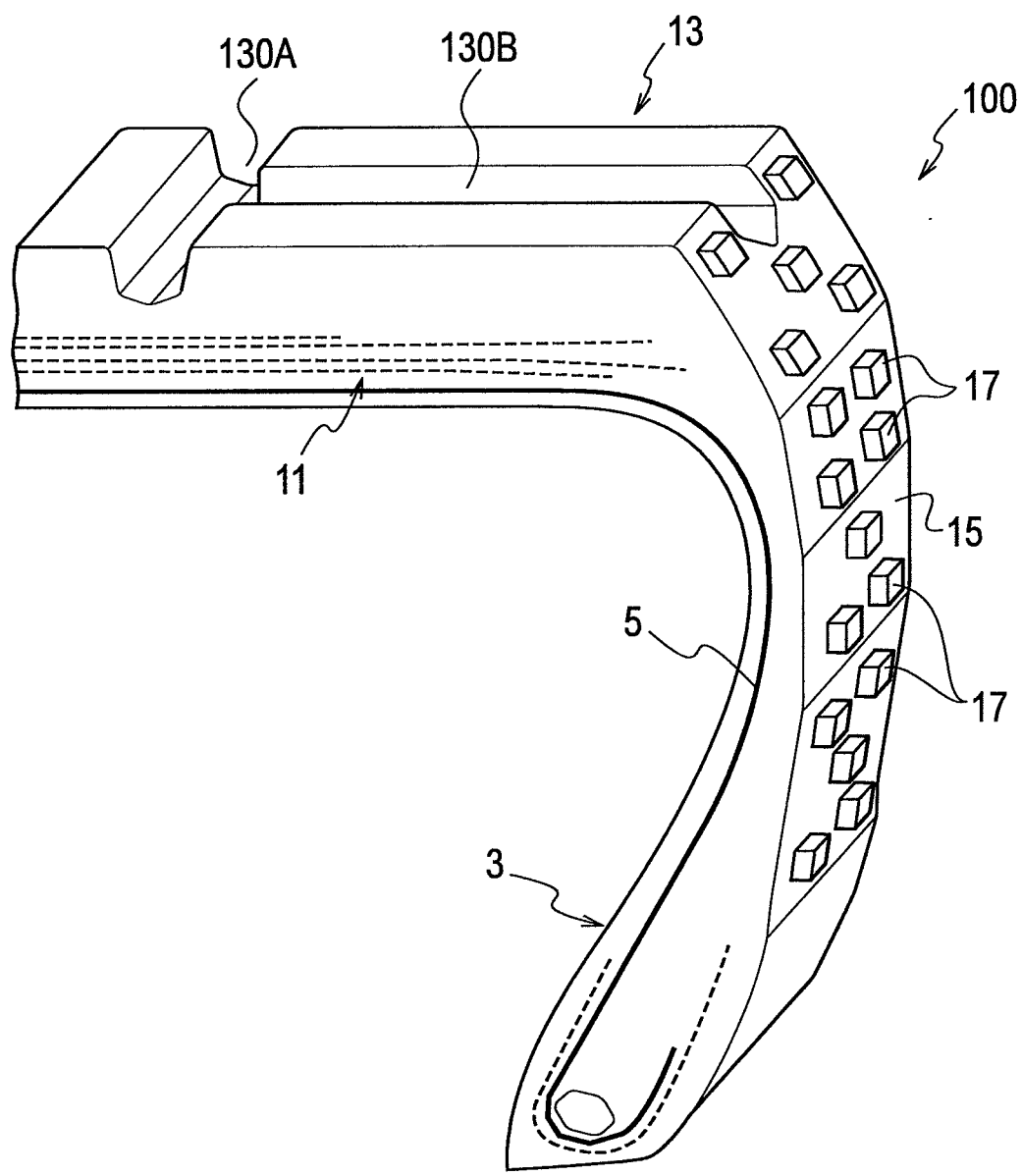
FIG. 74 is a partially-exploded perspective view showing the pneumatic tire according to the fifth embodiment (part 3).

The pneumatic tire 100 is not limited to the passenger-car radial tire (PCR) described in the first embodiment or to the truck and bus radial tire (TBR) described in this embodiment. For example, the pneumatic tire 100 may be a heavy load tire such as the following. Specifically, as FIG. 73 shows, the pneumatic tire 100 may be a radial tire for a construction vehicle (such as a grader or a shovel loader) in which only lugs 130B are formed in the tread part 13. In addition, as FIG. 74 shows, the pneumatic tire 100 may be a radial tire for a construction vehicle (such as a dump truck or a crane) in which the ribs 130A and the lugs 130B are formed in the tread part 13. Moreover, the pneumatic tire 100 does not necessarily have to be a radial tire, and may of course be a bias tire.

(Operations and Effects According to Fifth Embodiment)

According to the pneumatic tire 100 according to the fifth embodiment described above, even when a tire other than a passenger-car radial tire (PCR) is used, the pneumatic tire can reduce the tire temperature efficiently while maintaining general driving performance.

Sixth Embodiment

Figure 75:
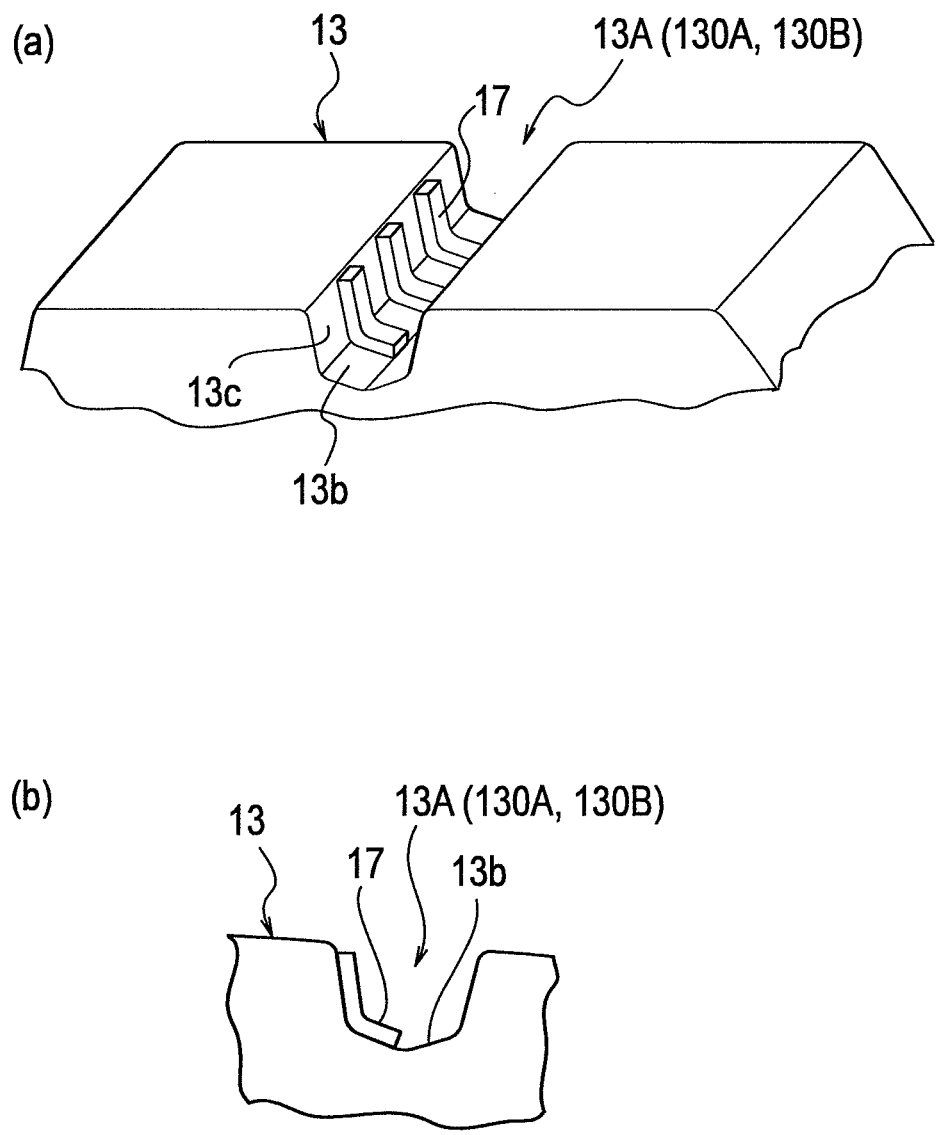
FIG. 75 is a partially-enlarged perspective view showing a tread part and a cross-sectional view showing the vicinity of a groove, of a pneumatic tire according to a sixth embodiment (part 1).

Next, the configuration of a pneumatic tire according to a sixth embodiment will be described with reference to FIG. 75. Part (a) of FIG. 75 is a partially-enlarged perspective view showing a tread part of the pneumatic tire according to the sixth embodiment. Part (b) of FIG. 75 is a cross-sectional view showing the vicinity of a groove in the pneumatic tire according to the sixth embodiment. Note that the same parts as those of the pneumatic tire 1 according to the above-described first embodiment bear the same reference symbols, and different points are mainly described.

As parts (a) and (b) of FIG. 75 show, multiple protrusions 17 are provided in a groove 13A formed in a tread part 13. The protrusions 17 protrude from a tire surface 15 (inside the groove 13A) and generate turbulence. Note that the groove 13A includes a rib 130A and a lug 130B described in the fifth embodiment.

Figure 76:
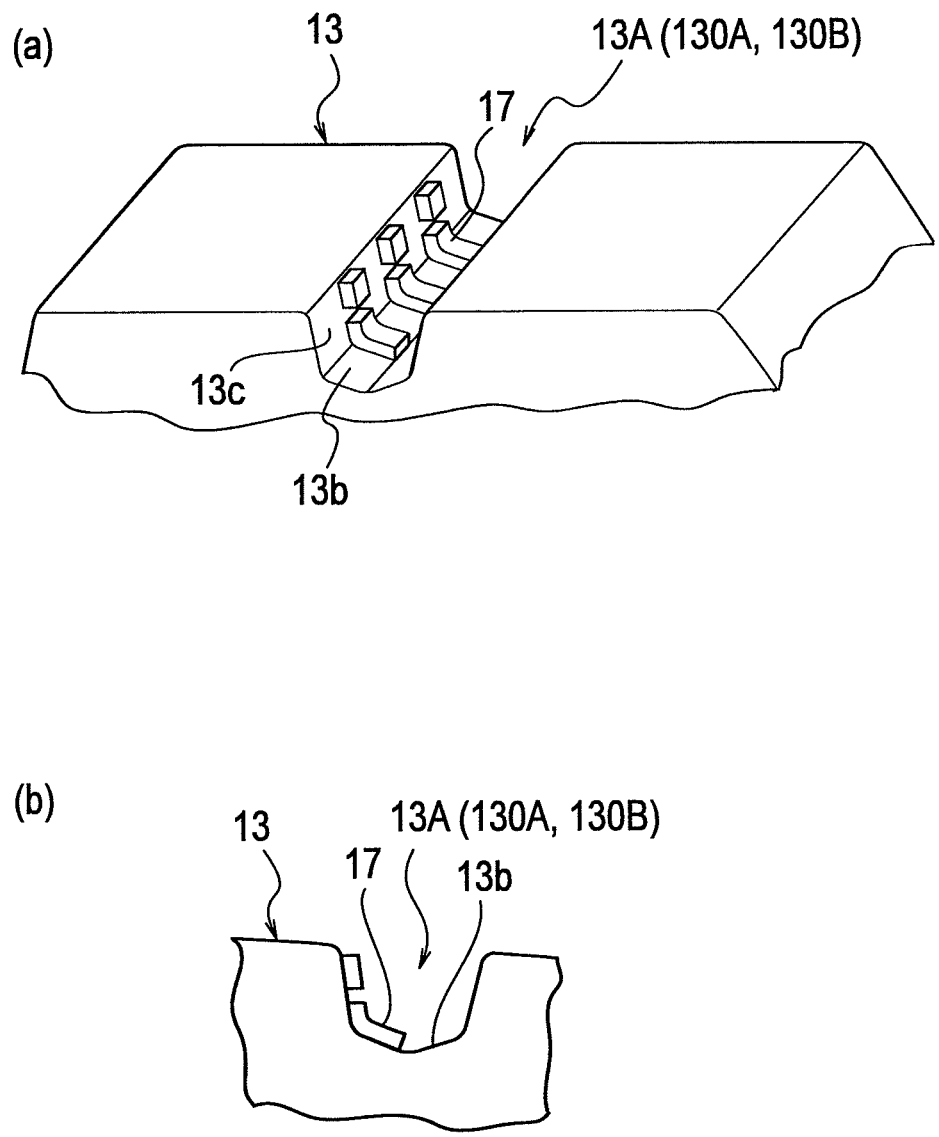
FIG. 76 is a partially-enlarged perspective view showing the tread part and a cross-sectional view showing the vicinity of the groove, of the pneumatic tire according to the sixth embodiment (part 2).

Each of the protrusions 17 is provided continuously from a bottom face 13b to a side face 13c of the groove 13A. Note that the protrusion 17 does not necessarily have to be provided continuously from the bottom face 13b to the side face 13c of the groove 13A, and may be split at a predetermined interval, as shown in FIG. 76.

Figure 77:
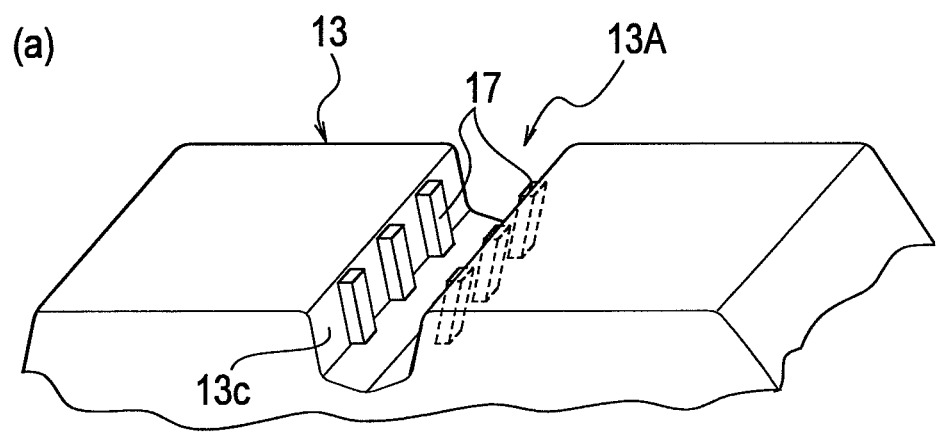
FIG. 77 is a partially-enlarged perspective view showing the tread part and a cross-sectional view showing the vicinity of the groove, of the pneumatic tire according to the sixth embodiment (part 3).
Figure 77:
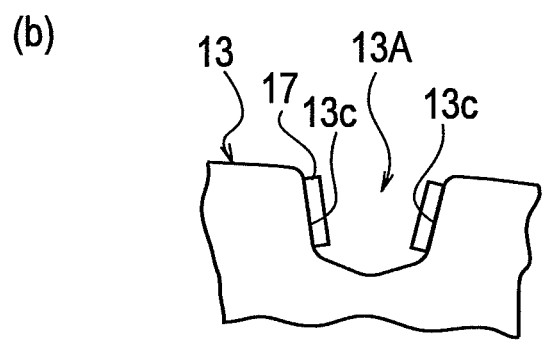
Figure 78:
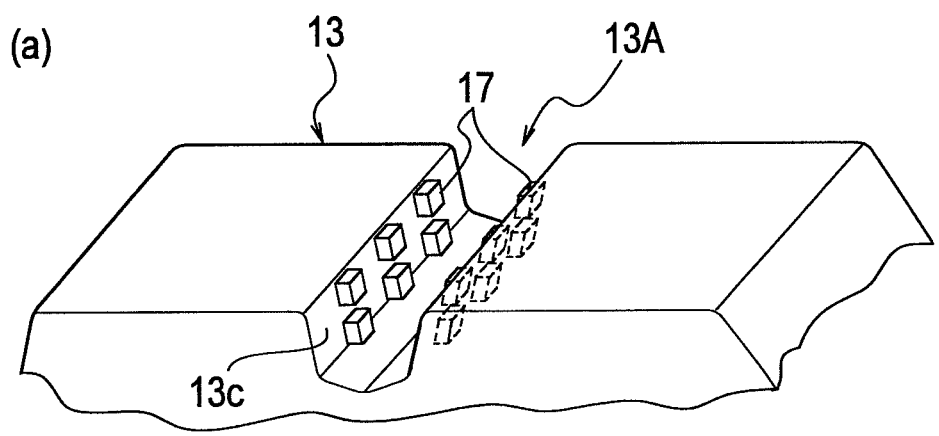
FIG. 78 is a partially-enlarged perspective view showing the tread part and a cross-sectional view showing the vicinity of the groove, of the pneumatic tire according to the sixth embodiment (part 4).
Figure 78:
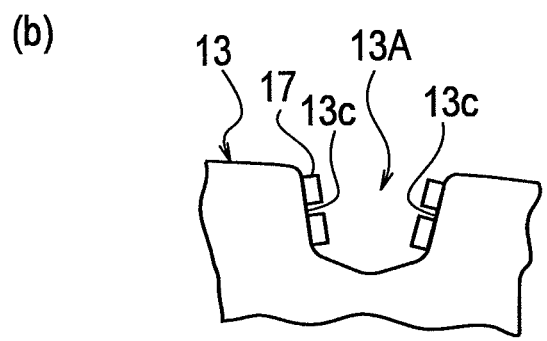

Moreover, the protrusion 17 does not necessarily have to be provided on the bottom face 13b and the side face 13c of the groove 13A. For example, as FIG. 77 shows, the protrusion 17 may be continuously provided on at least one of the side faces 13b of the groove 13A, or as FIG. 78 shows, may be split at a predetermined interval on at least one of the side faces 13c of the groove 13A.

Figure 79:
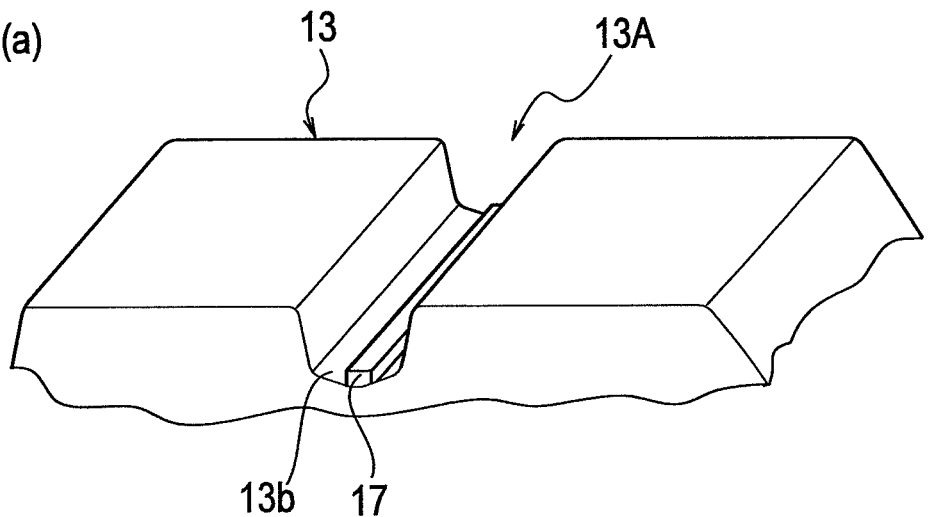
FIG. 79 is a partially-enlarged perspective view showing the tread part and a cross-sectional view showing the vicinity of the groove, of the pneumatic tire according to the sixth embodiment (part 5).
Figure 79:
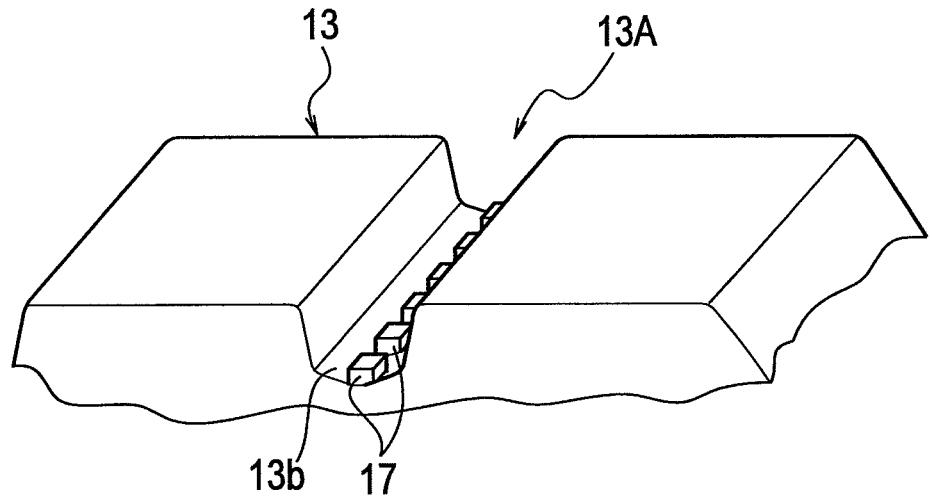
Figure 80:
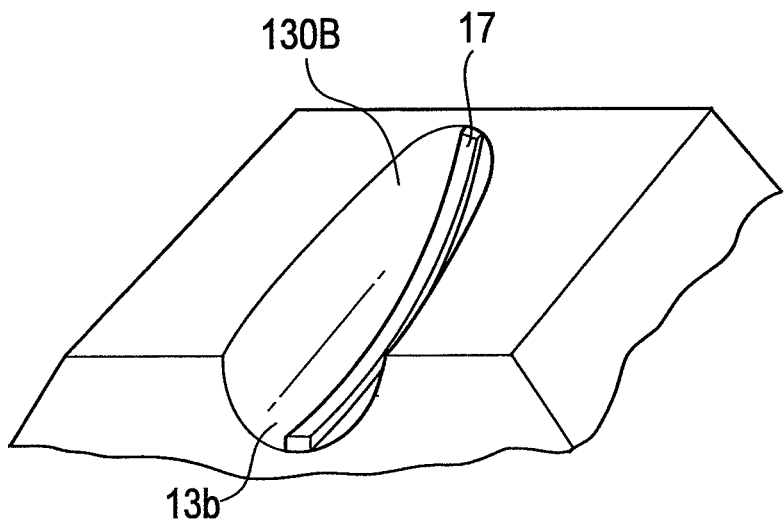
FIG. 80 is a partially-enlarged perspective view showing the tread part and a cross-sectional view showing the vicinity of the groove, of the pneumatic tire according to the sixth embodiment (part 6).
Figure 80:
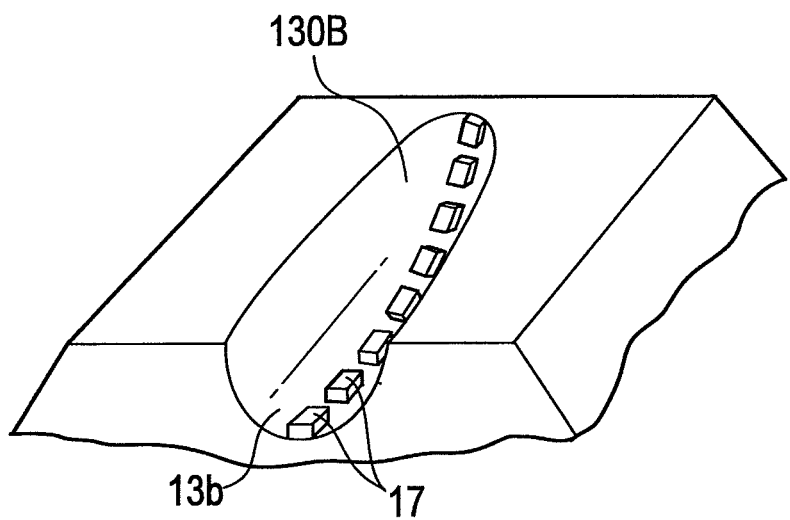

Alternatively, as part (a) of FIG. 79 shows, the protrusion 17 may be continuously provided on only the bottom face 13c of the groove 13A, or as part (b) of FIG. 79 shows, may be split at a predetermined interval on only the bottom face 13b of the groove 13A. Moreover, as FIG. 80 shows, such protrusion 17 is of course applicable also when the protrusion 17 is provided only in a lug groove 13B.

(Operations and Effects According to Sixth Embodiment)

According to the pneumatic tire 1 according to the sixth embodiment described above, the protrusion 17 is provided in the groove 13A formed in the tread part 13, on at least one of the bottom face 13b and the side faces 13b. Thereby, the tire temperature can be reduced at the vicinity of the grooves 13A formed in the tread part 13 which is nearest to the end part of the belt layer 11 where separation and cracking are likely to occur. Accordingly, durability can be improved as well.

Seventh Embodiment

Figure 81:
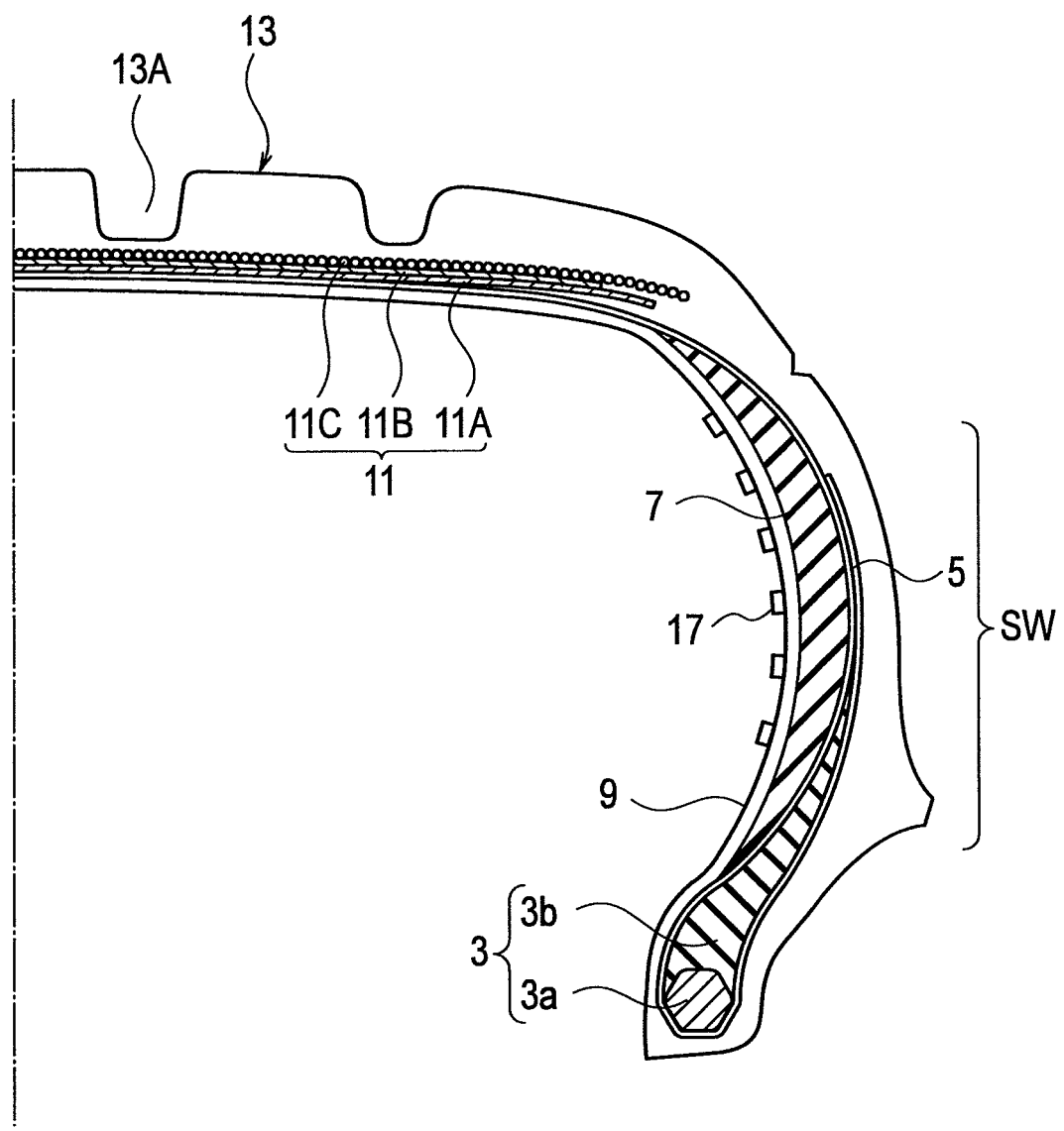
FIG. 81 is a cross-sectional view showing a pneumatic tire according to a seventh embodiment, taken in the tread width direction.

Next, the configuration of a pneumatic tire according to a seventh embodiment will be described with reference to FIG. 81. FIG. 81 is a cross-sectional view of the pneumatic tire according to the seventh embodiment, taken in the tread width direction. Note that the same parts as those of the pneumatic tire 1 according to the above-described first embodiment bear the same reference symbols, and different points are mainly described.

As FIG. 81 shows, multiple protrusions 17 are provided inward, in the tread width direction, of an inner liner 9. The protrusions 17 protrude from an inner face of the tire (the inner liner 9) and generate turbulence.

When heat in the surface of a bead part 3 is to be dissipated, the protrusions 17 may be arranged inward, in the tire radial direction, of the tire maximum width position (i.e., on the bead part 3 side). When a belt layer 11 has many layers, the protrusions 17 may be arranged outward, in the tire radial direction, of the tire maximum width position (i.e., on the back side of a tread part 13, or the like).

(Operations and Effects According to Fifth Embodiment)

In the pneumatic tire 1 according to the seventh embodiment described above, the protrusions 17 are provided on the inner face of the tire. Accordingly, the temperature of the inner face of the tire, particularly, the inner face of the tire in a punctured state, can be reduced. The durability can therefore be improved as well.

Specifically, when the pneumatic tire 1 becomes a punctured state, fluid inside the tire (inside gas) and fluid outside the tire (outside gas) exchange heat through a hole made in the pneumatic tire 1. At this time, by providing the protrusions 17 on the inner face of the tire, the fluid inside the tire can be accelerated to allow smooth heat exchange. Consequently, the temperature of the inner face of the tire in a punctured state can be reduced.

Particularly, when a pneumatic tire provided with a sidewall reinforcing layer 7 (run-flat tire) becomes a punctured state, the temperature inside the tire rises higher, as compared to a tire provided with no sidewall reinforcing layer 7. For this reason, provision of the protrusions 17 on the inner face of the tire allows a temperature reduction inside the tire and thus allows improvement of the durability.

Other Embodiments

The contents of the present invention have been disclosed as above using the embodiments of the present invention. However, it should not be understood that the present invention is limited by the description and drawings constituting part of this disclosure.

Specifically, although described as such, the pneumatic tire 1 is not limited to having the sidewall reinforcing layer 7 (namely, being a run-flat tire), and may have no sidewall reinforcing layer 7.

In addition, the protrusion 17 can be formed as a combination of the various forms described in the first to seventh embodiments, and may of course include a form not shown in the drawings.

Further, when opposed faces (e.g., the inner face 17A and the outer face 17B, the front face 17C and the rear face 17D, or the protrusion face 17E and the bottom face (tire surface 15)) are flat, the opposed faces do not necessarily have to be formed parallel to each other. For example, any of the opposed faces may incline (or ascend or descend) from the front face 17C to the rear face 17D, or may of course be asymmetric.

This disclosure will make various alternative embodiments, examples, and operation techniques apparent to those skilled in the art. Therefore, the technical scope of the present invention should be defined only by the specific subject matters of the invention according to the scope of the invention as defined by the appended claims reasonably understood from the above description.

INDUSTRIAL APPLICABILITY

As described above, the pneumatic tire of the present invention allows the tire temperature to be reduced efficiently while maintaining general driving performance. Accordingly, the present invention is useful as, for example, a technique for manufacturing pneumatic tires.

The invention claimed is:

1. A pneumatic tire comprising turbulence generating protrusions on a tire surface, each of the turbulence generating protrusions having a sharp edge part, wherein the following relationships are satisfied:

0.5 mm<H≤5 mm;
0.03≤H/√R≤0.64;
1.0≤p/H≤50.0;
0.1≤H/e≤3.0;
1.0≤L/H≤50.0; and
1.5≤(p−w)/w≤100.0, where "R" is a tire radius being a distance from a rim center to an outermost position in a tread radial direction, "H" is a protrusion maximum height being a distance from the tire surface to a position at which each turbulence generating protrusion protrudes farthest from the tire surface, "p" is a protrusion circumferential-direction interval being an interval between the turbulence generating protrusions adjacent in a tire rotation direction, "e" is a protrusion radial-direction interval being an interval between the turbulence generating protrusions adjacent in a rotation orthogonal direction substantially orthogonal to the tire rotation direction, "L" is a protrusion radial-direction length being a maximum length of each turbulence generation protrusion in the rotation orthogonal direction, and "w" is a protrusion circumferential-direction length being a maximum length of each turbulence generation protrusion in the tire rotation direction, wherein the turbulence generating protrusions are provided inside a groove on the tire surface.

2. The pneumatic tire according to claim 1, wherein an average arrangement density (ρ) of the turbulence generating protrusions is 0.0008 to 13 pieces/cm2.

3. The pneumatic tire according to claim 2, wherein the average arrangement density (ρ) of the turbulence generating protrusions decreases gradually from an inner side in a tire radial direction toward an outer side in the tire radial direction.

4. The pneumatic tire according to claim 1, wherein the turbulence generating protrusions are arranged at predetermined intervals in respective directions: a direction in which the turbulence is generated to flow in a direction opposite to the tire rotation direction; and a direction orthogonal to the turbulence, and are arranged in a staggered manner in which the turbulence generating protrusions adjacent in the turbulence generation direction are arranged at respective positions shifted from each other.

5. The pneumatic tire according to claim 4, wherein a protrusion circumferential-direction center line (CL') inclines relative to the tire rotation direction by 10° to 20°, towards a rear side thereof in the tire rotation direction being outward in the tire radial direction, from a front side thereof in the tire rotation direction, and the protrusion circumferential-direction center line (CL') being a line that connects centers of the respective turbulence generating protrusions adjacent in the tire rotation direction.

6. The pneumatic tire according to claim 1, wherein in a protrusion top view being a view in which the turbulence generating protrusion is viewed from top, a front face of the turbulence generating protrusion curves at least partially, the front face being located frontward, in the tire rotation direction, of a protrusion radial-direction center line (CL), and a front angle (θ1) and a rear angle (θ2) are each set to a value between 45° and 135°, inclusive, the front angle (θ1) being an angle formed between the tire surface and the front face, the rear angle (θ2) being an angle formed between the tire surface and a rear face located rearward, in the tire rotation direction, of the protrusion radial-direction center line (CL).

7. The pneumatic tire according to claim 1, wherein in a protrusion top view being a view in which each turbulence generating protrusion is viewed from top, a front convex part is provided frontward, in the tire rotation direction, of protrusion radial-direction center line (CL), the front convex part protruding frontward in the tire rotation direction.

8. The pneumatic tire according to claim 1, wherein
in a protrusion top view being a view in which each turbulence generating protrusion is viewed from top, a front face located frontward, in the tire rotation direction, of protrusion radial-direction center line (CL) has a front inner point (Q1) located at an innermost position in a tire radial direction, and a front outer point (Q2) located at an outermost position in the tire radial direction, the front inner point (Q1) being located frontward, in the tire rotation direction, of the front outer point (Q2).

9. The pneumatic tire according to claim 1, wherein
in a protrusion top view being a view in which each turbulence generating protrusion is viewed from top, at least one of a rear convex part and a rear concave part is provided rearward, in the tire rotation direction, of protrusion radial-direction center line (CL), the rear convex part protruding rearward in the tire rotation direction, the rear concave part being concave frontward in the tire rotation direction.

10. The pneumatic tire according to claim 1, wherein
an inner angle (θ3) and an outer angle (θ4) are each set to a value between 45° and 135°, inclusive, the inner angle (θ3) being an angle formed between the tire surface and an inner face located at an innermost position in a tire radial direction, the outer angle (θ4) being an angle formed between the tire surface and an outer face located at an outermost position in the tire radial direction.

11. The pneumatic tire according to claim 1, wherein
a front maximum angle (θ5) and a rear maximum angle (θ6) are each set to a value between 45° and 135°, inclusive, the front maximum angle (θ5) being an angle formed between a most-protruded position and a position where the tire surface intersects with a front face located frontward, in the tire rotation direction, of protrusion radial-direction center line (CL), the most-protruded position protruding farthest from the tire surface, the rear maximum angle (θ6) being an angle formed between the most-protruded position and a position where the tire surface intersects with a rear face located rearward, in the tire rotation direction, of protrusion radial-direction center line (CL).

12. The pneumatic tire according to claim 1, wherein an inner maximum angle (θ7) and an outer maximum angle (θ8) are each set to a value between 45° and 135°, inclusive, the inner maximum angle (θ7) being an angle formed between a most-protruded position and a position where the tire surface intersects with an inner part located at an innermost position in a tire radial direction, the most-protruded position protruding farthest from the tire surface, the outer maximum angle ($\theta 8$) being an angle formed between the most-protruded position and a position where the tire surface intersects with an outer part located at an outermost position in the tire radial direction.

13. The pneumatic tire according to claim 1, wherein the following relationship is satisfied:
$0.1 \leq H/\sqrt{R} \leq 0.64$.

14. The pneumatic tire according to claim 1, wherein the turbulence generating protrusions are also provided on sidewalls.

15. The pneumatic tire according to claim 1, wherein the following relationship is satisfied:
$2\ mm \leq L \leq 15\ mm$.

16. The pneumatic tire according to claim 1, the turbulence generating protrusions are also provided on sidewalls and sidewall reinforcing layers, formed in a crescent-shape in the cross section, are formed inward in a tread width direction of a carcass layer.

17. The pneumatic tire according to claim 1, wherein the following relationship is satisfied:
$0.03 \leq H/\sqrt{R} \leq 0.26$.

18. The pneumatic tire according to claim 1, wherein the following relationship is satisfied:
$0.5 \leq H/e \leq 2.5$.

19. The pneumatic tire according to claim 1, wherein the following relationship is satisfied:
$4.0 < (p-w)/w \leq 100.0$.

\* \* \* \* \*